United States Patent [19]

Shimada et al.

[11] Patent Number: 5,003,331
[45] Date of Patent: Mar. 26, 1991

[54] FILM WINDING SYSTEM OF CAMERA

[75] Inventors: Takahisa Shimada; Hideo Kajita; Sueyoshi Okumura; Reiji Seki; Toshihiko Ishimura; Sinji Katayori, all of Osaka, Japan

[73] Assignee: Minolta Camera Kabushiki Kaisha, Chuo, Japan

[21] Appl. No.: 523,265

[22] Filed: May 14, 1990

Related U.S. Application Data

[63] Continuation of Ser. No. 333,704, Apr. 5, 1989, abandoned.

[30] Foreign Application Priority Data

| Apr. 6, 1988 | [JP] | Japan | 63-86161 |
| Apr. 6, 1988 | [JP] | Japan | 63-86162 |
| Apr. 7, 1988 | [JP] | Japan | 63-87650 |
| Apr. 8, 1988 | [JP] | Japan | 63-87558 |
| May 11, 1988 | [JP] | Japan | 63-115404 |
| Jun. 21, 1988 | [JP] | Japan | 63-154333 |
| Jun. 21, 1988 | [JP] | Japan | 63-154335 |
| Jun. 21, 1988 | [JP] | Japan | 63-154336 |
| Jun. 21, 1988 | [JP] | Japan | 63-154337 |
| Aug. 17, 1988 | [JP] | Japan | 63-204282 |
| Aug. 17, 1988 | [JP] | Japan | 63-204283 |

[51] Int. Cl.⁵ ............................................. G03B 1/12
[52] U.S. Cl. .................................. 354/173.1; 354/204
[58] Field of Search ................ 354/173.1, 173.11, 204

[56] References Cited

U.S. PATENT DOCUMENTS

| 3,705,338 | 12/1972 | Tsujimoto et al. | 318/446 |
| 4,455,073 | 6/1984 | Tominaga et al. | 354/173.11 |
| 4,576,457 | 3/1986 | Fukuda et al. | 354/173.11 |
| 4,697,899 | 10/1987 | Kawamura et al. | 354/173.11 |

Primary Examiner—Michael L. Gellner
Attorney, Agent, or Firm—Burns, Doane, Swecker & Mathis

[57] ABSTRACT

A film winding system of a camera, capable of automatically winding a film roll, comprising, an electric motor driven so as to winding the film roll, a film winding apparatus driven by the motor, a lock mechanism for locking the film winding apparatus, the lock mechanism comprising a film winding controller connected with the film winding apparatus and a lock lever engaging with the film winding controller so as to restrain an operation of the film winding apparatus, a releasing lever for cancelling an engagement of the lock lever to the film winding controller in advance before the film winding apparatus is actuated, and a loosing mechanism driven by the motor for reducing a degree of the engagement between the film winding controller and the lock lever in advance before the releasing lever swings in the cancellation direction of the engagement.

The system operates as follows. Since the loosing mechanism is driven so as to reduce the degree of the engagement between the film winding controller and the lock lever in advance before the releasing lever swings in the cancellation direction of the engagement, the releasing lever cancels the engagement of the lock lever to the film winding controller with light dynamic force. Then, the film winding apparatus is actuated, and the film roll is wound.

3 Claims, 33 Drawing Sheets

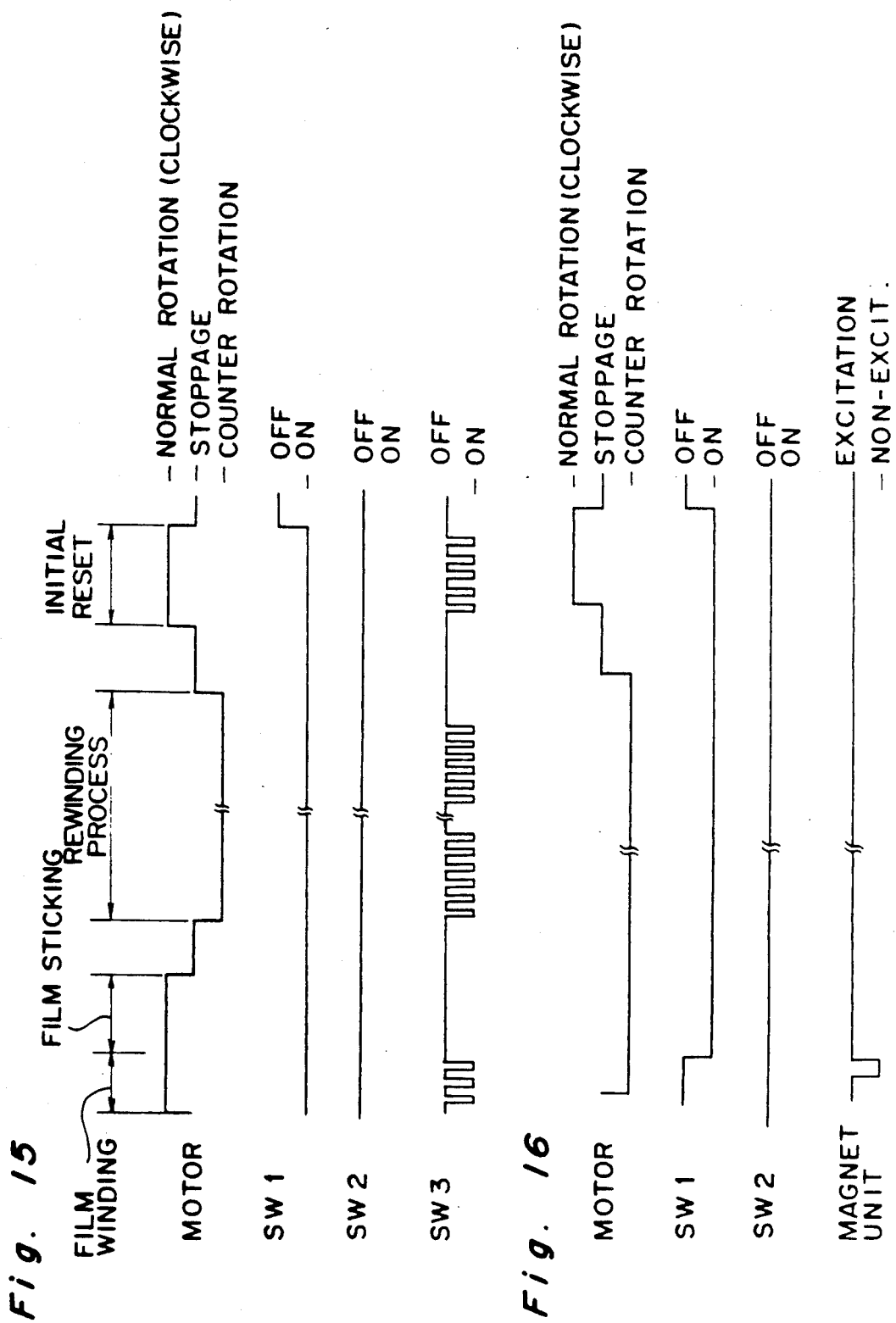

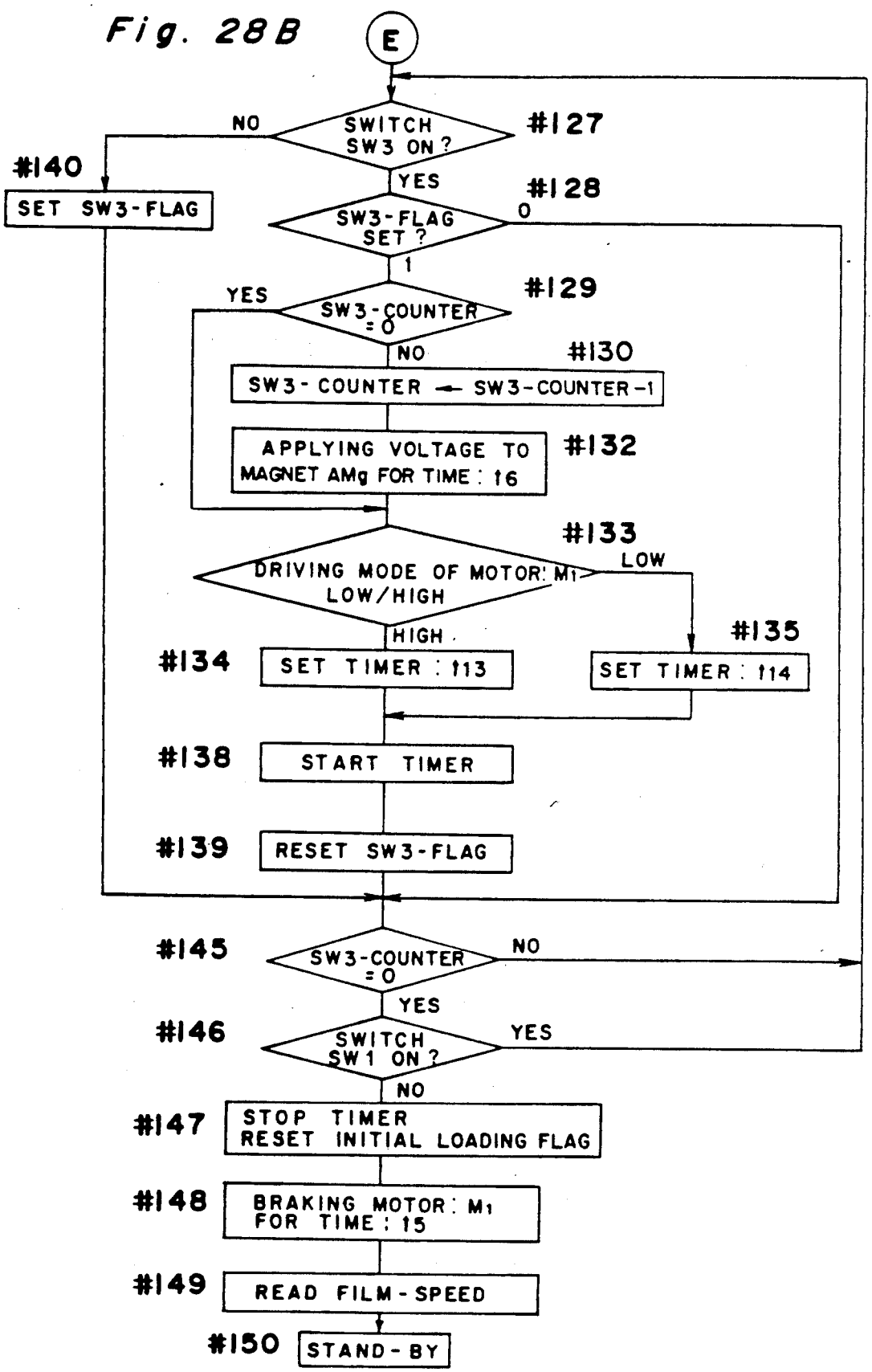

FILM WINDING SYSTEM OF CAMERA

This application is a continuation of application Ser. No. 333,704, filed Apr. 5, 1989, now abandoned.

BACKGROUND OF THE INVENTION

1. Field of the Invention

The present invention relates to a film winding system of a camera.

2. Description of the Related Art

Conventionally, there are popularized cameras having a film winding mechanism with a motor In such types of the cameras, especially, having an automatic film winding mechanism, the film winding mechanism is driven and turned off with the motor integrated in the camera, repeatedly and with high frequency, so that reliability and durability of the film winding mechanism may be important. Specially, a winding stopper device, for example, a lock mechanism for the film winding mechanism, for stopping the operation of the film winding mechanism with accuracy has important influence on the reliability and the durability of the film winding mechanism.

In the case where the film winding mechanism which is driven with a predetermined driving force is forced to stop with the lock mechanism after the motor is turned off, both of the film winding mechanism and the lock mechanism come into tension by means of inertia of rotating members since the rotating members such as gears and shafts which are comprised of a reduction gear system for a power transmission of the film winding mechanism have a rotational inertia. If such a condition is caused frequently in the film winding mechanism, it has bad influence on the durability of the film winding mechanism. In addition, a required force for dis-locking a lock member of the lock mechanism out of the film winding mechanism becomes much. Even in the case of a camera having a motor braking system, the problem is not completely solved.

As described above, in the camera having such an automatic film winding mechanism, a relatively heavy load acts on the winding stopper device at completion of the film winding, so that dis-locking of the stopper device requires a large amount of a counter force against the load on the occasion of the successive film winding. There are various types of structures of dis-locking mechanisms available, corresponding to the types of stopper devices. No matter what type of the dis-locking mechanisms is, the automatic film winding mechanism normally has a driving source for dis-locking the stopper device. For example, in the case of an automatic film winding mechanism having a stopper device including a lock lever which is actuated by a spring and by which the stopper device is dis-locked, the mechanism requires holding means (driving source) for holding an operating position of the lock lever by which the mechanism is locked against the spring force. If a magnet unit, for example, as such holding means, may be utilized, a size of the magnet unit which is accommodated in a camera body is limited fundamentally. Accordingly, a dynamic power to be generated by the magnet is limited, so that the spring force capable of holding the lock lever at its non-operating position by the spring is limited.

A driving capacity of the driving source should exceeds, at least, the spring force (dis-locking force). On the other hand, it is preferable that the driving source in the camera body is a smaller one as much as possible from the miniaturized point of view on a camera. Therefore, it is one factor and is very important for miniaturization and cost-down of a camera that the dis-locking of the stopper device is enabled by a smaller dynamic power. Furthermore, if it is enabled to dis-lock the stopper device with the smaller dynamic power, it is ensured to dis-lock the automatic film winding mechanism. As a result of that, it is improved that reliability of the automatic film winding mechanism.

As described above, to accomplish an improvement of the reliability of the film winding mechanism, countermeasures to be taken are as follows and effective.

That is, one is to reduce the dynamic force acting on the winding stopper device as much as possible. The dynamic force necessary for releasing the film winding mechanism from the locked state of that can be reduced if the load acting on the lock mechanism for restraining the film winding by the film winding mechanism is loosed in advance before initiation of a subsequent film winding to a preceding one.

The other is to create more opportunity to dis-lock and/or release the stopper device for a short period as much as possible. In the case where the dis-locking does not work due to something wrong, for example, in the case where the dis-locking does not work since the reduction gear system of the film winding system is out of order, the camera is out of order, as well. In the conventional cameras, normally, the opportunity for releasing a locked state of the film winding mechanism is one time, so that a function of the camera stops at the locked state of that if the above-mentioned releasing does not effected due to the above-mentioned trouble. Therefore, increasing of the opportunity as a one countermeasure is necessary. Meanwhile, if the camera is out of order due to the trouble relating to other factors, for example, non-detection of the releasing of the film winding mechanism nevertheless the releasing is effected, it is preferable for the camera that its operation system return to its initial stage.

Meanwhile, most of conventional cameras having a film winding mechanism for winding a film roll with one motor integrated therein are a type (so-called winder type) of camera which performs set-cocking of a spring adapted for a quick-return of a mirror and shutter-cocking in parallel with the film winding. On one hand, there is provided a camera having a function capable of performing a processing of a shutter release with a motor and capable of winding the film roll with a reversible direction of the same motor. In these types of cameras, the film roll is fed by a film sprocket and is wound by a spool. Accordingly, a friction mechanism for absorbing a difference of a peripheral speed between the sprocket and the spool is interposed therebetween. And it is so designed that the friction mechanism works always in operation of the film winding. In the camera, a lock mechanism for indexing a feeding amount of the film roll by the sprocket and locking a film winding mechanism is provided, and it is so arranged that the lock mechanism is dis-locked during a release process or at a return of a diaphragm and mirror. Accordingly, in order to wind the film roll, it is always necessary to carry out the release process. Therefore, a releasing operation is requested additionally nevertheless just a feeding operation of the film roll is requested in this case, similarly to an initial load process of the camera, so that an electric power is wasted and it takes a lot of times. In addition to the above, in the case of completion of photographing, a film winding process is always transferred at completion of the release process, so that it causes waste of time.

Recently, there are provided cameras which have a function that a film roll is directly wound around the spool by itself. Advantages of this type of cameras is to eliminate the above-mentioned friction mechanism. Therefore, there are disadvantages described above, and there is a merit that a time necessary for the film winding can be reduced. On the contrary to the above, there is a disadvantage in this camera that it is difficult to carry out the film winding operation in parallel with the shutter cocking operation through one motor since a rotational amount of the spool changes depending on a wound film therearound is and is not constant. The mechanism of the spool winding-type carry out the cocking process through the film. Accordingly, there is no problem for a lens shutter-type camera in which the cocking operation is carried out by a driven sprocket but that mechanism can not be applied to a single-reflex camera since a focal plain shutter requires a large amount of dynamic force. There are further disadvantages as follows. Namely, there is possibility that that a light leakage during a film rewinding operation is caused since the shutter cocking is not completed at sticking the film, and that the shutter is wounded by a film lip during an initial resetting operation after completion of the film rewinding operation.

On the other hand, if the cocking is completed before initiation of the film winding operation, it may be enabled that the releasing operation is initiated before completion of the film winding operation, so that it may be possible to increase a feeding speed of the film roll. In addition, in this case, there are an advantage that only the cocking operation is requested on the occasion of a multiexposure and completion of photographing. Under the circumstances, it is desirable that the cocking system and the film winding system are driven independently from each other, resulting in that most of recent camera have two motors and each system has own motor. It is called "a two motors driving system".

Meanwhile, each driving characteristic of the cocking system and the film winding system is different from each other. A load for winding the film roll varies at a low temperature, so that the operations of the cocking process may be fulfilled under one driving characteristic of the driving motor if the operations of the film winding process may not be fulfilled due to a lack of the motor power under that driving characteristic of the motor, for example, under a high rotational speed with low torque. On the contrary to the above, if the temperature rises, the operations of the film winding process may be fulfilled under that driving characteristic although the operations of the cocking process can be not fulfilled under that characteristic. Accordingly, it is preferable that the two systems are driven individually. An additional advantage of the two motors driving system is that the motor driving can be shifted through a reduction system depending on a current load which acts on the driven system, so that it contributes to a high speed operation of the camera.

For example, a camera which has been disclosed by (Japan Patent Laid-open Publication No. 62-8937(1987) has two motors and two transmission systems having different reduction ratios per one motor. The camera is so designed that shifting to a low speed side of each system is fulfilled at the same time when an extremely low speed of the film winding is detected by detecting means of the film feeding speed. As an another example of a conventional camera, speed detection means for detecting a film feeding speed is provided in each of the cocking system and the film winding system, and it is so designed that both systems are driven under a low speed driving mode shifted from a high speed driving mode when one of the speed detection means detects an extremely low speed of the film feed. In these examples, the driving mode of the two systems is shifted to the low speed side at the same time when the abnormal on the film feeding speed is detected, so that each of the systems is not always driven under a proper driving characteristic which meets with a current one required by the system. Accordingly, a driving efficiency of each of the systems does not always become high. That is one of the disadvantages to such a type of the conventional cameras. Further, a lot of devices such as two motors, four transmission systems in total, and so on, is required and a space in which these devices are accommodated is required in a camera body, so that it does not contributes to miniaturization and cost-down of a camera. This is another disadvantage to the conventional type camera.

As previously described, in order to accomplish the multi-exposure, the two motors driving system is more convenient because the cocking system can be only driven easily. However, one of disadvantages in this system, as aforementioned, is that a structure of the film winding mechanism and the cocking mechanism of the diaphragm, the shutter, and mirror becomes complicated. Further disadvantages are costly and a spacing problem in the camera body. The best way for accomplishing the multi-exposure must be to be fulfilled by a simple structure of the driving mechanism, as well as, by a simple operation for the multi-exposure photographing.

SUMMARY OF THE INVENTION

Accordingly, an essential object of the present invention is to provide an improved film winding system which has high reliability and high durability, as well as, capable of initiating a film winding operation with a relatively small dynamic force which is necessary for releasing a film winding mechanism from its restrained state.

An another object of the present invention is to provide an improved film winding system capable of having a same function as the two motors driving system with one motor.

A still another object of the present invention is to provide an improved film winding system which is driven at one of changeable driving characteristics, which meets with a current load acting on the system.

A further object of the present invention is to provide an improved film winding system capable of a multiexposure photographing with one motor and with a simple operation.

In accomplishing the above-mentioned objects according to one preferred embodiment of the present invention, there is provided an improved film winding system which comprises an electric motor driven so as to winding the film roll, film winding means driven by the motor, for winding the film roll, a lock mechanism for locking the film winding means, having a first lock member connected with the film winding means and a second lock member engaging with the first lock member so as to restrain an operation of the film winding means, releasing means for cancelling an engagement of the second lock member to the first lock member in advance before the film winding means is actuated, and a loosing mechanism driven by said motor, for reducing a degree of the engagement between the first and second lock members in advance before the releasing means is actuated.

Concretely, the above-mentioned film winding system is constructed as follows and it is preferable.

There is provided an improved film winding system which comprises an electric motor driven so as to winding the film roll, cocking means driven by the motor, for cocking respective mechanisms of a diaphragm, a mirror, and a shutter, film winding means driven by the motor, for winding the film roll, a lock mechanism for locking the film winding means, having a cam member connected with the film winding means and a swingable lock lever engaging with the cam member so as to restrain the operation of the film winding means, the swingable lock lever being urged along a first direction for its engagement with the cam member, detection means for detecting completion of a cocking operation of the cocking means, swingable lever means for making the swingable lock lever move along a second direction for a disengagement of the swingable lock lever, the swingable lever means being urged along the second direction, holding means for holding the swingable lever means at a predetermined position against a urging force, while cancelling the holding of the swingable lever means by actuating of the detection means, and a loosing mechanism driven by the motor, for making the swingable lock lever move slightly in the second direction for reducing a degree of the engagement between the swingable lock lever and the cam member in advance before the swingable lever means is actuated.

According to the above-mentioned structure, on the occasion of a stoppage of the film winding means effected by the lock mechanism, i.e., effected in cooperation with the cam member and the swingable lock lever, the engagement between the cam member and the lock lever comes into tension. If the cancellation of the engagement is effected under this condition, a heavy dynamic force for the cancellation is required. However, in the film winding system, the loosing mechanism operates to making the swingable lock lever move slightly in the second direction for reducing a degree of the engagement between the swingable lock lever and the cam member in advance before the swingable lever means is actuated, so that the cancellation of the engagement is effected by a light dynamic force. Accordingly, it is allowed that a capacity of the holding means is small. In other words, it allows members comprised of the holding means to become miniature, resulting in that a camera body is miniaturized and cost-down of a camera is achieved. In addition, since the cancellation is effected with the small capacity, it is ensured to cancel the engagement by the holding means without fail. Then, the reliability of the film winding system is improved.

Further, in accomplishing the above-mentioned objects according to one preferred embodiment of the present invention, there is provided an improved film winding system having an electric motor, cocking means driven by the motor for cocking respective mechanisms of a diaphragm, a mirror, and a shutter, and film winding means driven by the motor for winding the film roll, which further comprises a differential gearing driven by the motor for driving the cocking means and the film winding means, individually, first lock means driven by the motor for locking the film winding means so that the film winding means does not operate, second lock means provided in the cocking means for locking the cocking means so that the cocking means does not operate, first detection means for detecting whether or not the first lock means locks the film winding means, second detection means for detecting whether or not the second lock means locks said cocking means, interlock control means for controlling the first lock means so that the first lock means operates when the cocking means is in operation, and control means for controlling execution to initiate a first operation, a second operation, and a third operation, sequentially, wherein the first operation represents to initiate drive of the motor and actuate the cocking means through the drive of the motor, and the second operation represents that actuating of the interlock control means is caused to stop and locking of the first lock means is cancelled when the second detection means detects that the second lock means locks the cocking mean, and the third operation represents that the motor is turned off when the first detection means detects that the first lock means locks the film winding means.

According to the above-mentioned structure, the motor drive the film winding means and the cocking means through the differential gearing. The respective means have the first and second lock means. Further, two operations of the winding and cocking are interlocked with each other by the interlock control means, so that both operations are not effected. And the control means controls the film winding system so that the first, second, and third operations are sequentially effected. Accordingly, the two systems, i.e., the film winding system and the cocking system of the predetermined mechanism, are driven by the one motor through the differential gearing. Further, the cocking operation is first, then the winding operation is subsequent to that. Therefore, the multi-exposure is available in this film winding system if the control means controls the film winding system so as to prohibit the winding operation.

It is preferable that the above-mentioned differential gearing is so designed as follows. The differential gearing comprises an input gear for inputting a driving force of said motor, the input gear rotatably fitted around a first shaft which is rotatably supported with a camera body, planetary gears driven by the input gear, which gear into the input gear, wherein the planetary gears comprise at least one wheel, a first driving gear for driving the cocking means, the first driving gear rotatably supported around the first shaft and supporting the planetary gears with a shaft provided therewith, a carrier rotatably together with the first shaft and the first driving gear, and a second driving gear for driving the film winding means, the second driving gear rotatably fitted to the first shaft and provided with an internal toothed gear which is disposed so as to gear into the planetary gears.

The respective rotations of the first and second driving gears are controlled depending on the loads acting on them. That is, if the load acting on the first driving gear is heavier that that on the second driving gear, the second gear can rotate. On the contrary to that, the first gear can rotate. Therefore, on the occasion of the cocking operation, the second gear is restrained, and on the occasion of the winding operation, the first gear is restrained. Thus, the driving force of the motor is distributed to the two systems.

Further, it is preferable to additionally provide the following structure in the film winding system. That is, there is provided detection means for detecting the cancellation of a locked state of the film winding means by the lock mechanism. There is further provided driver control means for controlling the releasing means for releasing the locked state so that the releasing means operates at a predetermined timing as well as for controlling the motor so that that motor is driven in a direction of the film winding and in an opposite direction to that alternatively at an interval of a short period, There is still further provided control means for controlling initiating signals to operate one of the film winding means and the driver control means in response to an operating condition of the detection means at the time when a predetermined time passes, after a cancellation order of the locked state by the releasing means is effected. The above-mentioned arrangement is more effective for reducing the load acting on the lock mechanism of the film winding means.

In accomplishing the above-mentioned objects, according to one preferred embodiment of the present invention, there is provided an improved film winding system having an electric motor which has a plurality of different driving characteristics and which is driven so as to winding a film roll, cocking means driven by the motor for cocking a predetermined mechanism and film winding means by which the film roll is wound, whereby the film roll is wound by the motor through the film winding means after a cocking operation of the predetermined mechanism by the motor is completed, which further comprises switching-over means for switching over the driving characteristics of the motor, first detection means for detecting completion of a film winding operation of a frame of the film roll to be wound, second detection means for detecting completion of the cocking operation of the predetermined mechanism, and control means for selectively controlling the switching-over means depending on a setting mode which is desirably set up so as to select one of the driving characteristics of the mode as well as for controlling the switch-over means so as to select the one driving characteristic of the motor corresponding to a current driving load condition required for the motor if each completion of the film winding operation and the cocking operation is not detected by the first and second detection means, correspondingly.

According to the above-mentioned arrangement, depending on the load conditions acting on the respective means, i.e., the film winding means and the cocking means, the driving characteristics of the motor are selected so as to correspond with the suitable one. And the selection is individually effected for each of the film winding means and the cocking means as well as based on the setting mode which is desirably set up. Further, the load condition acting on each of the means is monitored and decided through the first and second detection means by means of the time. Accordingly, the driving efficiency of the driving system becomes more better, and the structure of the driving system is more simplified. Further, any detecting means for detecting the driving speed are not required due to the time monitoring available.

In accomplishing the above-mentioned objects, according to one preferred embodiment of the present invention, there is provided an improved film winding system which is so designed as to carry out a cocking operation subsequent to a exposure operation, including an electric motor, a film feed mechanism driven by the motor for feeding a film roll, cocking mechanism driven by the motor for cocking a predetermined mechanism, a transmission mechanism for transmitting a driving force of the motor to one of the film feed mechanism and the cocking mechanism when the other is locked, a first lock mechanism so designed as to lock the cocking mechanism at the time when a cocking operation of the cocking mechanism is completed and to dis-lock the cocking mechanism at the time when a feeding operation of a frame of the film roll of the film feed mechanism is completed, and a second lock mechanism so designed as to lock the film feed mechanism each time when the feeding operation of the one frame of the film roll is completed and to dis-lock the film feed mechanism at the time when the cocking operation is completed, the film winding system further comprising: operation means operated so as to generate an order to initiate a multi-exposure at the time when a multi-exposure photographing is effected, holding means for operating in response to the order of the operation means so as to hold a locked state of the film feed mechanism by the second lock means regardless of the completion of the cocking operation, and control means for controlling the motor so that the motor is driven after the completion of the exposure operation as well as in operation of said holding means.

According to the above-mentioned arrangement, if the operation means is operated, the film feed mechanism is controlled so as not to work. Therefore, the frame of the film roll stays as it is and the exposure operation can be effected since the cocking operation has been completed. Thus, the multi-exposure is effected if the above-mentioned operation is repeatedly taken. As the multi-exposure photographing is effective with one motor, the driving transmission system including the motor becomes simplified, resulting in that it contributes cost-down of the camera. Further, in order to accomplish the multi-exposure photographing, only operation means, i.e., concretely, a switch button and an electric switch associated with the switch button, is requested. That is, in the above-mentioned film winding system, a selector switch for selecting the multi-exposure photographing mode is only requested since an automatic film winding-type camera is normally controlled by a microcomputer and a change of a soft-ware is easily done.

BRIEF DESCRIPTION OF THE DRAWINGS

These and other objects and features of the present invention will become clear from the following description taken in conjunction with the preferred embodiments thereof with reference to the accompanying drawings, in which:

FIGS. 13, 14, 15, and 16 are, respectively, timecharts, FIG. 13 showing an operation procedure during feeding one frame of a film roll FIG. 14 showing an operation procedure at initial loading of the film, FIG. 15 showing an operation procedure at the time when the film is stuck at its final frame of the film roll, FIG. 16 showing an operation procedure at the time when the rewinding is initiated on the way to the final frame of the film roll;

FIGS. 28A and 28B are flow-charts of a routine of a initial loading processing, which is divided into two portions, in the another embodiment;

DETAILED DESCRIPTION OF THE INVENTION

Figure 1:
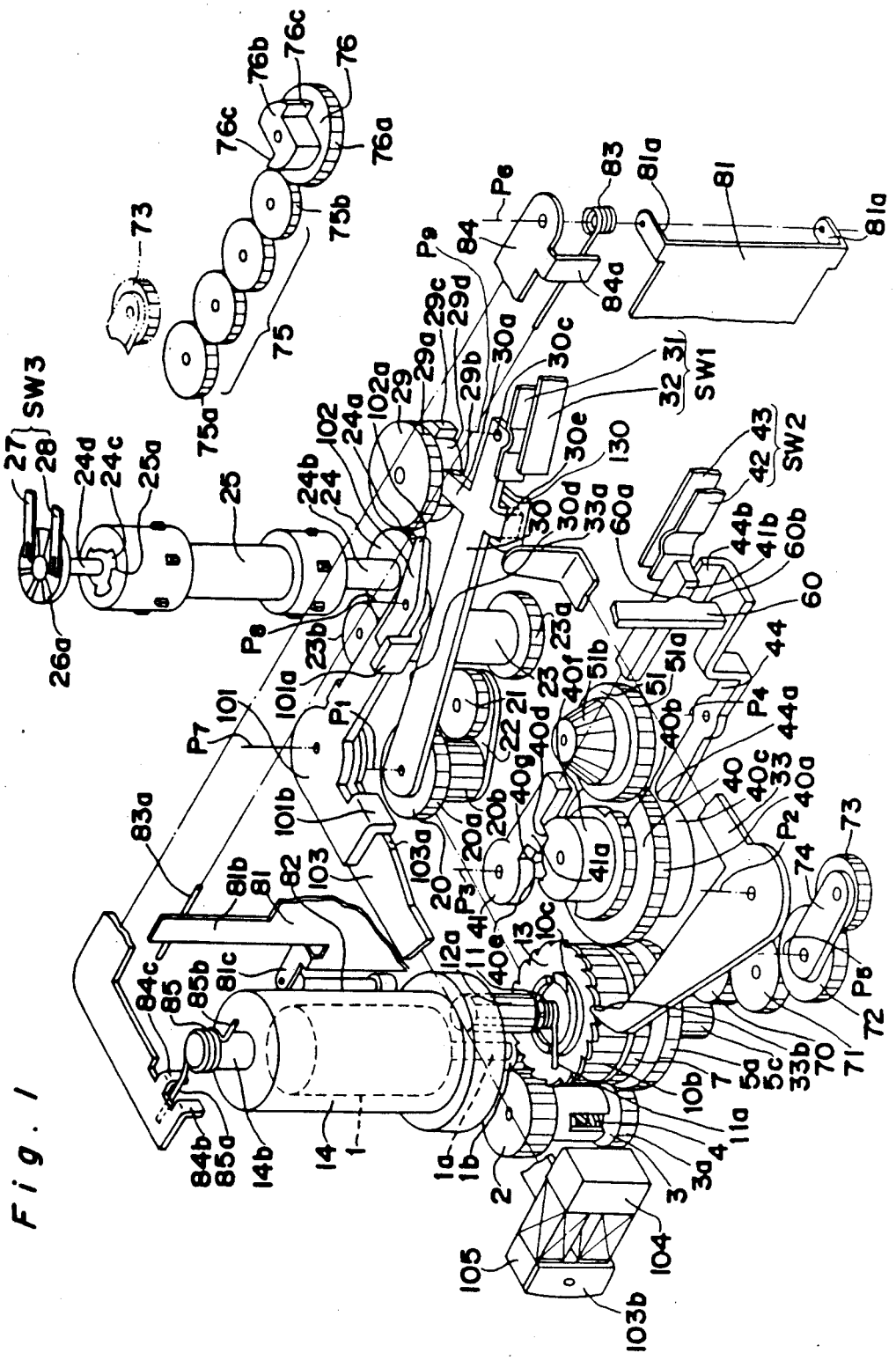
FIG. 1 is a perspective illustration of a total mechanism on film winding and rewinding of a camera according to one preferable embodiment of the present invention.

Before the description of the present invention proceeds, it is to be noted that like parts are designated by like reference numerals throughout the accompanying drawings, unless otherwise remark is committed.

Figure 4:
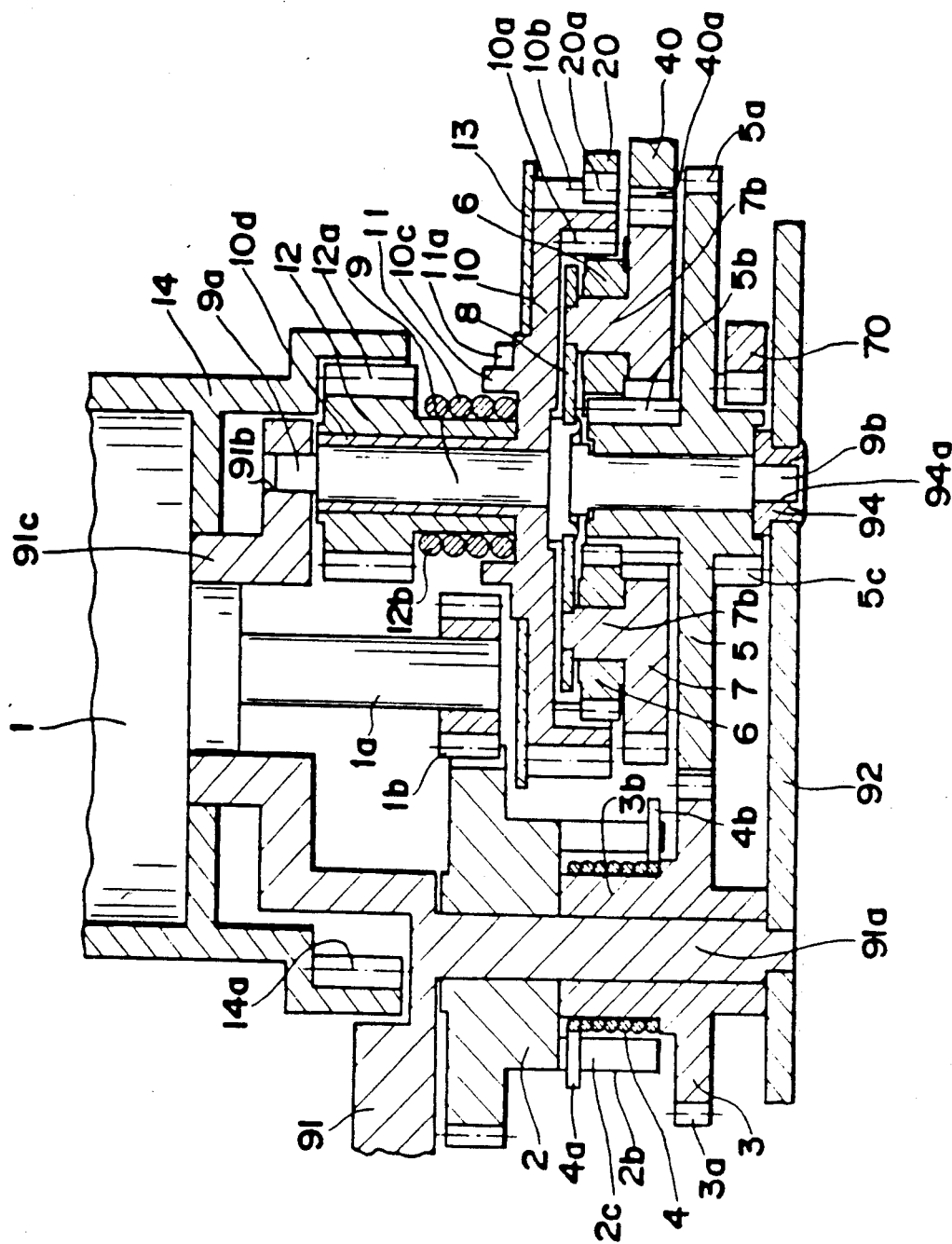
FIG. 4 is a sectional view showing transmission of motor driving from a motor to the main planetary gearing.

Referring now to FIG. 1, there is shown a film winding and rewinding mechanism of this embodiment according to the present invention. In FIG. 1, a reference numeral 1 designates a motor for winding and rewinding film, the motor 1 being disposed internally in a spool 14. As shown in FIG. 4, a pinion gear 1b is fixed onto a motor shaft 1a of the motor 1 and the pinion gear 1b engages with a driven gear 2. Beneath the driven gear 2, a friction gear 3 is arranged, which rotates around a common axis, of a shaft 91a, with the driven gear 2. Around an outer surface of an upper portion 3b of the friction gear 3, there is provided a kick spring 4. The driven gear 2 is provided with two vertical walls 2b, 2e, shown by an alternate long and short dash line in FIG. 5, which extend downwards from a bottom surface of the driven gear 2, respectively. Two arms 4a, 4b at coil ends of the kick spring 4 extend outwards from spacings between the two vertical walls 2b, 2e. When the driven gear 2 rotates counter-clockwise, the friction gear 3 is caused to rotate counter-clockwise through the kick spring 4 since the kick spring 4 is caused to rotate by one side 2c of one 2b of the vertical walls 2b, 2e of the driven gear 2. On the other hand, when a predetermined load is given to the friction gear 3, the kick spring 4 and the friction gear 3 slip each to each, resulting in that the rotation of the driven gear 2 is not transmitted to the friction gear 3. When the driven gear 2 rotates clockwise, the other side 2d of the vertical wall 2b pushes the other arm 4b of the kick spring 4, resulting in that the friction gear 3 is caused to rotate clockwise. Further, similarly to the rotation of the counter-clockwise, the kick spring 4 and the friction gear 3 slip each to each when the predetermined load is given to the friction gear 3, resulting in that the rotation of the driven gear 2 is not transmitted to the friction gear 3. Although the spring having the above-mentioned function is applied in this embodiment, it is so designed that the two members slip each to each, a compression spring being applied instead of the spring with the arms, when the predetermined load is given to the friction gear 3.

Figure 3:
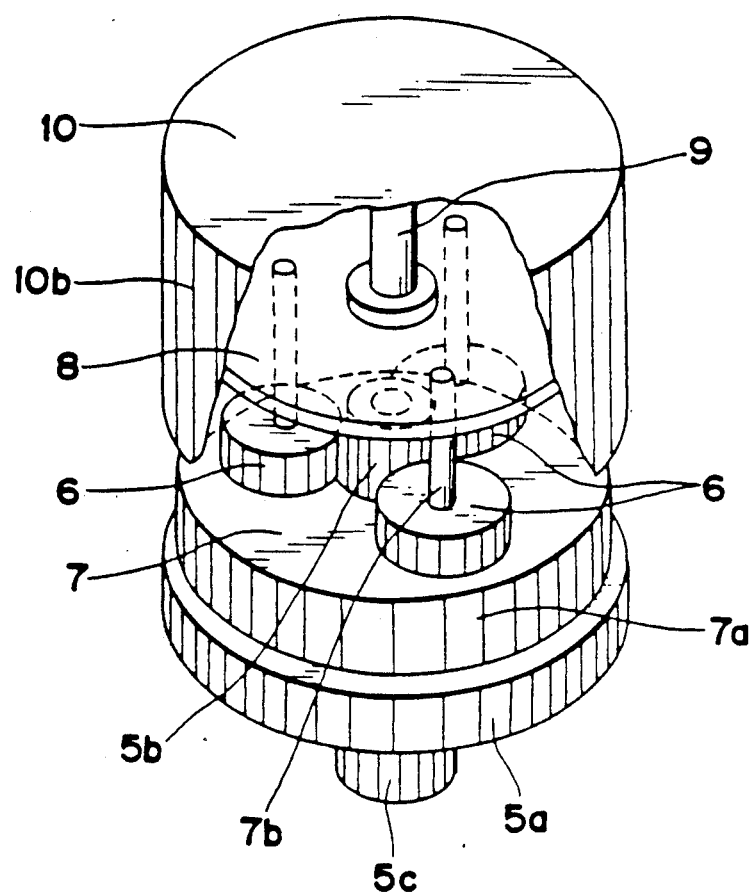
FIG. 3 is a perspective illustration showing a main planetary gearing as a differential gearing provided in the total mechanism.

A spur gear 3a integratedly provided for the friction gear 3 engages with a large wheel 5a integratedly provided for a 1st. combination gear 5. As shown in FIG. 3, a 1st. sun gear 5b provided similarly for the 1st. combination gear 5 engages with three planet gears 6, 6, 6. These 1st planet gears 6 are rotatably provided around shafts 7b which are, respectively, formed as a one body with a gear wheel 7. The respective shafts 7b are fixed to a carrier plate 8 at their upper portions. The carrier plate 8 is fixed to a shaft 9 so as to rotate together with the shaft 9. Accordingly, the gear wheel 7 and the shaft 9 rotate together with each other as a whole. As shown in FIG. 4, the shaft 9 is so arranged in such a manner that its upper end portion 9a engages rotatably to a hole 91b formed in a base plate 91 fixed to a body (not shown) and its lower end portion 9b is supported with a bearing 94 provided in another base plate 92 which is fixed to the body (not shown). This shaft 9 is also rotating axes for the 1st. combination gear 5 and a 2nd. combination gear 10 in common, i.e., both gears 5, 10 are supported by the shaft 9 at respective predetermined positions. The three 1st. planet gear 6s engage with an internal gear 10a formed inside the 2nd. combination gear 10. The following gears and member; the 1st. sun gear 5b of the 1st. combination gear 5, the 1st. planet gears 6, the internal gear 10a of the 2nd. combination gear 10, the supporting gear 7, and the carrier plate 8, are comprised of a planetary gearing. That is, according to the planetary gearing of the above, the 2nd. combination gear 10 is caused to rotate through the internal gear 10a by rotation of the 1st. planet gear 6, and the supporting gear 7 and the carrier plate 8 are caused to rotate together with the shaft 9 as a whole by revolution of the 1st. planet gear 6. It is decided by which of loads operated upon the 2nd. combination gear 10 or the supporting gear 7 is light whether the 1st. planet gear 6 rotates on its axis or the 1st. planet gear 6 revolves around the 1st. sun gear 5b. In FIG. 4, a spool driving gear 12 which is rotatable therearound is arranged around an upper portion 10d of the 2nd. combination gear 10, and a coil spring 11 is disposed on to an outer surface of a lower portion 12b of the spool driving gear 12. An arm 11a which is formed, as a one body, at a coil end of its lower side of the spring 11 protrudes outwards in the radial direction and the arm 11a engages to a notch formed in a ring-shaped projection 10c provided for the 2nd. combination gear 10. A rotation of the 2nd. combination gear 10 is transmitted to the spool driving gear 12 through the coil spring 11. The spool driving gear 12 engages with an internal gear 14a which is, as a whole, provided for a spool 14 and the spool 14 is caused to rotate when the spool driving gear 12 rotates. A transmittable torque from the 2nd. combination gear 10 to the spool driving gear 12 via the spring 11 is set to a torque so that it may be sufficient enough for the spool 14 to wind film. Therefore, there is no slip between the spring 11 and the spool driving gear 12 on winding the film in normal conditions. This spring 11 is provided for the purpose of that an operator draws the film out which coils round the spool 14 with his hand after the operator opens a rear lid of a camera without rewinding the film. In that case, the spring 11 and the spool driving gear 12 is to slip each to each.

As shown in FIG. 1, a external gear 10b is provided in a periphery of the 2nd. combination gear 10 and the external gear 10b engages with a toothed wheel 20a provided for a 3rd. combination gear 20. A 2nd. sun gear 20b provided in a lower section of the 3rd. combination gear 20 engages with a 2nd. planet gear 21 which is supported with a carrier 22 rotatably around a same rotational axis P1 as that of the 3rd. combination gear 20. Further, a toothed wheel 23a of a intermediate combination gear 23 is arranged so as to confront the 2nd. planet gear 21. When the 3rd. combination gear 20 rotates clockwise, the carrier 22 rotates in the same direction, as well, and the 2nd. planet gear 21 and the toothed wheel 23a of the intermediate combination gear 23 are engaged with each other.

Figure 2:
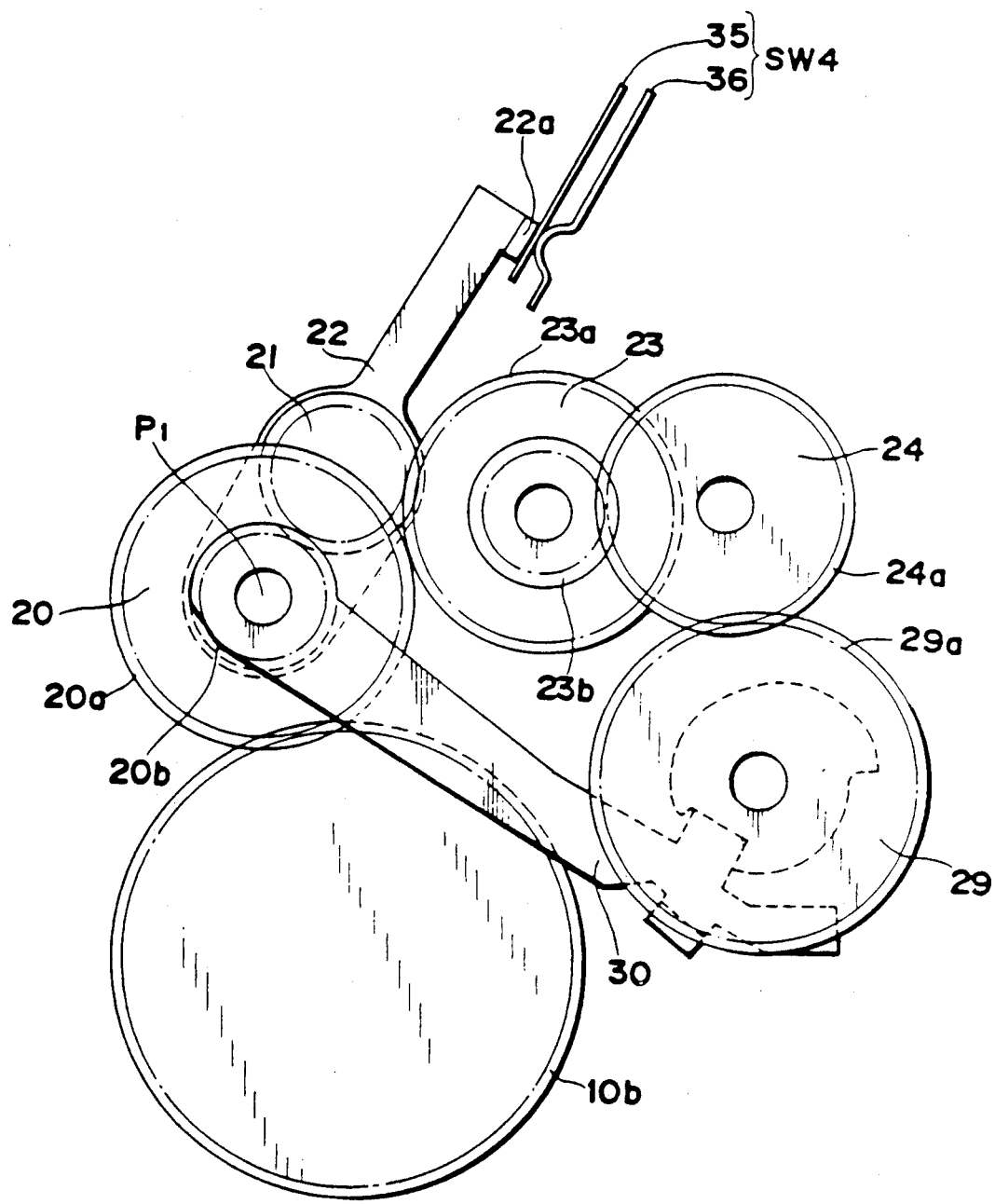
FIG. 2 is a plan view of a planetary gearing for automatically transmitting motor driving to either a spool or a film sprocket.

FIG. 2 shows a gears train from the 2nd. combination gear 10 to a film winding controller 29. At a bent top end 22a) provided for the carrier 22, a springy contact plate 35 is brought into contact with thereto. A springy contact plate 36 is arranged so as to confront the springy contact plate 35. The springy contact plate 35 and the springy contact plate 36 are comprised of a fourth switch SW4 (the switch is not shown in FIG. 1). This switch SW4 is at an ON-state when the 2nd. planet gear 21 engages with the toothed wheel 23a of the intermediate combination gear 23 (state shown in the drawing), while the switch SW4 is at OFF-state when that engagement is cancelled.

Figure 6:
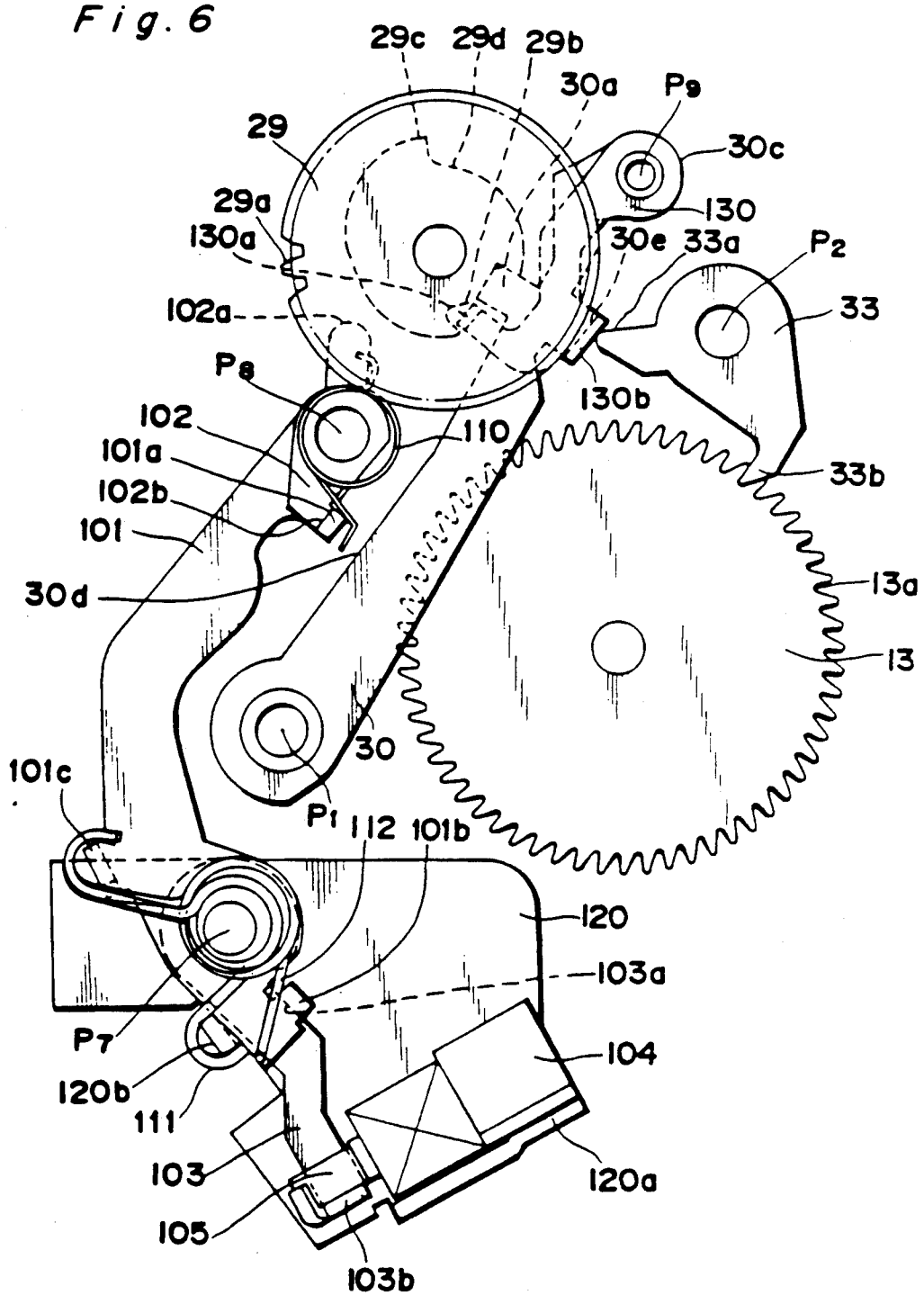
FIGS. 6, 7, and 8 are, respectively, plan views showing a stopper device of the film winding mechanism, FIG. 6 showing a state at completion of the film winding, FIG. 7 showing a state directly before completion of the film winding with braking operation, FIG. 8 showing a state in operation of the film winding.

A pinion gear 23b is provided at an upper section of the intermediate combination gear 23, and the pinion gear 23b engages with a sprocket driving gear 24a of a film sprocket driver 24. The film sprocket driver 24 has a main shaft 24b provided onto the sprocket driving gear 24a and has a projecting member 24c at its upper section engaging a recession 25a provided for a film sprocket 25 and additionally has a top shaft 24d mounted thereonto, onto a top of which a code plate 26 is mounted stationarily and rotates together with the top shaft 24d. A pattern 26a is formed on the code plate 26 and a pair of a slidable contactors 27, 28 is disposed thereon. The code plate 26 and a pair of the contactors 27, 28 are comprised of a third switch SW3. Namely, when the code plate 26 rotates, the third switch SW3 is turned on or off depending to the pattern 26a. The sprocket driving gear 24a of the film sprocket driver 24 engages with a gear 29a of a film winding controller 29, additionally. The film winding controller 29 has a cam 29d beneath the gear 29a, integratedly. The cam 29d is provided with a recession 29b and a projection 29c. The recession 29b engages a 1st. projection 30a provided for a 1st. lock lever 30 which is rotatable in any direction around a same rotational axis $P_1$ as that of the 3rd. combination gear 20 as well as independently rotatable of the 3rd. combination gear 20. Moreover, as shown in FIG. 6 since an extra space to draw following members is so limited in FIG. 1, the 1st. lock lever 30 is provided with a 2nd. lock lever 130 rotatable around a rotational axis $P_9$ positioning adjacently to a top end 30c of the 1st. lock lever 30. And both of a 1st. projection 30a provided for the 1st. lock lever 30 and a bent portion: a projection 130a provided for the 2nd. lock lever 130 engage with the recession 29b of the film winding controller 29. Still further, an another bent portion: a bent member 130b provided for the 2nd. lock lever 130 is kept in contact with a bill-shaped projection 33a provided for a claw lever. In the claw lever, a claw 33b is further provided, which is so designed as to engage a engagement plate 13 which is attached onto the 2nd. combination gear 10 and rotates together therewith. The engagement plate 13 controls to stop rotation of the counterclockwise direction of the 2nd. combination gear 10. The claw lever is urged in the clockwise direction by a spring (or any other elastic member) which is not shown so as to maintain the engagement with the engagement plate 13. When the 1st. projection 30a of the 1st. lock lever 30 is associated with the recession 29b of the film winding controller 29, the engagement therebetween is maintained. The 1st. lock lever 30 is urged in the counterclockwise direction by a springy contact plate 31 which is positioned at the top end 30c of the 1st. lock lever 30 and is kept in close contact therewith. Further, a springy contact plate 32 is located at a certain position where the springy contact plate 31 confronts it. Then, the springy contact plate 31 and the springy contact plate 32 are comprised of a first switch SW1. When the 1st. projection 30a of the 1st. lock lever 30 is engaging with the recession 29b of the film winding controller 29, the first switch SW1 keeps under the OFF-state. Further, the 1st. lock lever 30 is provided with a 2nd. projection 30e which comes in contact with the bent member 130b at its inside surface.

Figure 9:
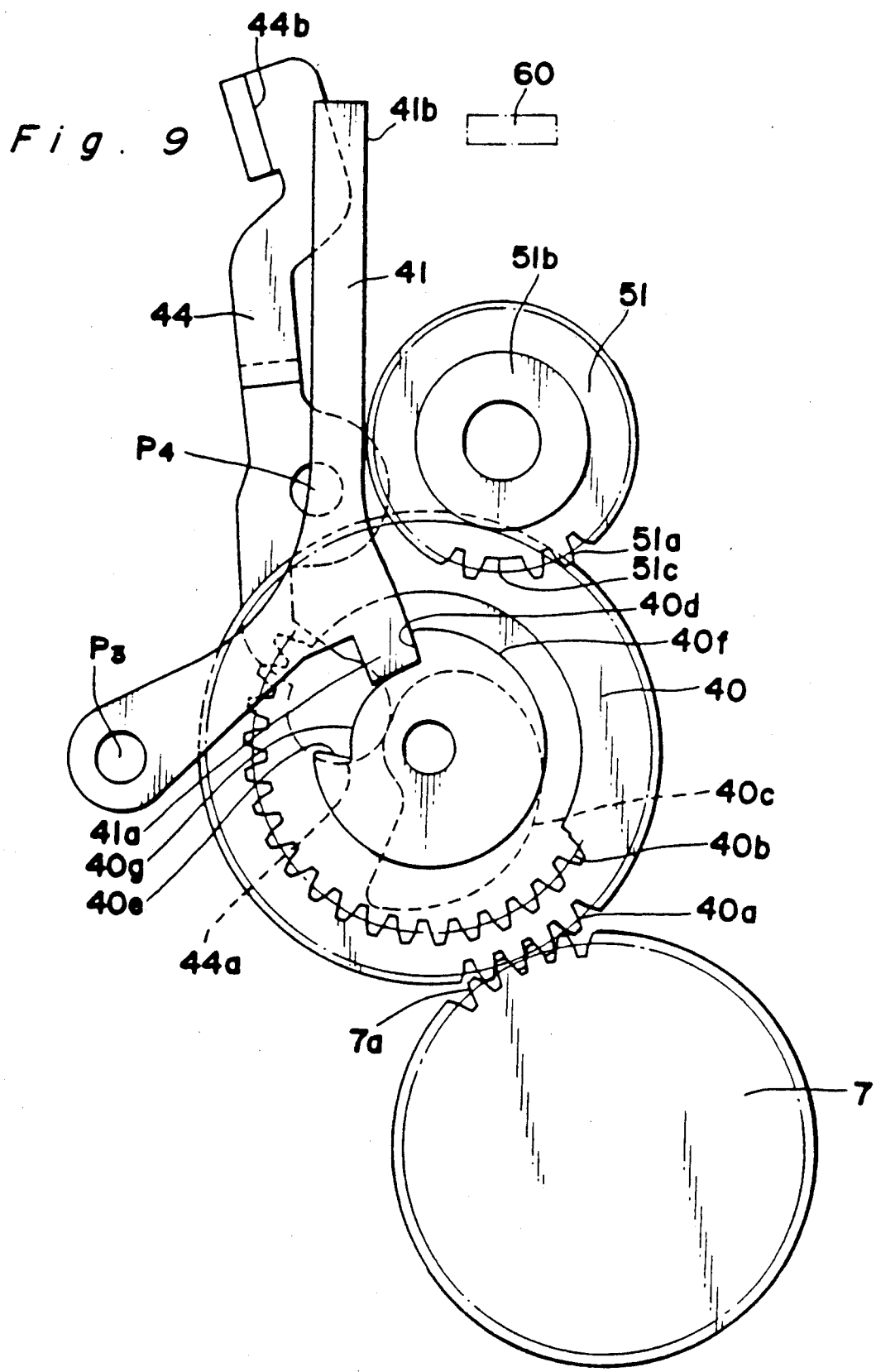
FIGS. 9, 10, and 11 are, respectively, plan views showing a stopper device of a charging mechanism for a diaphragm, a mirror, and a shutter, FIG. 9 showing a state at completion of the charging, FIG. 10 showing a state of completion of shutter releasing a well as directly before initiation of the film winding, FIG. 11 showing a state in operation of the charging.

The supporting gear 7 engages with a gear wheel 40a of a cam controller 40, as shown in FIG. 1. More specifically, as shown in FIG. 9, the cam controller 40 comprises a halfway gear 40b, a cocking cam 40c for cocking a shutter mechanism and a mirror moving mechanism, and a cam stopper 40f for controlling a motion of winding the film. In case where the cam controller 40 rotates counterclockwise with a predetermined rotational amount, the halfway gear 40b engages with a spur gear 51a of a diaphragm cocking gear 51. Then, a bevel gear 51b provided at an upper hand of the diaphragm cocking gear 51 rotates and a diaphragm ring (not shown) is caused to rotate by an engaged bevel gear (not shown) therewith so as to fully open a diaphragm of a lens. A top end 44a at one end of a 1st. cocking lever 44 which is urged counterclockwise as well as is rotatable around a rotational axis $P_4$ is kept in close contact with a cocking cam 40c. A bent member 44b at the other end of the 1st. cocking lever 44 is located at a place where the bent member 44b confronts a top end 60b of a connecting lever 60 which is connected with the shutter and mirror operation mechanism (not shown). The cam stopper 40f has a recession 40g and engages with a projection 41a of a cocking control lever 41 which is urged clockwise by a springy contact plate 42 as well as is rotatable around a rotational axis $P_3$. It is to be noted that it is so designed that a width of the recession 40g becomes larger than that of the projection 41a. A extension arm end 41b of the cocking control lever 41 confronts the top end 60b of the connecting lever 60 provided for the connecting lever 60. The springy contact plate 42 and a springy contact plate 43 located so as to face the springy contact plate 42 are comprised of a second switch SW2. When the projection 41a of the cocking control lever 41 is engaging with the recession 40g of the cam controller 40, the second switch SW2 keeps under the OFF-state.

The 1st. combination gear 5 has a small gear 5c at its lower section and its rotation is transmitted to a 1st. rewinding gear 71 via a gear 70 which is engaged with the small gear 5c and rewinding gears 72, 73 which are engaged one after another. The 2nd. rewinding gear 72 engages with a 3rd. rewinding gear 73 which is rotatably supported at a front end of a carrier 74 which is rotatable around a common rotational axis $P_5$ with that of the 2nd. rewinding gear 72. The 3rd. rewinding gear 73 is disposed so as to face a input gear 75a of a rewinding gears train 75, the input gear 75a located at the most left hand of the rewinding gears train 75. An output gear 75b which is located at the most right hand of the rewinding gears train 75 engages with a gear wheel 76a to a film roller driving gear 76. The film roller driving gear 76 has a film roll driver 76b which is formed integrally therewith and the film roller driver 76b is associated with a shaft of a patrone. When the film roller driver 76b rotates clockwise, the shaft of the patrone is caused to rotate by a claw 76c of the film roller driver 76b, then the film is rewound up into the patrone.

Figure 12:
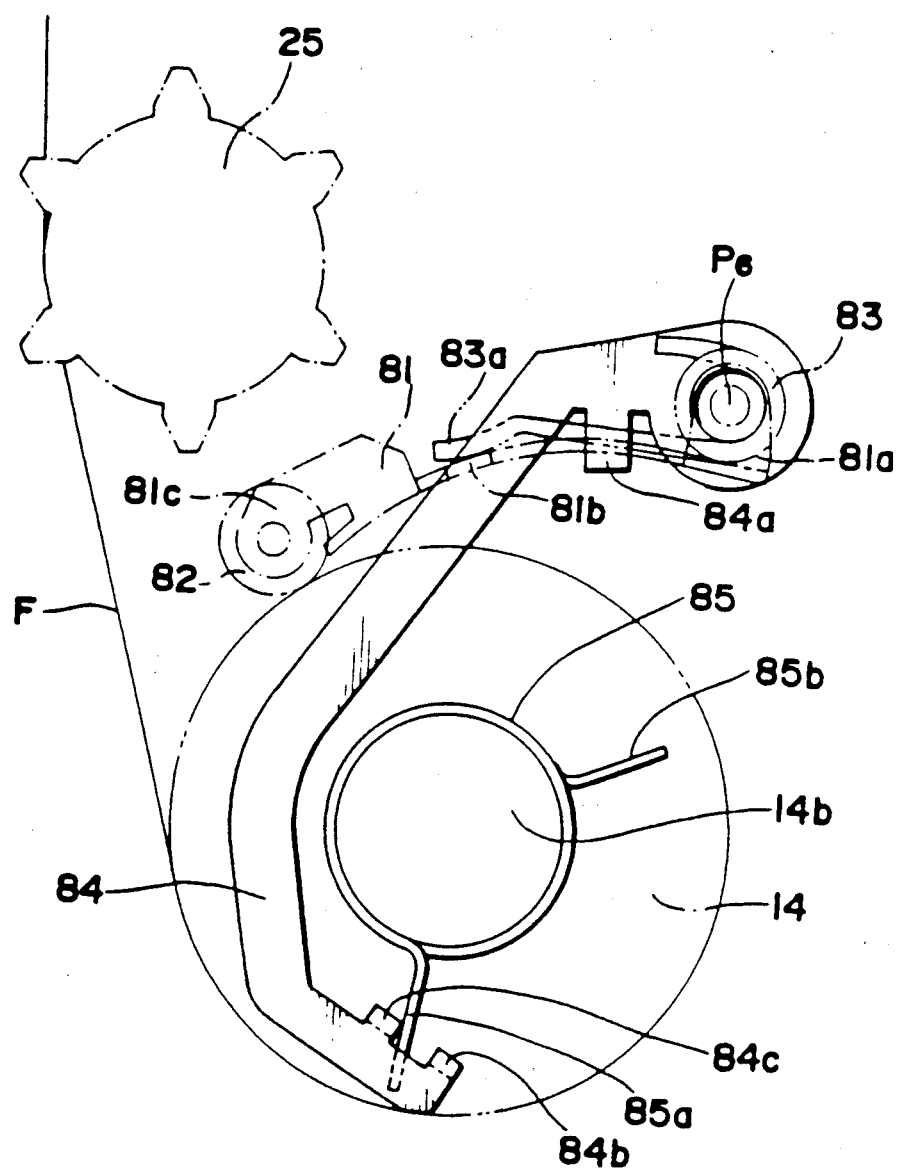
FIG. 12 is a top plan view around a spool.

As shown in FIG. 12, a roller 82 which is kept in contact with the spool 14 and presses the film is rotatably supported with a shaft arranged in a roller holder 81 which is rotatable around a rotational axis $P_6$, the roller holder 81 having a supporting member 81c of the roller 82 at its free end and the shaft being provided therewith. The roller holder 81 has a projecting member 81b which extends upward, the projection member 81b pushed in the left hand direction by an arm 83a of a torsion coil spring 83, so that the roller holder 81 is urged in the counterclockwise direction, resulting in that the roller 82 is kept in close contact under pressure with the spool 14. A cylindrical section 14b which is uprightly formed at an upper section of the spool 14 is provided with a coil spring 85. An upper arm 85a, in a coil end at an upper hand, of the coil spring 85 is interlocated between a pair of bent member 84b, 84c at a front end of a roller releasing lever 84 which is rotatable around a common rotational axis $P_6$ with that of the roller holder 81. A bent member 84a which is located close to the rotational axis $P_6$ of the roller releasing lever 84 charges the torsion coil spring 83 when the roller releasing lever 84 rotates clockwise. At this time, the arm 83a of the torsion coil spring 83 is away from the projecting member 81b of the roller holder 81, thus resulting in that the roller holder 81 is free from a urging force generated by the torsion coil spring 83.

Referring to FIG. 6, there is provided a rewinding release lever 101 which is rotatable around a rotational axis $P_7$ and is arranged so as for a 1st. projection member 101a to confront a side body 30d of the 1st. lock lever 30, the 1st. projection member 101a provided adjacently to a free end of the rewinding release lever 101. And, there is disposed a cocking lever 102 which is rotatable around a rotational axis $P_8$, positioned closely to the 1st. projection member 101a and supported on the rewinding release lever 101 with a shaft thereof. The cocking lever 102 is urged counterclockwise by a 1st. torsion coil spring 110 which is disposed around the axis $P_8$, while a free end 102b of the cocking lever 102 is kept in contact with the 1st. projection member 101a of the rewinding release lever 101 so that movement of that direction of the cocking lever 102 is controlled. An another free end 102a of the cocking lever 102 is so designed as to be kept in contact with the projection 29c of the film winding controller 29. Further, in a back side of the rewinding release lever 101, there is disposed a holder lever 103 which is rotatable around the common rotational axis $P_7$ with that of the rewinding release lever 101. A free end 103b of the holder lever 103 is provided with a attracted piece 105 which is attracted by a magnet unit 104. The magnet unit 104 comprises a combination magnet including permanent magnets and normally attracts the attracted piece 105. On the other hand, the magnet unit 104 is so designed that an attraction force of the magnet unit 104 is extinguished when electricity is supplied to the magnet unit 104. The magnet unit 104 is attached to a supporting member 120a of a base plate 120 fixed to a camera body (not shown). Both of the levers 101 and 103 are assembled with 2nd. and 3rd. torsion coil springs 111 and 112 as follows. That is, one end of the 3rd. torsion coil spring 112 is hooked up with a 3rd. projection member 101c provided for the rewinding release lever 101 and the other end of that 112 is hooked up with the holder lever 103 so that a 2nd. projection member 101b provided for the rewinding release lever 101 and a side body 103a of the holder lever 103 come in contact with each other. Further, one end of the 2nd. torsion coil spring 111 is hooked up with the 3rd. projection member 101c and the other end of that 111 is hooked up with a projecting member 120b provided for the base plate 120 so that the rewinding release lever 101 is urged so as to rotate in the clockwise direction by the 2nd. torsion coil spring 111. It is to be noted that it is so arranged that the attraction force of the magnet unit 104 is stronger than the urging force of the 2nd torsion coil spring 111. Consequently, both of the rewinding release lever 101 and the holder lever 103 can not rotate clockwise when the attracted piece 105 is attracted to the magnet unit 104. On the other hand, when electricity is supplied to the magnet unit 104, the attraction force is extinguished from the magnet unit 104. Then, the rewinding release lever 101, the cocking lever 102, and the holder lever 103 rotate clockwise around the rotational axis P7, as a whole, by virtue of the 2nd. torsion coil spring 111, and the 1st. projection member 101a comes in contact with the side body 30d of the 1st. lock lever 30, consequently. In case where the 1st. lock lever 30 is pushed in the clockwise direction by the rewinding release lever 101, the 1st. lock lever 30 may rotate in that direction against the urging force of the counterclockwise direction.

Figure 5:
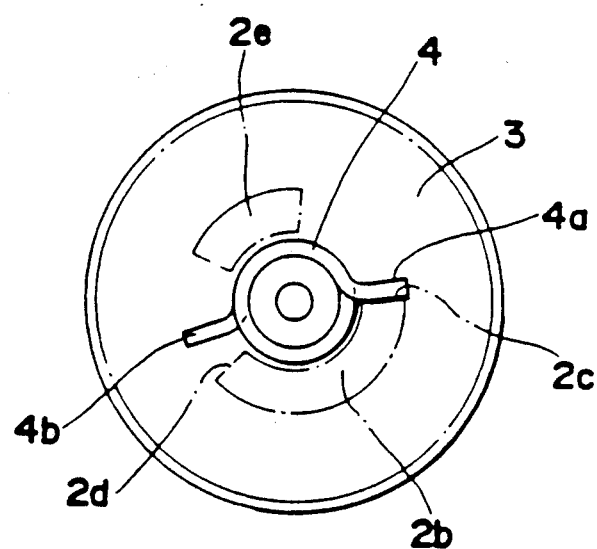
FIG. 5 is a top plan view of an anti-overloading device provided in transmission system of the motor driving.
Figure 8:
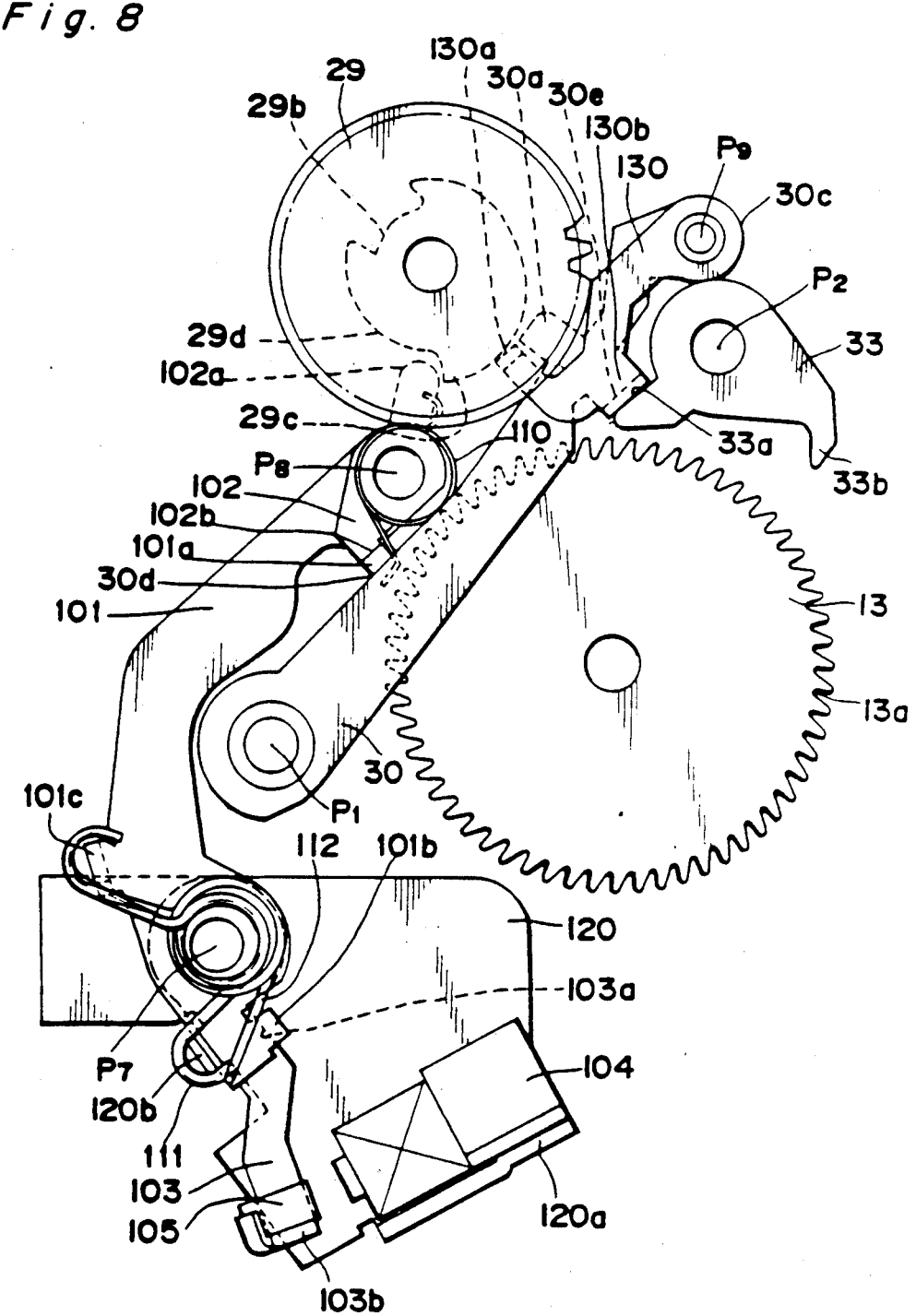
Figure 10:
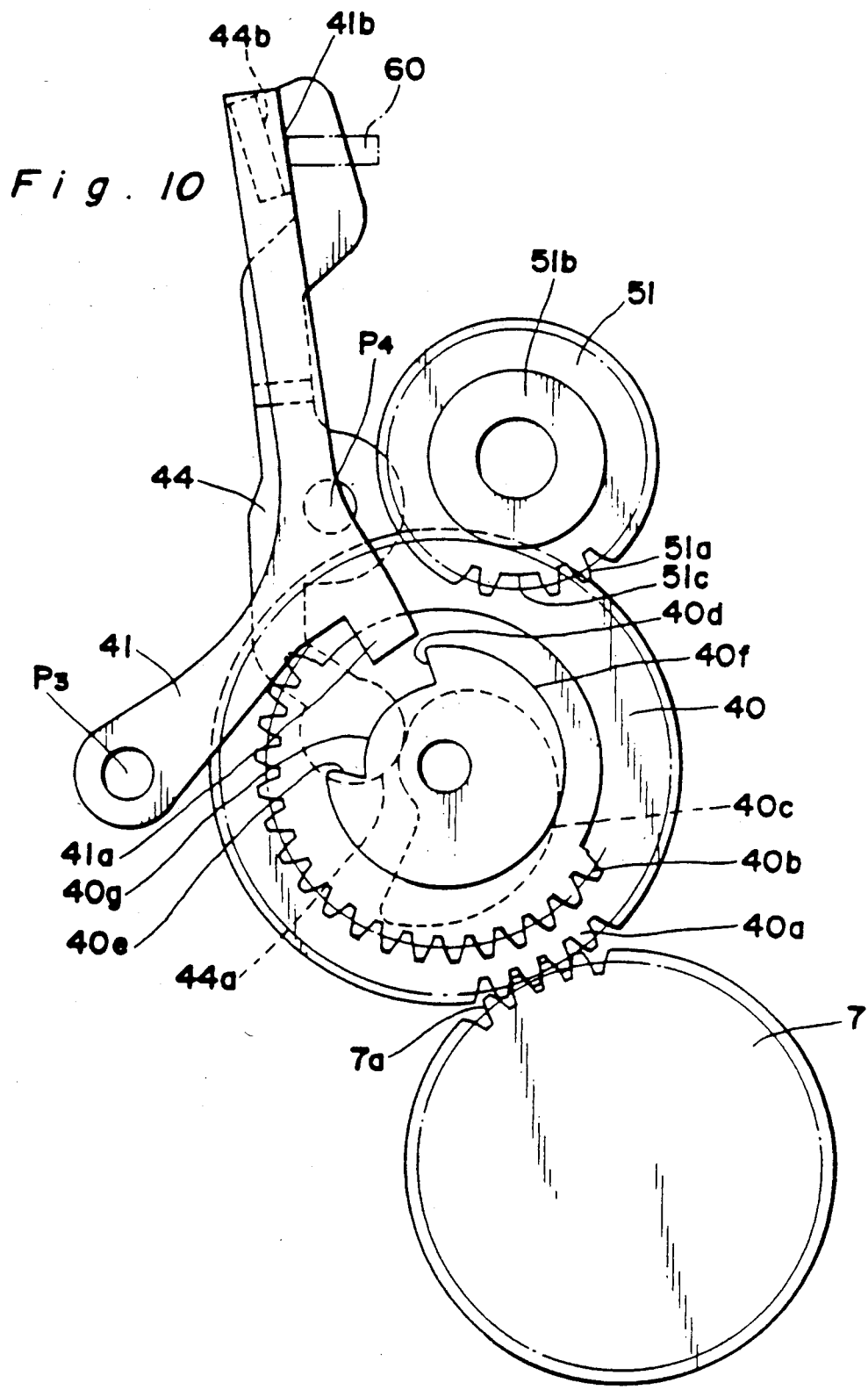
Figure 11:
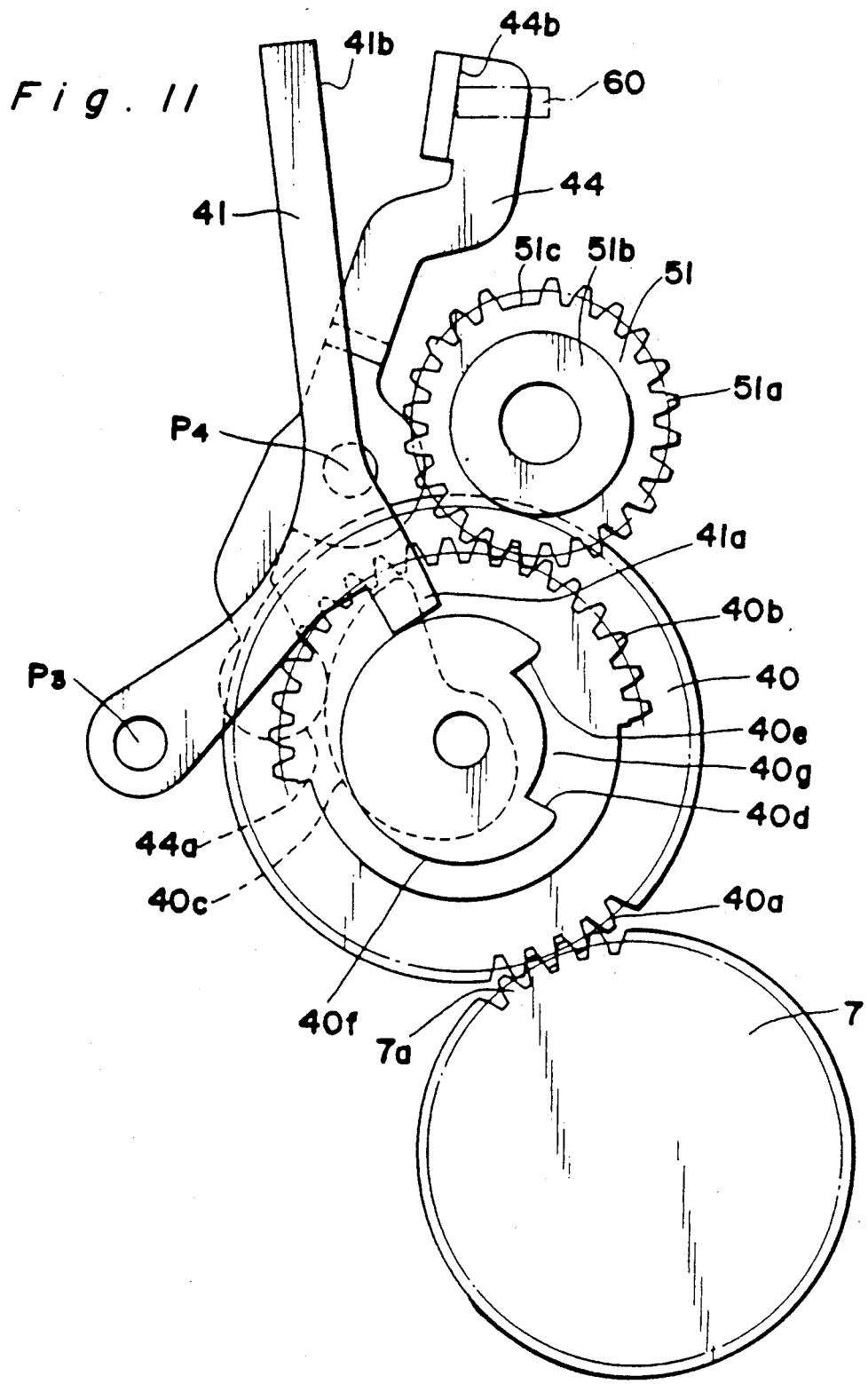

The descriptions about an operation of a camera having the above-mentioned construction, hereinbelow. When a releasing signal is outputted, voltage is applied to a magnet unit for releasing the diaphragm (not shown) and the diaphragm is stopped down up to an expected aperture. Next, the mirror is up. At this time, the connecting lever 60 moves to the right hand in FIG. 1. Then, a projection 60a of the connecting lever 60 comes in contact with the free end 41b of the cocking control lever 41 and the cocking control lever 41 is pushed in that direction by the projection 60a. Consequently, the cocking control lever 41 is cause to rotate counterclockwise. Whereupon, the engagement between the projection 41a of the cocking control lever 41 and the recession 40g of the cam controller 40 is cancelled and then, the cam controller 40 is ready for rotating (at state just shown in FIG. 10). At this moment, the second switch SW2 turns on. After that, curtains of the shutter travel and the film is exposed. When the exposure is completed, the voltage is applied to the motor 1 and the pinion gear 1b of the motor 1 rotates clockwise. In connection with the motor driving, the driven gear 2 rotates counterclockwise. As shown in FIG. 5, the upper arm 4a of the kick spring 4 is pushed by the side face 2c of the vertical wall 2b of the driven gear 2 so that the kick spring 4 turns counterclockwise as well. The load generated during this operation is smaller enough than a load by which slipping between the kick spring 4 and the friction gear 3 is caused, so that the friction gear 3 turns counterclockwise as well. When the friction gear 3 turns, the 1st. combination gear 5 turns clockwise. On the other hand, the 2nd. combination gear 10 can not turn since the 1st. projection 30a of the 1st. lock lever 30 engages with the recession 29b of the film winding controller 29 so that the engagement between the claw 33b of the claw lever 33 and the engagement plate 13 functions. That is, the three of the 1st. planet gear 6 can not rotate on its axis, respectively. These 1st. planet gears 6, 6, 6 therefore, revolve around the 1st. sun gear 5b so that the carrier plate 8, the supporting gear 7, and the main shaft 9 are caused to rotate clockwise as a whole. Consequently, the cam controller 40 turns counterclockwise. Whereupon, the halfway gear 40b of the cam controller 40, as shown in FIG. 11, makes the engagement with the spur gear 51a of the diaphragm cocking gear 51 and the diaphragm mechanism is caused to cock by means of the halfway gear 40b. On one hand, the 1st. cocking lever 44 is caused to rotate clockwise by the cocking cam 40c of the cam controller 40, and then, the free end 60b of the connecting lever 60 is pushed in the right-hand direction (in the left-hand direction in the drawing of FIG. 1) by the bent member 44b of the 1st. cocking lever 44. Whereby, each mechanism of the mirror and the shutter is cocked and the connecting lever 60 is caused to return at its initial position. During this operation, the cocking control lever 41 is trying to turn clockwise by the arrival of the connecting lever 60 at its initial position. As shown in FIG. 11, however, the recession 40g of the cam controller 40 travels with a turn of the cam controller 40 so that the location of the recession 40g has been shifted. Accordingly, the cam controller 40 can continuously rotate due to no engagement between the projection 41a of the cocking control lever 41 and the recession 40g of the cam controller 40. At this moment, the second switch SW2 still keeps on. When the engagement between the halfway gear 40b and the the spur gear 51a of the diaphragm cocking gear 51 is cancelled and the cocking control lever 41 returns to its initial position and each cocking of the respective mechanisms of the mirror, the shutter, and so on has been completed, the cocking control lever 41 turns to the clockwise direction before long since the rotation of the cam controller 40 brings the recession 40g to the location corresponding to that of the projection 41a. When one edge 40e of the recession 40g of the cam controller 40 has passed through the projection 41a, the projection 41a engages with the recession 40g of the cam controller 40. Then the second switch SW2 is turned off. As shown in a time-chart of FIG. 13, when the second switch SW2 is turned off, the voltage is applied pulsewise to the magnet unit 104, thus resulting in that the attraction force between the attracted piece 105 and the magnet unit 104 is extinguished. Whereupon, the rewinding release lever 101, the cocking lever 102, and holder lever 103 turn clockwise together with all of them as a whole by virtue of the 2nd. torsion coil spring 111 which is hooked with the rewinding release lever 101, as shown in FIG. 8. When the rewinding release lever 101 turns in that direction, the 1st. lock lever 30 is pushed by the 1st. projection member 101a of the rewinding release lever 101 since the the 1st. projection member 101a comes in contact with the side body 30d of the 1st. lock lever 30, then the 1st. lock lever 30 is caused to turn clockwise, so that the engagement between the recession 29b of the film winding controller 29 and the 1st. projection 30a of the 1st. lock lever 30 is cancelled. At this moment, the first switch SW1 is turned on. In addition to the above, the engagement between the claw 33b of the claw lever and the notch 13a of the engagement plate 13 is cancelled as well because the claw lever is pushed by the 2nd. lock lever 130, more specifically, the bent member 130b pushing the bill-shaped projection 33a, so that the claw lever 33 is caused to turn counterclockwise. Consequently, the 2nd. combination gear 10 is ready for rotating. Before long, it starts that the film is wound and the film winding controller 29 turns clockwise. Under such an operation, the load is hardly acting on the supporting gear as long as the side wall 40d of the recession 40g of the cam controller 40 comes in close contact under pressure with the projection 41a of the cocking control lever 41, so that revolution of the 1st. planet gear 6 is continued. In this camera system, it is so designed that the engagement between the 1st. projection 30a winding controller 29 is cancelled during a period of being the lower load as described above. It is ensured during that period that the 1st. lock lever 30 is caused to rotate with a slight force, since a reaction force caused by the planetary gearing is scarcely acting on both members; the 1st. projection 30a of the 1st. lock lever 30 and the recession 29b of the film winding controller 29 in that period. On one hand, when the projection 41a of the cocking control lever 41 comes in contact with the side wall 40d of the recession 40g of the cam controller 40, in other words, the cam controller 40 makes one complete rotation, the three 1st. planet gear 6s start rotating counterclockwise on these axes, respectively. Consequently, the 2nd. combination gear 10 is caused to turn counterclockwise. When the 2nd. combination gear 10 turns in that direction, the spool driving gear 12 turns in the same direction by virtue of the friction spring, so that the spool 14 is caused to turn counterclockwise by the engagement between the toothed wheel 12a and the integrated spool driving gear 14a. Then, the film is wound up with the spool 14.

In addition, the external gear 10b of the above-mentioned 2nd. combination gear 10 engages with the toothed wheel 20a of the 3rd. combination gear 20, so that the 3rd. combination gear 20 turns clockwise. When the 3rd. combination gear 20 turns in that direction, the carrier 22 may turn clockwise by virtue of a frictional force between the carrier 22 and the 3rd. combination gear 20 so that the 2nd. planet gear 21 is trying to engage with the toothed wheel 23a of the intermediate combination gear 23. However, it may fail in case of the film twining around the spool 14. The reason is as follows. The film which is wound up by the spool 14 makes the spool 14 rotate counterclockwise. At the same time, the film sprocket driver 24 and the code plate 26 turn counterclockwise. The pinion gear 23b, of the intermediate combination gear 23, engaging with the film sprocket driver 24 turn clockwise when the film sprocket driver 24 turns in the counterclockwise direction. A gear ratio between the 2nd. planet gear 21 and the intermediate combination gear 23 is so arranged that the rotational speed of the intermediate combination gear 23 caused by the film travelling through the film sprocket 25 is faster than that of the intermediate combination gear 23 driven by the 2nd. planet gear 21. In case of the film twining around the spool 14, therefore, the 2nd. planet gear 21 is flicked by the toothed wheel 23a when the 2nd. planet gear 21 approaches thereto and is trying to engage therewith, so that rotation of the motor 1 is not transmitted to the film sprocket 25 at all.

It is to be noted that the 2nd. planet gear 21 may engage with the toothed wheel 23a of the intermediate combination gear 23 in case of the film not twining around the spool 14, such as at the time of initial loading of the camera described later on. Accordingly, the film sprocket 25 is driven in the counterclockwise through the pinion gear 23b and the film sprocket driver 24 and it is enabled that the film is fed into the spool section.

Figure 7:
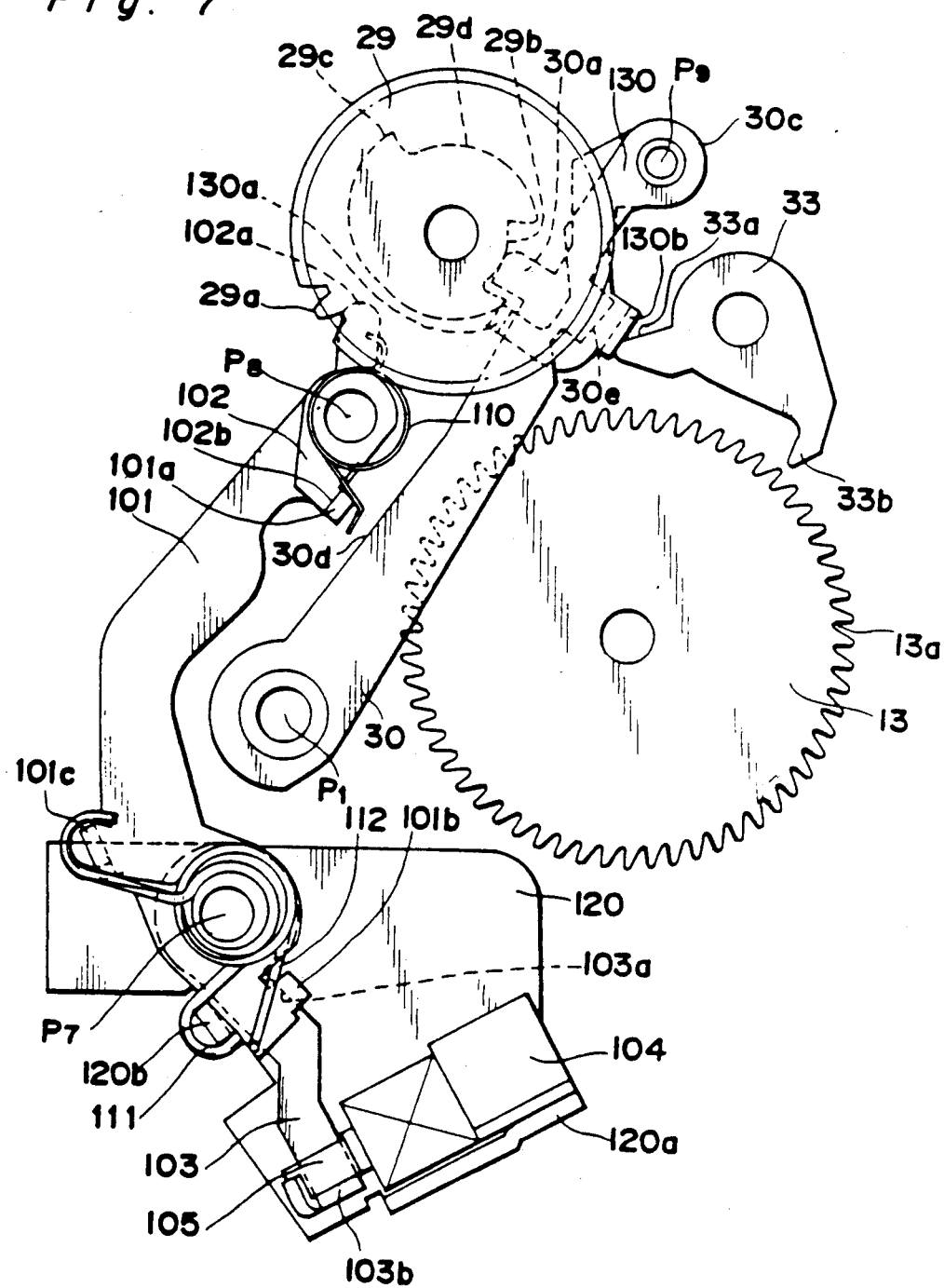

Meanwhile, when the film sprocket 25 turns counterclockwise, the film winding controller 29 turns clockwise. As shown in FIG. 8, when the film winding controller 29 turns in that direction with a certain rotational quantity, the projection 29c of the film winding controller 29 comes in contact with the top end 102a of the cocking lever 102 and pushes it, so that the cocking lever 102, the rewinding release lever 101, and the holder lever 103 are caused to rotate counterclockwise around the rotational axis P7 as a whole. That movement enables the attracted piece 105 attached at the free end of the holder lever 103 to be attracted to the magnet unit 104 again. The projection 29c still further pushes the top end 102a with a certain stroke for a security purpose of the attraction even though the attracted piece 105 has already been attracted to the magnet unit 104. The stroke of the movement of both of the holder lever 103 and the cocking lever 102 is so designed that the torsion coil spring is charged at a certain rate by them which are caused to continuously turn in the counterclockwise direction by the projection 29c. It is, therefore, ensured that the magnet unit 104 attracts the attracted piece 105. And the 1st. projection 30a of the 1st. lock lever 30 falls into the recession 29b of the film winding controller 29 at one complete rotation of the film winding controller 29. At this time, as shown in FIG. 7, the projection 130a of the 2nd. lock lever 130 is not allowed to fall into the recession 29b so that the state of the engagement, which is cancelled, between the claw 33b of the claw lever and the notch 13a of the engagement plate 13 is maintained. When the 1st. projection 30a of the 1st. lock lever 30 fall into the recession 29b of the film winding controller 29, the first switch SW1 is turned off. On the first switch SW1 off, then, the voltage to the motor 1 is cut off, and the motor 1 is braked. However, the motor 1 continues to rotate for a while by inertia. Consequently, the film winding controller 29 further turns clockwise and as soon as the edge of the projection 29c passes through the top end 102a of the cocking lever 102, both of the holder lever 103 and the rewinding release lever 101 turn clockwise by virtue of the 3rd. torsion coil spring 112, then, the side body 103a of the holder lever 103 and the 2nd. projection member 101b of the rewinding release lever 101 are brought in contact with each other and they return to their initial states. Simultaneously, the 2nd. lock lever 130 is caused to turn clockwise around the rotational axis P9 by the claw lever so that the projection 130a falls into the recession 29b of the film winding controller 29. When the projection 130a falls into the recession 29b, the film winding controller 29 is caused to stop rotating as well as the engagement plate 13 is caused to stop rotating since the claw 33b of the claw lever engages with the notch 13a of the engagement plate 13. That is, the spool 14 is made to stop. Thus, a frame of the film has been fed out. By taking such a manner, it is enabled to apply the brakes to the film winding mechanism a little earlier, so that stopping of the film winding and stopping the spool 14 ar effected during braking. Accordingly, it may be prevented that an unexpected large force acts on the film winding mechanism as well as the stopper mechanism of the film winding.

The above-mentioned lever 33 is provided for the purpose of the following. That is, as soon as the film winding controller 29 is made to stop, the motor 1 is braked. At the time when braking the motor 1, the film sprocket 25 is made to stop immediately. The spool 14, however, rotates continuously by virtue of inertia, of each gear with a backlash, which is given by the motor 1. Whereupon, the film may be further wound by the spool 14. However, the film sprocket 25 has already been made to stop, so that a large amount of force acts on the film located between the spool 14 and the film sprocket 25. In order to avoid this, the spool 14 is made to stop through the engagement plate 13 by the claw lever.

Figure 13:
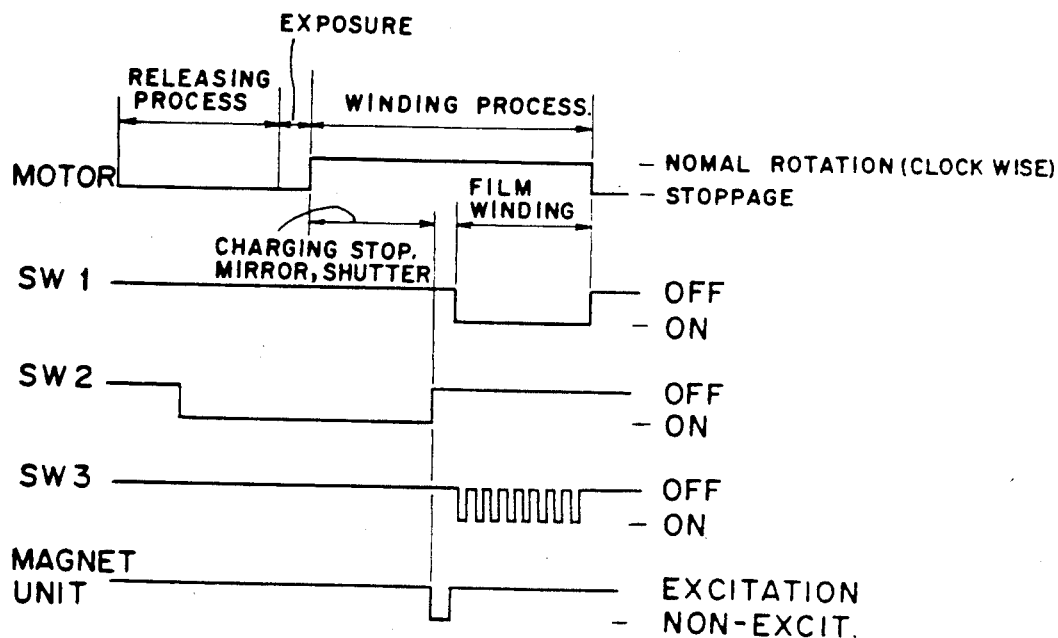

During feeding a frame of film roll, the third switch SW3 is turned on and off, repeatedly, as shown in FIG. 13. In this embodiment, it is so designed that the third switch SW3 is turned on eight times during feeding one frame, totally.

While the pinion gear 1b of the motor 1 is rotating clockwise, an operation of winding the film is carried out. Simultaneously, the small gear 5c of the 1st. combination gear 5, a primary rewinding gear 70, and the 1st. and 2nd. rewinding gears 71, 72 rotate. Since the 2nd. rewinding gear 72 turns counterclockwise, the carrier 74 turns in the same direction by virtue of the friction therebetween around the axis $P_5$. Accordingly, the 3rd. rewinding gear 73 can not engage with the gear 75a located at the most left hand in the rewinding gears train 75 so that a film roller driving gear 76 is not driven. Further, while the spool 14 is caused to rotate counterclockwise and is winding the film, the torsion coil spring 85 coiled round the cylindrical section 14b of the spool 14 is trying to cause the roller release lever 84 to turn in the clockwise direction. The roller release lever 84, however, is controlled so as not to turn toward the counterclockwise direction from its position shown in FIG. 12, so that a force by which the torsion coil spring 85 is loosened is to act on the upper arm 85a of the torsion coil spring 85, resulting in that the torsion coil spring 85 continues to slip on the cylindrical section 14b with a light torque, relatively.

Figure 14:
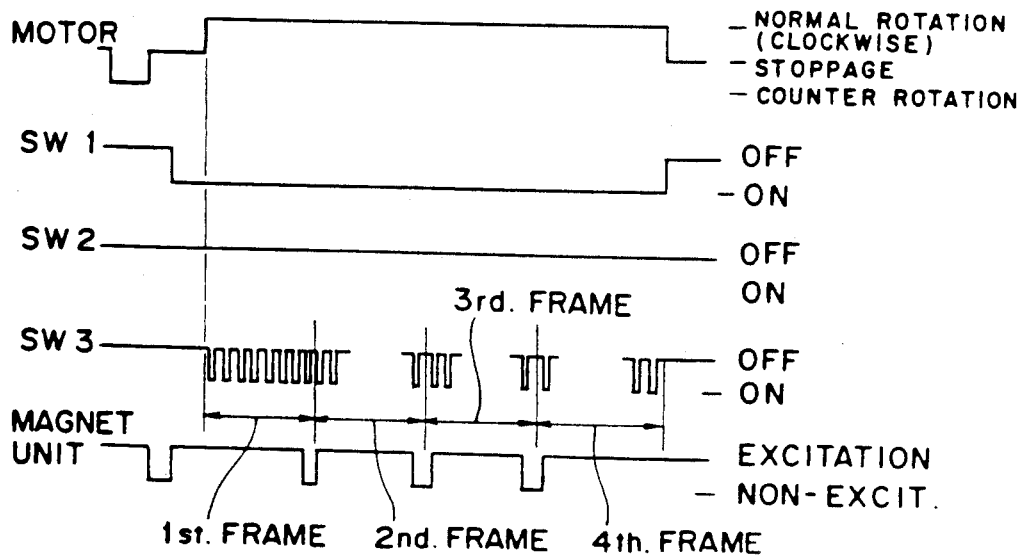

A description on operations at initial loading of the film proceeds as hereinbelow. As shown in a time-chart of FIG. 14, when the film is loaded and a back cover is closed, a switch not shown in the drawing is turned on. Next, at first, the voltage is applied to the motor 1 so as for the motor 1 to rotate in the reverse direction to the film winding direction, i.e., counterclockwise direction. The applying time of the voltage is slightly a little, say that it is about 30 msec., in other words, the time is equivalent to that necessary for a gear to turn for an amount of backlash. It is enabled by this movement that a load which acts on both of the recession 29b of the film winding controller 29 and 1st. projection 30a of the 1st. lock lever 30 at the time of completion of the film winding is loosened. After that, as soon as the motor 1 is braked, the voltage is applied to the magnet unit 104. Whereupon, as described previously, the 1st. projection member 101a of the rewinding release lever 101 pushes the side body 30d of the 1st. lock lever 30, so that the 1st. lock lever 30 turns clockwise. By turning the 1st. lock lever 30 in that way, the engagement between the 1st. projection 30a of the 1st. lock lever 30 and the projection 130a of the 2nd. lock lever 130 is cancelled. And the first switch SW1 is turned on. On one hand, the claw lever 33 turns counterclockwise so that the engagement between the claw 33b and the notch 13a of the engagement plate 13 is cancelled. After the motor 1 is braked for a certain time, the voltage is applied to the motor 1 so as for the pinion gear 1b of the motor 1 to rotate clockwise. Whereupon, the film sprocket 25 is caused to rotate counterclockwise by engaging the 2nd. planet gear 21 with the toothed wheel 23a of the intermediate combination gear 23 and the film is fed into the spool 14 side since the film is not wound round the spool 14 yet. Although the attracted piece 105 is to be attracted to the magnet unit 104 by the rotation of the film winding controller 29, the voltage is applied to the magnet unit 104 again directly before the engagement of the 1st. projection 30a of the 1st. lock lever 30 with the recession 29b of the film winding controller 29 so as not for the attracted piece 105 to be attracted to the magnet unit 104. Whereby, the rewinding release lever 101 is caused to turn clockwise, and it does not happen that the 1st. projection 30a of the 1st. lock lever 30 falls into the recession 29b of the film winding controller 29. It is to be noted that the timing of applying the voltage to the magnet unit 104 is a time when the third switch SW3 is turned on eighthly. Due to no engagement between the 1st. projection 30a and the recession 29b, the first switch SW1 keeps turned on and the voltage stands applied to the motor 1, so that the spool 14 and the film sprocket 25 turn further continuously and it starts to wind a second frame of the film roll. And similarly to the operation for the first frame of the film roll, the voltage is applied to the magnet unit 104 again at the time when the third switch SW3 is turned on eighthly. And then, a winding of a third frame of the film roll is effected. Taking a similar procedure, the voltage is applied to the magnet unit 104 at a timing when the third switch SW3 is turned on eighthly and it starts to wind a fourth frame of the film roll. In a process of winding of the fourth frame of the film, it is so arranged that the voltage is not applied to the magnet unit 104 at the timing described above. This is for the purpose of completion of the initial loading of the film. That is, when the voltage to the magnet unit 104 is cut off, the film winding controller 29 makes one complete rotation and the 1st. projection 30a of the 1st. lock lever 30 falls into the recession 29b of the film winding controller 29, then the first switch SW1 becomes off. Accordingly, the motor 1 is braked and is made to stop. During the process of the initial loading of the film, the film is wound around the spool 14.

Next, a description of an operation concerning a case of tension of the film at a final frame of the film proceeds as hereinbelow. When the film tenses during winding, a winding load becomes large so that the kick spring 4 and the friction gear 3 slips, respectively. In the case of that, the spool 14 and the film sprocket 25 stop as well as the film winding controller 29 stops so that the engagement between the 1st. projection 30a of the 1st. lock lever 30 and the recession 29b of the film winding controller 29 is not accomplished. Consequently, the first switch SW1 keeps turned-on. It is so designed that the period of the On-state of the first switch SW1 is monitored by a timer. In case the first switch SW1 has not yet turned off when an expected winding time of the one frame of the film roll passes, it is decided that all frames of the film roll were taken a picture. And the motor 1 is braked immediately. Next, the voltage is applied to the motor 1 so as for the pinion gear 1b of the motor 1 to turn counterclockwise. A time-chart of this case is shown in FIG. 15. When the pinion gear 1b of the motor 1 rotates counterclockwise the 2nd. rewinding gear 72 is driven clockwise so that the carrier 74 turns in the clockwise direction by virtue of the friction force caused therebetween. Whereby, the 3rd rewinding gear 73 engages with the gear 75a located at the most left hand in the rewinding gears train 75 (see FIG. 1), so that the film roller driving gear 76 is caused to rotate clockwise. By the rotation of that way of the film roller driving gear 76, the film is rewound into the patrone. On one hand, although the cam controller 40 is trying to turn clockwise, the cam controller 40 can not rotate since the projection 41a of the cocking control lever 41 comes in contact with the side wall 40e of the recession 40g of the cam controller 40. Consequently, the 1st. planet gear 6 rotates on its axis. Accordingly, the 2nd. combination gear 10 rotates clockwise. At the moment, the claw lever 33 can not control movement of the engagement plate 13 since it is so designed that the claw lever 33 does not engage with the engagement plate 13 as concerns the rotation of the clockwise direction of the 2nd. combination gear 10. Therefore, the 3rd. combination gear 20 rotates counterclockwise and the carrier 22 rotates counterclockwise around the axis $P_1$ and it does not occur that the 2nd. planet gear 21 engages with the toothed wheel 23a of the intermediate combination gear 23. In addition, the intermediate combination gear 23 with the clockwise rotation drives the spool 14 for rotation in the clockwise direction through the friction spring and the spool driving gear 12. Whereupon, the roller release lever 84 is caused to turn in the clockwise direction by the upper arm 85a of the torsion coil spring 85 coiled round the cylindrical section 14b of the spool 14. This movement causes the torsion coil spring 83 to be charged through the bent member 84a of the roller release lever 84 since the bent member 84a pushes the arm 83a of the torsion coil spring 83 in the clockwise direction. Under such an operation, the torsion coil spring 85 transmits a torque enough to charge the torsion coil spring 83 to the roller release lever 84 without slipping around the cylindrical section 14b since a force by which the torsion coil spring 85 is tightened acts on the upper arm 85a of the torsion coil spring 85. When the spool 14 turns with a predetermined rotational quantity, the lower arm 85b of the torsion coil spring 85 comes in contact with a stopper (not shown) fitted with the camera body. Whereupon, the force by which the torsion coil spring 85 is loosened acts on the lower arm 85b, so that the torsion coil spring 85 can not cause the roller release lever 84 to turn clockwise any more. Consequently, the torsion coil spring 83 keeps charged, as it stands. Accordingly, the urging force by the torsion coil spring 83 is not to act on the roller holder 81 so that the film wound around the spool 14 is loosened on the spool 14 by its own stiffness. This is of great service to reducing load of rewinding. Further, the difference between a peripheral speed of the spool 14 and a running speed of the film may cause the film surface to be wound with rubbing in case where the film is pressed down by the roller 82 during the operation of rewinding the film. In order to avoid this phenomenon, therefore, it is more effective to reduce the urging force which acts on the roller holder 81. By rewinding the film into the patrone with the film roller driving gear 76, the film sprocket 25 is caused to rotate clockwise through the film. Whereby, the intermediate combination gear 23 turns counterclockwise. In case where the intermediate combination gear 23 rotates in that direction, the film sprocket 25 is not loaded so much since the 2nd planet gear 21 does not engage with the toothed wheel 23a of the intermediate combination gear 23. Similarly, the film winding controller 29 rotates counterclockwise, as well. Then the projection 29c of the film winding controller 29 pushes the cocking lever 102 in contact with the top end 102a of the cocking lever 102 so that the cocking lever 102 turns clockwise around the axis P8 against the springy force of the 1st. torsion coil spring 110. It is to be noted that the rewinding release lever 101 and holder lever 103 are left as they are, i.e., they are located in positions to be shown in FIG. 8. As soon as the projection 29c of the film winding controller 29 passes over the top end 102a of the cocking lever 102, the cocking lever 102 turns counterclockwise again by virtue of the 1st. torsion coil spring 110 and the cocking lever 102 returns to its initial position bringing the free end 102b into contact with the 1st. projection member 101a of the rewinding release lever 101. During the operation of rewinding, the above-mentioned operation is repeated.

It is to be noted that the following operation is effected in the case where the attracted piece 105 is attracted to the magnet unit 104 at the time when the film gets tense during winding the film. That is it happens before long that the 1st. projection 30a of the 1st. lock lever 30 falls into the recession 29b of the film winding controller 29 while the film winding controller 29 rotates counterclockwise, and then the first switch SW1 is turned off. When such a situation occurs, it can not bring rewinding to effect since the film sprocket 25 rotates no longer Accordingly, the motor 1 is put on the brakes as soon as the first switch SW1 is turned off. At the same time, the voltage is applied to the magnet unit 104. Whereby, the engagement between the 1st. projection 30a of the 1st. lock lever 30 and the recession 29b of the film winding controller 29 is cancelled. After that, the voltage is applied to the motor 1 so that rewinding of the film may be effected once more. This operation is made just once. Further, it may never happen before the attracted piece 105 is attracted to the magnet unit 104.

Meanwhile, the third switch SW3 is caused to be turned on and off repeatedly by the rotation of the film sprocket 25. During rewinding a frame of the film roll, the third switch SW3 is turned on eight times, so that an amount of the rewinding can be judged by counting the number of how many times the switch SW3 is turned on. Therefore, it may be decided that the rewinding is over at the time when the numbers which were counted during winding the film has been just counted. And after the motor 1 is braked, the voltage is applied to the motor 1 so as for the pinion gear 1b of the motor 1 to rotate clockwise. Whereby, the attracted piece 105 is attracted to the magnet unit 104 and the 1st. projection 30a of the 1st. lock lever 30 falls into the recession 29b of the film winding controller 29 so that the first switch SW1 is turned off. Under the Off-state of the switch SW1, the motor 1 is braked and the operation of the rewinding is over. As the spool 14 rotates counterclockwise during the clockwise rotation of the pinion gear 1b of the motor 1, the roller release lever 84 swings counterclockwise and returns to its initial position during this period. Then, the arm 83a of the torsion coil spring 83 comes in contact with the projection member 81b of the roller holder 81 again, so that the roller 82 is pressed on the spool 14.

Sometimes, it may happen that a photographer wants to rewind the film on the way to the final frame of the film roll. In the case of that, the following are available. That is, when he depresses a switch, at first the pinion gear 1b of the motor 1 rotates counterclockwise, as shown in a time-chart of FIG. 16. And the voltage is applied to the magnet unit 104. A timing of applying voltage is slightly delayed from that of starting the motor drive. Namely, in order to reduce the load which is acted on the winding mechanism at completion of the winding operation, the voltage is applied to the magnet unit 104 in a slightly few second (approx. 30 msec.), as previously described. By applying voltage to the magnet unit 104, the engagement between the 1st. projection 30a of the 1st. lock lever 30 and the recession 29b of the film winding controller 29 is cancelled. As the motor 1 continues to rotate in the same direction, the film is rewound as aforementioned. The operation of being performed hereafter is same as that of doing at the case where the film gets tense at its final frame of the film roll.

Next, the description on operation at a multi-exposure proceeds hereinbelow. In case where it is detected that a multi-exposure mode is set, exposure operation is executed, similarly to a regular mode as described above, and the motor 1 is driven, and each mechanism of the diaphragm, the mirror, and the shutter is cocked after cocking. When the projection 41a of the cocking control lever 41 engages with the recession 40g of the cam controller 40 after completion of cocking, the second switch SW2 is turned off. At this step, normally (at the regular mode), the voltage is applied to the magnet unit 104 and the processing switches over the processing of the film winding. Under the multi-exposure mode, however, the voltage is not applied to the magnet unit 104, and the motor 1 is braked at the time when the second switch SW2 is turned off, and the operation of the multi-exposure is over.

Further, in case where it is detected that no film is in the camera, it is possible to be so designed that the processing of the film winding is bypassed, similarly to the above-mentioned operation for the multi-exposure, so that electricity may not be wasted.

In this embodiment, the planetary gearing is utilized as the differential gearing. It may be, however, allowed to utilize another type of the differential gearing. There are shown another types of that in FIG. 22 and 23.

Figure 22:
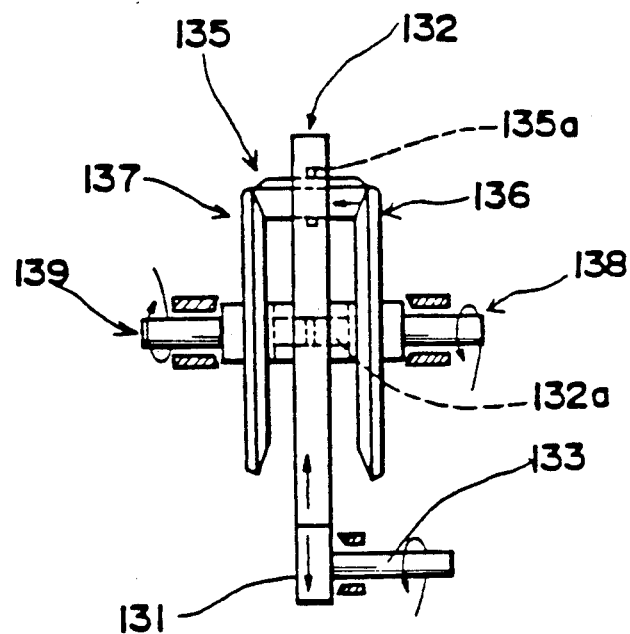
FIGS. 22 and 23 are, respectively, illustrations illustrating each modification of a differential gearing which is applicable to the present invention.

In one modification of the differential gearing shown in FIG. 22, an intermediate bevel gear 135 which is located through a hole which is formed in a spur gear 132, and the bevel gear 135 is supported in the spur gear 132 with a shaft 135a having a rotational axis crossing an axis 132a of the spur gear 132 with right angles Further, the bevel gear 135 gears into both of an input bevel gear 136 and a driven bevel gear 137. In addition, the spur gear 132 gears into a pinion gear 131. And it is so designed that a driving force of a motor (not shown) is transmitted to the input bevel gear 136 through an input shaft 138.

When the above-mentioned input bevel gear 136 is driven by the motor, the intermediate bevel gear 135 revolve on its axis if a load acting on an output shaft 133 of the pinion gear 131 is heavier than that acting on a shaft 139 of the driven bevel gear 137, and the driven bevel gear 137 rotates. On the other hand, if the load acting on the output shaft 133 is lighter than that acting on the shaft 139, the intermediate bevel gear 135 revolves around the shafts 138, 139, and the spur gear 132 rotates. That is, if the spur gear 132 is caused to keep still, a rotational direction of the input shaft 138 is opposite to that of the shaft 139, as shown by arrows in the drawing, as well as its speed is same as that of the shaft 139. If the spur gear 132 is, however, caused to rotate, it is possible to let the shaft 139 rotate in both directions at a rate of any speed or to let the shaft 139 keep still. Then, the following elements are corresponded to each other if it corresponds the differential gearing described above to the aforementioned planetary gearing (see FIG. 3); a reference numeral 5b:136, 6:135, 7:132, 10:137, respectively.

Figure 23:
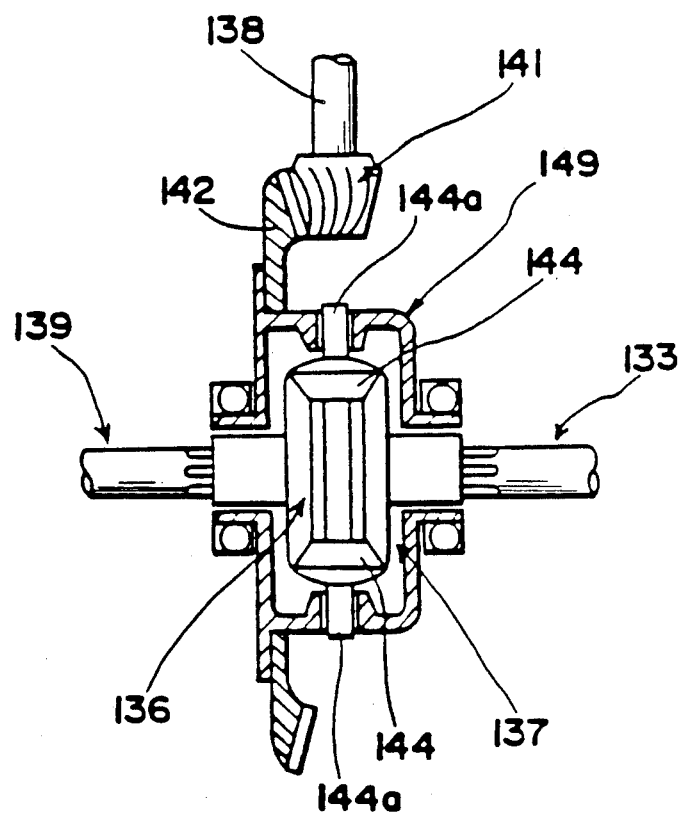

In an another modification of the differential gearing as shown in FIG. 23, there is shown one example having two bevel gears 141 and 142 instead of the spur gear and the pinion gear in the above-mentioned modification. This type of a differential gearing is well-known as a differential gear utilized in an automobile. On describing this mechanism briefly, a bevel gear 141 fitted to an input shaft 138 gears into a bevel gear 142 supported with a casing 149. Further, the casing 149 is provided with two pairs of bevel gears 136:137, 144:144. That is, as shown in the drawing, each bevel gear 137 and 136 supported respectively with the input- and output shaft 133, 144 which are disposed so as to confront each other gears into both of a pair of bevel gears 144 and 144, respectively, which are, respectively, fitted on shafts 144a supported rotatably with a casing 149. When the bevel gear 141 of the input shaft 138 rotates, the bevel gear 142 supported with the casing 149 is caused to rotate, so that the two of the output shafts 133 and 139 normally rotate at the rate of a same speed. In the case of, however, that a load acting on the one shaft 139 is heavier than that on the other shaft 133, the revolution of the other shaft 133 becomes faster than that of one 139. This phenomenon is quite well-known on the field of the automobiles Namely, when a car is driven and turning, the other output shaft is caused to rotate faster than one does so that a wheel of the other may be prevented from sliding sideways.

Next, the description on control means of the film winding mechanism in this embodiment proceeds hereinafter.

Figure 17:
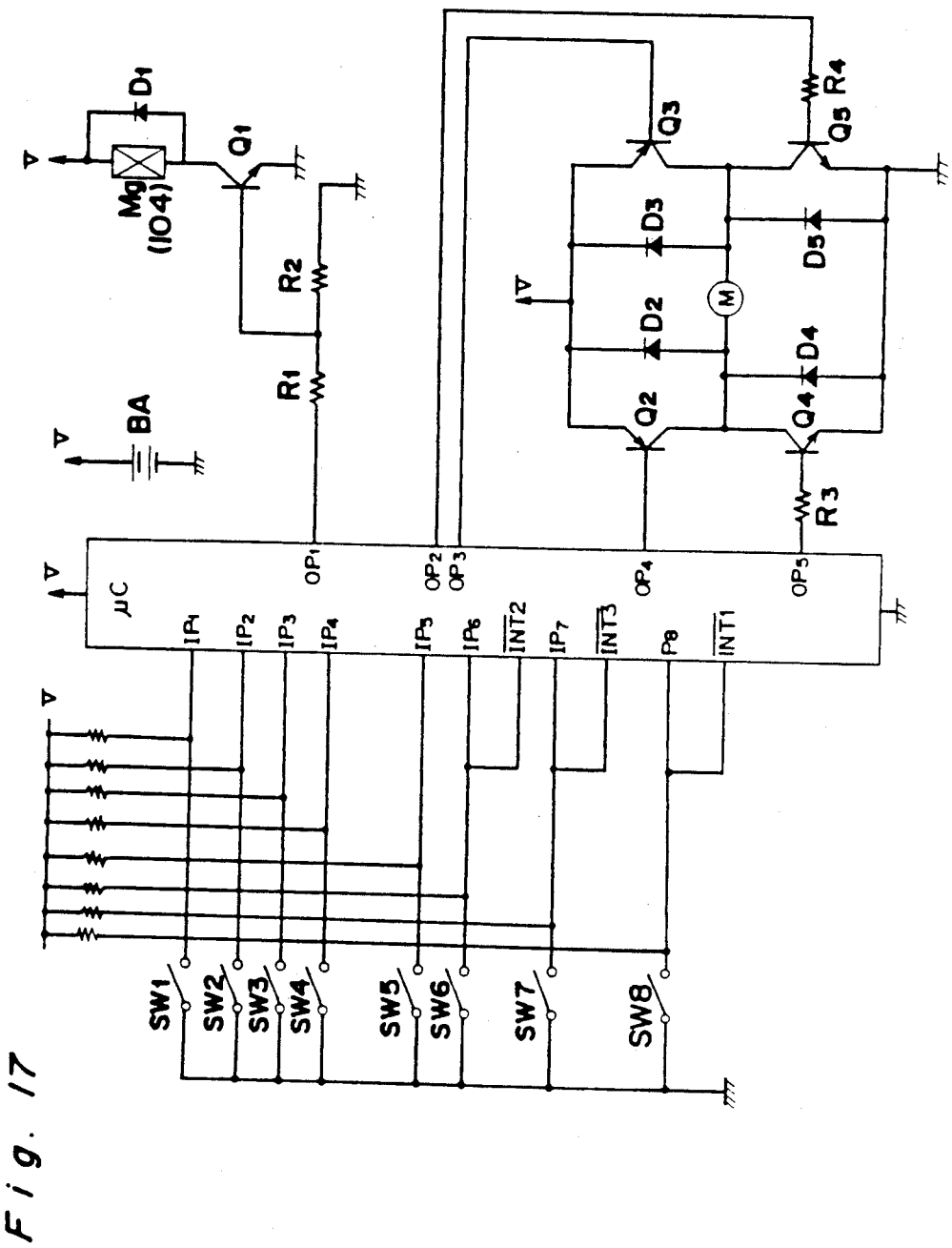
FIG. 17 is a wiring diagram including a microcomputer as a control means for controlling the total mechanism, according to one embodiment of the present invention.

Referring now to FIG. 17, there is shown a circuit utilizing a microcomputer, with a reference symbol "$\mu c$", as control means of the present invention. Respective switches designated by reference symbols SW1, SW2, SW3, and SW4 in the drawing are equivalent to the respective switches SW1, SW2, SW3, and SW4 which are described previously in the description of the embodiment. One terminal of each of the switches SW1, SW2, SW3, and SW4 is connected with each input terminal $IP_1$, $IP_2$, $IP_3$, $IP_4$ of the microcomputer $\mu c$, correspondingly as well as each line therebetween is connected to a power line (V) through respective pull-up resistors (r). The other terminal of each of the switches SW1, SW2, SW3, SW4 is grounded. A switch SW5 is turned on when the multiexposing mode is selected A switch SW6 is turned on when the film is charged with the camera and a back cover is closed, and the switch SW6 is turned off when the film is not charged or the back cover is opened. A switch SW7 is a switch for use in an interruption of the film rewinding in case the film is caused to start rewinding on the way to the final frame of the film roll. A switch SW8 is a switch to be turned on with depressing a release button (not shown). As it is apparent from FIG. 17, one terminal of each of these switches SW5, SW6, SW7, SW8 is connected to each input terminal $IP_5$, $IP_6$, $IP_7$, $IP_8$ of the microcomputer $\mu c$, correspondingly as well as each line therebetween is connected to the power line (V) through respective pull-up resistors (r). The other terminal of each of the switches SW5, SW6, SW7, SW8 is grounded. In addition to the above, each of the terminals, of some SW6, SW7, SW8 of these switches connected to the input terminals of the microcomputer $\mu c$ is connected to each of interruption terminals $\overline{INT2}$, $\overline{INT3}$, $\overline{INT1}$ thereof, correspondingly as well. When any one of these switches SW6, SW7, SW8 therefore is turned on, voltage applied to the corresponding interruption terminals $\overline{INT2}$, $\overline{INT3}$, $\overline{INT1}$ of the microcomputer $\mu c$ drops to the ground level. As soon as the microcomputer $\mu c$ detects it, the microcomputer $\mu c$ initiates interruption processing which is described later on. It is to be noted, here, that this microcomputer is so designed that any interruption is prohibited until the interruptions are allowed to accept again once any one of the interruptions is accepted.

A reference symbol "BA" designates a battery as a power source which supplies electricity to the circuit. A symbol "Mg" designates a magnet unit which is described as the reference numeral 104 in the embodiment (see FIG. 1) previously. The magnet unit (Mg) is so arranged that one terminal thereof is connected to the power line (V) and the other terminal thereof is connected to a collector of a NPN-type transistor $Q_1$. The magnet unit (Mg) is provided with a protection diode $D_1$ against a counter electromotive force in parallel therewith. An emitter of the transistor $Q_1$ is grounded and its base is connected with a connecting point of two resistor $R_1$ and $R_2$ connected in series with each other. The other terminal of the resistor $R_1$ is connected to an output terminal $OP_1$ of the microcomputer μc, and the other terminal of the other resistor $R_2$ is grounded Accordingly, when the microcomputer μc outputs a high level signal from the output terminal $OP_1$, the transistor $Q_1$ is activated, so that a current runs into the magnet unit (Mg), then the magnet unit (Mg) is actuated. On the contrary to the above, when the microcomputer μc outputs a low level signal from the output terminal $OP_1$, the transistor $Q_1$ is disactivated, so that the current stops to the magnet unit (Mg), then the magnet unit (Mg) keeps disactuated.

Two PNP-type transistors $Q_2$ and $Q_3$, and two NPN-type transistors $Q_4$ and $Q_5$, and protection diodes $D_2$, $D_3$, $D_4$, and $D_5$ against a counter electromotive force are comprised of a motor control circuit which is well-known, and a motor (M) (which is equivalent to the motor 1 shown in FIG. 1) is controlled, in cooperation with all of them, in response to control signals from the microcomputer μc. The motor M is controlled with respect to a normal- and reverse rotation and a stoppage. As it is apparent from FIG. 17, each of the base of the respective PNP-type transistors $Q_2$ and $Q_3$ is connected to each of the output terminals $OP_4$ and $OP_3$ of the microcomputer μc, correspondingly, and each of the base of the respective NPN-type transistors $Q_4$ and $Q_5$ is connected to each of the output terminals $OP_5$ and $OP_2$ of the microcomputer μc through respective resistors $R_3$ and $R_4$, correspondingly.

When the microcomputer μc outputs the high level signal from the respective output terminals $OP_2$ and $OP_3$ and outputs the low level signal from the respective output terminals $OP_4$ and $OP_5$, respectively, each of the transistors $Q_2$ and $Q_5$ is activated and each of the transistors $Q_3$ and $Q_4$ is disactivated. Consequently, a current runs from the power line (V) through the PNP-type transistor $Q_2$, the motor (M), and the NPN-type transistor $Q_5$ resulting in that the motor (M) is driven in the normal rotational direction. On the contrary to the above, when the microcomputer μc outputs the low level signal from the respective output terminals $OP_2$ and $OP_3$ and outputs the high level signal from the respective output terminals $OP_4$ and $OP_5$, respectively, each of the transistors $Q_2$ and $Q_5$ is disactivated and each of the transistors $Q_3$ and $Q_4$ is activated. Consequently, a current runs from the power line (V) through the PNP-type transistor $Q_3$, the motor (M), and the NPN-type transistor $Q_4$ resulting in that the motor (M) is driven in the reverse rotational direction. When the microcomputer μc outputs the high level signal from all of the output terminals $OP_2$, $OP_3$, $OP_4$, and $OP_5$, respectively, each of the PNP-type transistors $Q_2$ and $Q_3$ is disactivated and each of the NPN-type transistors $Q_4$ and $Q_5$ is activated. Consequently, when the same level signals are outputted from all of the output terminals $OP_2$, $OP_3$, $OP_4$, and $OP_5$, respectively, the motor (M) is short-circuited, thus resulting in that the motor (M) is braked.

Next, the operation of the microcomputer μc is described hereinbelow. First of all, the operation at the regular winding of the film and the automatic return of the film which is performed when the film gets tense, is explained.

Figure 18:
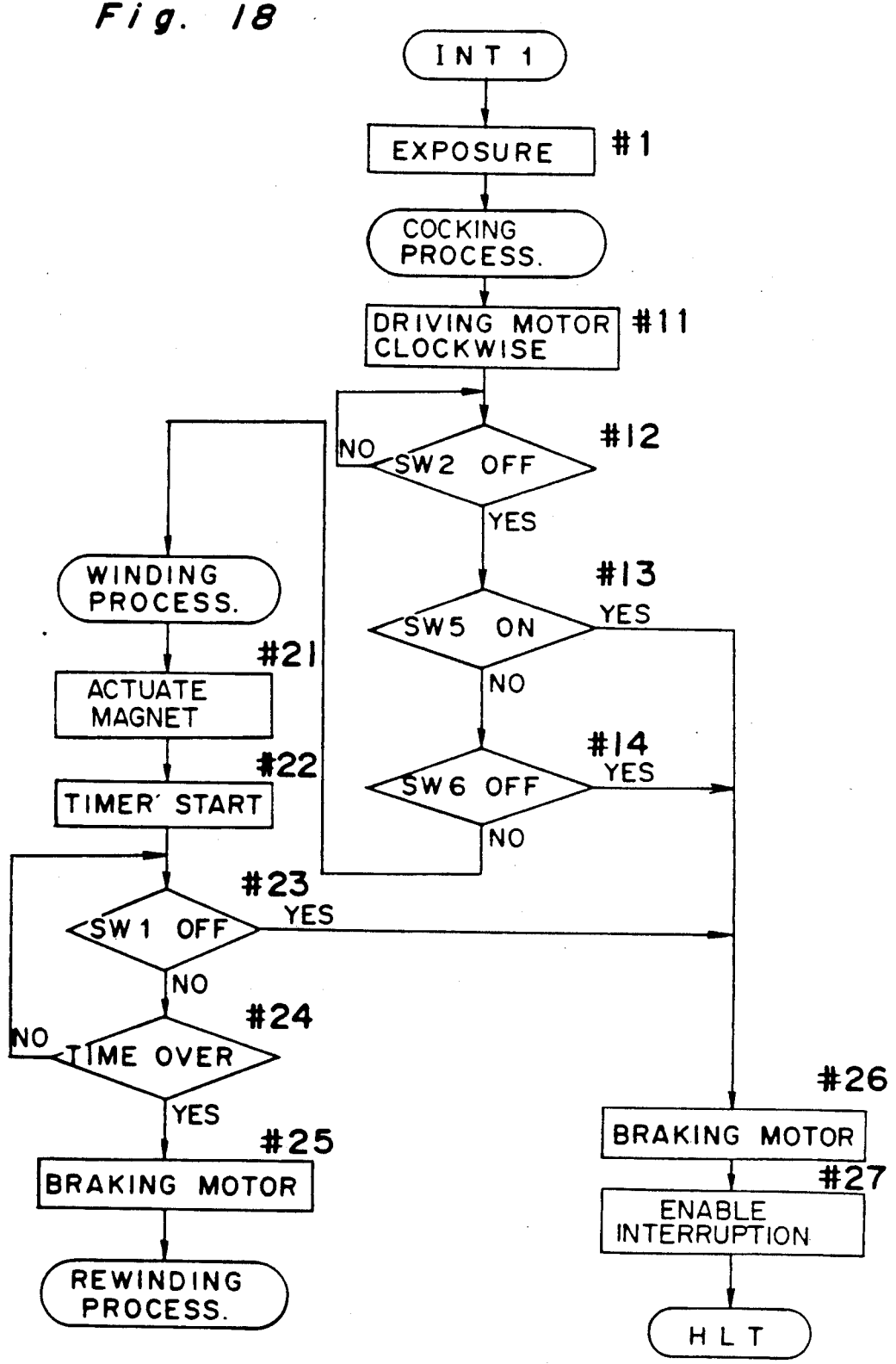
FIG. 18 is a flow-chart showing a routine of a film winding processing.

When a photographer depresses a release button (not shown), the switch SW8 is turned on. Then, as described previously, the voltage applied to the interruption terminal INT1 of the microcomputer μc drops up to the ground level and the microcomputer μc executes the predetermined processing shown by a flow-chart in FIG. 18. First the microcomputer μc makes an order to stop down the diaphragm as well as to rise the mirror (not shown). After that the microcomputer μc outputs an order to make a first curtain of the shutter travel, and a frame of the film is exposed. In a predetermined time (a shutter actuating time) after the first curtain travelling, the microcomputer μc outputs an order to makes a second curtain of the shutter travel. The operation described above is carried out at step #1 of FIG. 18. After completion of the operation of step #1, i.e., in a predetermined time from completion of the travelling of the second curtain, the program goes to step #11 so as for the microcomputer μc to make orders for cocking each mechanism of the mirror, the diaphragm, and the shutter.

It is to be noted, here, that the detailed description executed at step #1 is omitted since it has nothing directly to do with the present invention, in addition, noted that the second switch SW2 is turned on during the operation executed at step #1.

At step #11, the high level signals are outputted from the output terminals $OP_2$, $OP_3$ and the low level signals are outputted from the output terminals $OP_4$, $OP_5$, so that the motor M is driven to rotate in the normal rotational direction. And the program waits at step #11 until the cocking of each mechanism of the mirror, the diaphragm, and the shutter are completed, that is, until the second switch SW2 is turned off. When it is detected at step #12 that the second switch SW2 is off, the program advances to step #13. The detection of whether or not the second switch SW2 is turned on is effected by the microcomputer μc. That is, the microcomputer μc decides the actuating state of the switch SW2 based on a signal inputted into the input terminal IP2. When the high level signal is inputted there, the microcomputer μc decides that the second switch SW2 is turned off. At step #13, it is decided whether the multi-exposure mode is set or not. If it is decided at step #13 that the multi-exposure mode is set, i.e., the microcomputer μc detects the low level signal inputted into the input terminal IP5 through the switch SW5 (that means the switch SW5 is on), the program goes to step #26. At step #26, the motor (M) is braked. On one hand, if it is decided at step #13 that the switch SW5 is off, the program goes to step #14, where it is decided whether or not the film is loaded with the camera. When it is decided at step #14 that the film is not loaded, the program goes to step #26 and the same operation as described above is taken. The decision is effected as follows If the microcomputer μc detects the high level signal inputted into the input terminal IP6 through the switch SW6, the microcomputer μc decides that the switch SW6 is off, i.e., that means no film in the camera. That is, the microcomputer μc controls the film winding so that the operation of the film winding may not effected in the case of no film loaded with the camera. Further, the film winding is not carried out as well in case the back cover of the camera is opened since the switch SW6 is turned off.

In the case where multi-exposure mode is not set and, moreover, the film is loaded with the camera, the program goes to a routine for winding the film (from step #21 to step #25). First, at step #21, the microcomputer μc makes the magnet unit (Mg) actuate. The actuation of the magnet unit (Mg) is effected as follows. The microcomputer μc outputs a pulse with high potential from the output terminal $OP_1$, the pulse having a width of a predetermined time, so that the magnet unit (Mg) is actuated. At the same time, the microcomputer μc resets an internal timer first and, then, makes it operates at step #22. When the magnet unit (Mg) is actuated at step #21, the first switch SW1 is turned on, as previously described, as well as the driving force of the motor (M) is transmitted to the film winding mechanism, resulting in that the film is wound.

After the internal timer is caused to start at step #22, the program waits until the microcomputer μc detects the completion of the film winding of one frame of the film roll (at step #23) or detects a time-up of the internal timer (at step #24). The setting time of the timer is to be set to a little bit longer time (for example, three seconds) than a required time for one frame of the film roll to be wound. As previously described, the first switch SW1 is turned off when the one frame of the film roll has been wound. Therefore, the high level signal is inputted into the input terminal $IP_1$ when the switch SW1 is turned off. Accordingly, the program advances to step #26 when the microcomputer μc detects it at step #23. And at step #26, the high level signal is outputted from the respective output terminals $OP_4$, $OP_5$, so that the motor (M) is braked. After that, the microcomputer μc enables the interruption at step #27, and the microcomputer μc stands by until a next interruption is effected. The above is the operation which is executed by the microcomputer at the normal film winding (see the time-chart of FIG. 13).

On the other hand, in the case where the internal timer counts the setting time without the microcomputer μc detecting the high level signal at the input terminal $IP_1$ the program advances from step #24 to step #25. At step #25, the high level signal is outputted from the respective output terminals $OP_4$, $OP_5$ and the motor (M) is braked. After the rotation of the motor (M) stops completely, the program goes to a routine (shown in FIG. 19) for rewinding the film. It is to be noted that the time-up of the internal timer represents the film being tensed at the final frame of the film roll.

Figure 19:
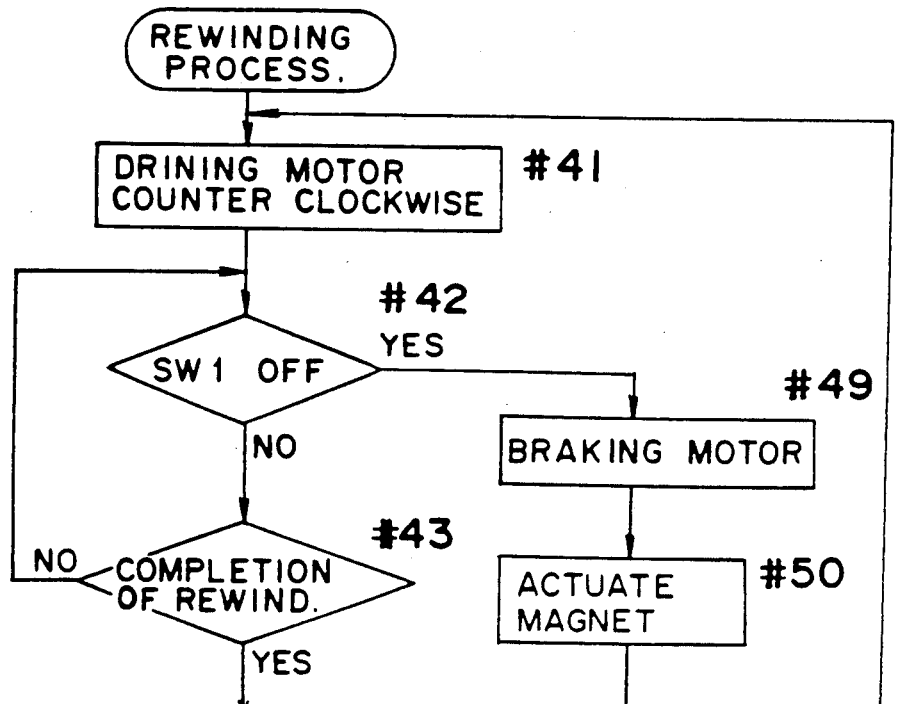
FIG. 19 is a flow-chart showing a routine of a film rewinding processing.

The drawing of FIG. 19 shows a routine of the processing of the film rewinding. When the program goes to this routine, the low level signals are outputted first from the output terminals $OP_2$, $OP_3$ at step #41, so that the motor (M) is driven in the counter-direction to that of the film winding operation. Whereupon, the film rewinding is initiated as previously described. If the attracted piece 105 is attracted to the magnet unit 104 at the time when the film is tensed, the film rewinding may be interrupted on the way of rewinding the film, and the first switch SW1 is turned off. To avoid it, monitoring of the first switch SW1 is available. That is, the microcomputer μc monitors the signal level at the input terminal $IP_1$ during the film rewinding operation at step #42. If the microcomputer μc detects the high level signal at the input terminal $IP_1$ at step #42, the program goes to step #49 and the microcomputer μc outputs the high level signal from the respective output terminals $OP_2$, $OP_3$, so that the motor (M) is braked at step #49. Successively, the microcomputer μc outputs the pulse with the high potential from the output terminal $OP_1$ so as to actuate the magnet unit (Mg) at step #50. It is ensured, as previously described, to rewind the film continuously by the above-mentioned operation, and the program goes to step 41 and the film rewinding operation is initiated again. When the microcomputer μc decides completion of the film rewinding at step #43, it outputs the high level signal from the respective output terminals $OP_2$, $OP_3$ and the motor (M) is braked at step #44. The completion of the film rewinding is decided as follows Namely, when all the frames of the film roll are rewound into the patrone, the camera has the same state as that at unloading the film therewith. That is, the switch SW6 is turned off. When the switch SW6 becomes off, the high level signal is inputted into the input terminal $IP_6$. Accordingly, microcomputer μc decides the completion of the film rewinding when it detects that signal.

When the motor (M) is braked at step #44 and the rotation of the motor (M) completely stops, then the microcomputer μc outputs the high level signal from the respective output terminals $OP_4$, $OP_5$. Whereby, the motor (M) is driven in the normal rotational direction at step #45 After that, the program waits at step #46 until the first switch SW1 is turned off. When the first switch SW1 is turned off, the high level signal is inputted into the input terminal $IP_1$. When the microcomputer μc detects it, it outputs the low level signal from the respective output terminals $OP_4$, $OP_5$. Whereby, the motor (M) is braked at step #47, and at step #48, the microcomputer μc enables the interruption. Then, the microcomputer μc stands by until a next interruption is effected. The above is the operation which is executed by the microcomputer μc at the automatic return of the film (see FIG. 15).

It is to be noted, here, that it is allowed that the detection of the completion of the film rewinding at step #43 is effected as follows Namely, as previously described, the number of how many times the third switch SW3 is turned on during the operation of the film rewinding, in other words, the number of how many times the voltage-drops at the input terminal $IP_3$ occurs is counted and it is decide that the operation of the film rewinding is completed at the time when the numerical values counted during the operation of the film rewinding become equal to the numerical values as a total number of times counted during the operation of the film winding if it is counted how many times the third switch SW3 is turned on during the operation of the film winding.

Next, description of operation which is executed by the microcomputer μc in the case where the photographer wants to carry out the film rewinding on the way of the final frame of the film roll proceeds hereinbelow.

Figure 20:
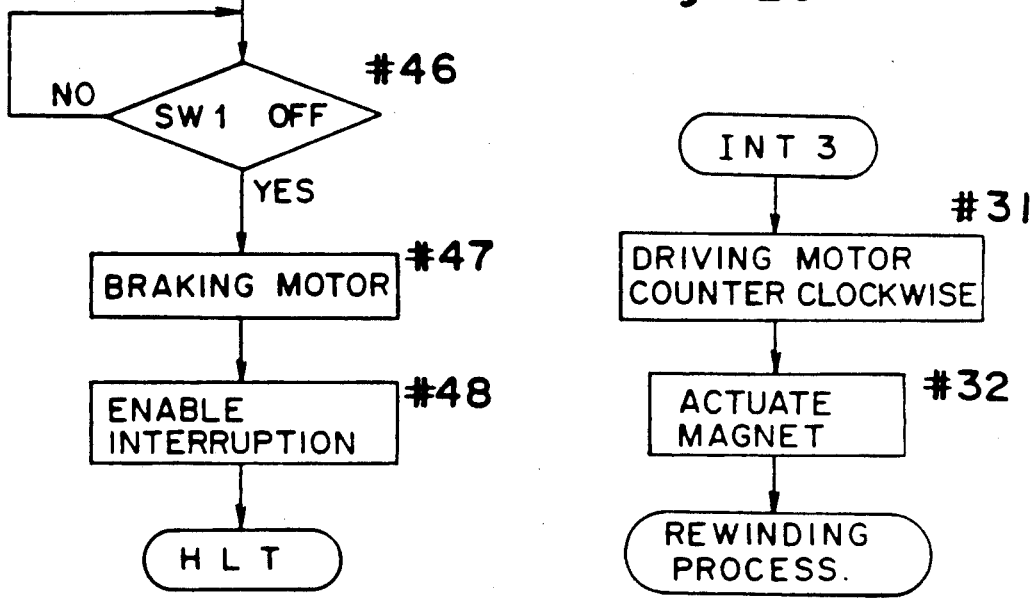
FIG. 20 is a flow-chart showing a routine of a film rewinding processing initiated at a halfway frame of the film roll.

In this case, when the switch SW7 is turned on, the voltage applied to the interruption terminal INT3 of the microcomputer μc drops, as previously described. Then, the microcomputer functions according to the flow-chart shown in FIG. 20. First, the microcomputer μc outputs the low level signal from the respective output terminals $OP_2$, $OP_3$ and outputs the high level signal from the respective output terminals $OP_4$, $OP_5$, so that the motor (M) is driven in the counter-direction to that of the film winding at step #31. After that, in a slightly few second (approx. 30 msec.) for which the backlash of the gearing is absorbed by rotating gears, the microcomputer μc outputs the pulse with the high potential from the output terminal $OP_1$, so that the magnet unit (Mg) is actuated at step #32. Then, the program goes to the aforementioned routine (FIG. 19) of the processing of the film rewinding and the film rewinding is executed. The above is the operation which is executed by the microcomputer μc in the case (refer to FIG. 16) where the photographer wants to carry out the film rewinding on the way to the final frame of the film roll.

Last, description of operation which is executed by the microcomputer μc at initial loading of the film proceeds hereinbelow.

Figure 21:
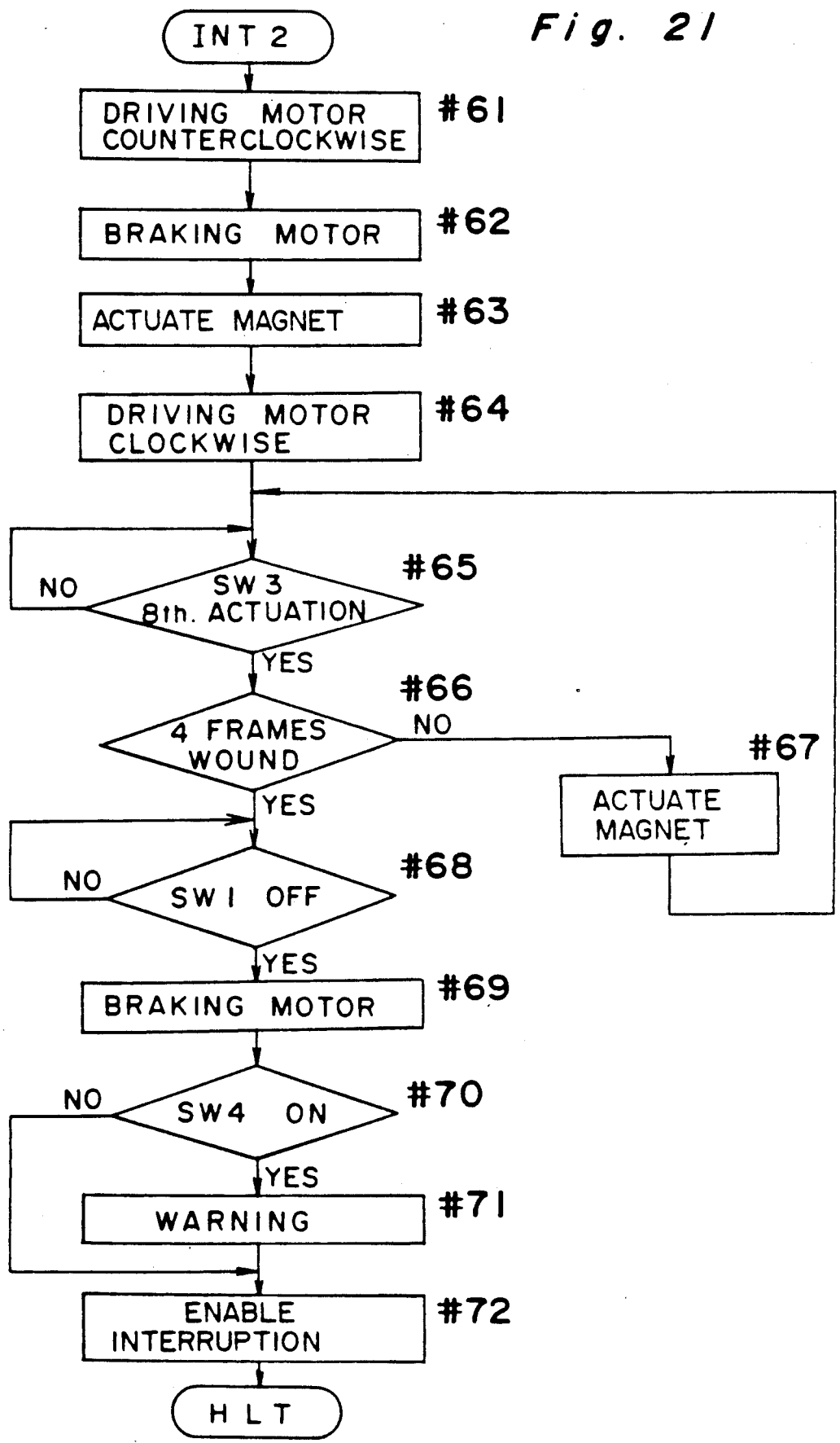
FIG. 21 is a floe-chart showing a routine of a initial loading processing.

As previously described, when the film is put into the camera and the back cover is closed, the sixth switch SW6 is turned on, so that the voltage applied to the interruption terminal INT2 drops. When the microcomputer μc detects the voltage-drop thereat, the microcomputer μc operates according to a flow-chart shown in FIG. 21. First the microcomputer μc outputs the low level signal from the respective output terminals $OP_2$, $OP_3$ and outputs the high level signal from the respective output terminals $OP_4$, $OP_5$, so that the motor (M) is driven in the counter-direction to that of the film winding at step #61. In a slightly few second (approx. 30 msec.) for which the backlash of the gearing is absorbed by rotating gears, the microcomputer μc outputs the high level signal from the respective output terminals $OP_2$, $OP_3$, so that the motor (M) is braked at step #62. Successively, the microcomputer μc outputs the pulse with the high potential so that the magnet unit (Mg) is actuated at step #63. When the magnet unit (Mg) is actuated at step #63, the first switch SW1 is turned on. Thereafter, the microcomputer μc outputs the low level signal from the respective output terminals $OP_4$, $OP_5$, so that the motor (M) is driven in the normal direction at step #64. Whereupon, as previously described, the film sprocket 25 rotates and the third switch SW3 is turned on repeatedly. The microcomputer μc counts the number of how many times the third switch SW3 is turned on. When the microcomputer μc detects the eight actuation of the switch SW3, the microcomputer μc decides that the one frame of the film roll has been fed out at step #65. Successively, the program advances to step #66 and it is decided at step #66 whether or not the total amount of the four frames of the film roll is fed out. If decided at step #66 that the film feeding of the four frames is not completed, the program advances to step #67 and the microcomputer μc outputs the pulse with the high potential from the output terminal $OP_1$. Accordingly, the magnet unit (Mg) is actuated so as to prevent the stopper arranged in the film winding mechanism from operating at step #67, then the program returns to step #65.

On the other hand, when it is decided at step #66 that the total amount of the four frames of the film roll is fed out, the microcomputer μc waits until the first switch SW1 is turned off at step #68. When the high level signal is inputted into the input terminal $IP_1$, the microcomputer μc decides at step #68 that the first switch SW1 is turned off, and the microcomputer μc outputs the high level signal from the respective output terminals $OP_4$, $OP_5$, so that the motor (M) is braked at step #69. Successively, the microcomputer μc confirms at step #70 whether the initial loading of the film is correctly executed or not. As previously described, if the initial loading is successful and the film is wound around the spool 14, the fourth switch SW4 is turned off. Thereupon, the microcomputer μc monitors the voltage at the input terminal $IP_4$. That is, when the high level signal is inputted into tho input terminal $IP_4$, the microcomputer μc decides that the fourth switch SW4 is turned off and the initial loading is successful. Therefore, the program goes from step #70 to step #72. On the contrary to the above if at step #70 the low level signal is inputted to the input terminal $IP_4$, the microcomputer μc decides that the fourth switch SW4 is still on and the initial loading becomes unsuccessful. Then the program advances to step #71 and it is warned to the photographer that the initial loading of the film is not successful and thereafter, the program advances to step #72. At step #72 the microcomputer μc enables the interruption, then the microcomputer μc stands by until a next interruption is effected. The above is the operation which is executed by the microcomputer μc at the initial loading (refer to FIG. 14) of the film.

It is to be noted, here, that it is acceptable that an additional microcomputer for the exclusive use of the film winding/rewinding is provided in the camera system although the microcomputer, as control means, in the above-mentioned embodiment has functions for controlling an exposure of the camera. In this case, a switch is provided which is turned on at the time when the second curtain of the shutter mechanism has travelled as well as which is turned off when the shutter mechanism has been cocked. And when the switch is turned on, it is so designed that the microcomputer is initiated to operate according to the flow-chart shown in FIG. 18 and to execute to start from the processing at step #11 therein. In addition to the above, it is apparent that it is possible to construct control means only with a hardware of an electrical circuit, such as logic circuits, flip-flops, semiconductor switching elements, relays, and so on, without utilizing a microcomputer.

Meanwhile, in a camera having such an automatic film winding mechanism, a relatively heavy load acts on a stopper device, provided for the film winding mechanism, to stop winding the film at completion of the film winding, so that dislocking of the stopper device requires a large amount of a counter force against the load on the occasion of the successive film winding. There are various types of structures of dislocking mechanisms available, corresponding to the types of stopper devices. No matter what type of the dislocking mechanisms is, the automatic film winding mechanism normally has a driving source for dislocking the stopper device. For example, in the case of an automatic film winding mechanism having a stopper device including a lever which is actuated by a spring and by which the stopper device is dislocked, the mechanism requires holding means (driving source) for holding an operating position of the lever by which the mechanism is locked against the spring force. If a magnet unit, for example, as such holding means may be utilized, a size of the magnet unit which is accommodated in a camera body is limited fundamentally. Accordingly, a dynamic power to be generated by the magnet is limited, so that the spring force capable of holding the lever at its nonoperating position by the spring is limited.

A driving capacity of the driving source should exceeds, at least, the spring force (dislocking force). On the other hand, it is preferable that the driving source in the camera body is a smaller one as much as possible from the miniaturized point of view on a camera. Therefore, it is one factor and is very important for miniaturization and cost-down of a camera that the dislocking of the stopper device is enabled by a smaller dynamic power. Furthermore, if it is enabled to dislock the stopper device with the smaller dynamic power, it is ensured to dislock the automatic film winding mechanism. As a result of that, it is improved that reliability of the automatic film winding mechanism.

Hereinbelow, one example capable of dislocking a stopper device with a small dynamic power is explained.

Figure 24:
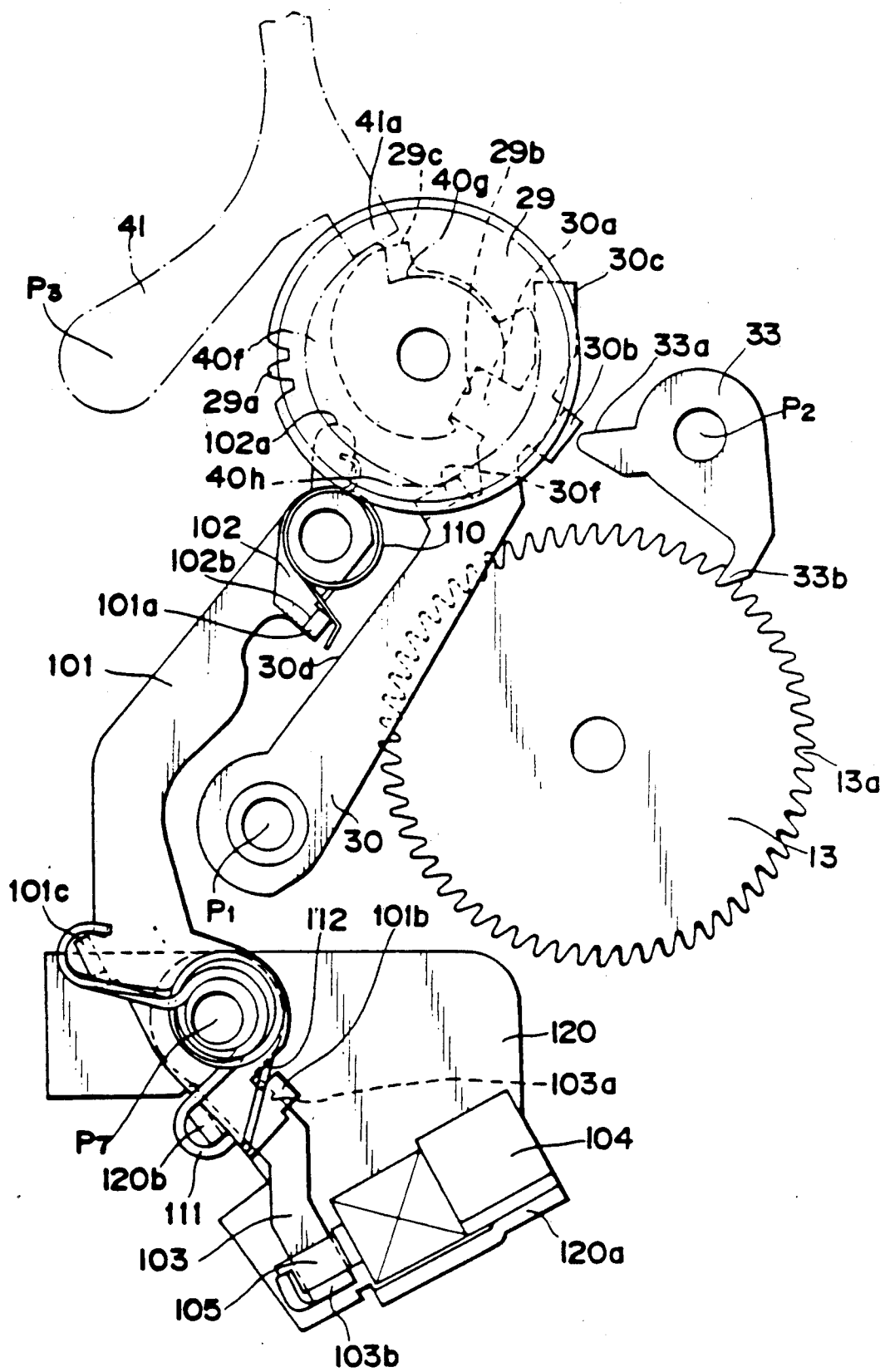
FIG. 24 is a plan view showing one modification of the stopper device of the film winding mechanism, which is applicable to the present invention.

Referring now to FIG. 24, there is shown an essential portion of a stopper device for the film winding mechanism as an example. FIG. 24 is equivalent to FIGS. 6 to 8 of the aforementioned embodiment. The identified members are designated by the same reference numerals.

As shown in FIG. 24, a cam stopper 40f of a cam controller 40 is provided with a projection 40h which is located at a different position from that of the aforementioned recession 40g.

In FIG. 24, it is so arranged that the rotational axes of the cam controller 40 and a film winding controller 29 are in common. In case, however, both members of the cam controller 40 and the film winding controller 29 are arranged apart from each other, it is necessary to disposed auxiliary means between the cam controller 40 and a 1st. lock lever 30.

The above-mentioned projection 40h comes in contact with a bent member 30f of the 1st. lock lever 30 and causes the 1st. lock lever 30 to turn clockwise directly before the time when cocking of each mechanism of a diaphragm, a mirror and a shutter is completed by rotating in the counterclockwise direction of the cam controller 40 as well as a projection 41a of a cocking control lever 41 falls into the recession 40g of the cam controller 40. But, the clockwise rotational quantity of the 1st. lock lever 30 is a slight few and the 1st. lock lever 30 does not turn up to a breaking point at which an engagement between a 1st. projection 30a of the 1st. lock lever 30 and a recession 29b of the film winding controller 29 is canceled. After that, as previously described, the cocking control lever 41 turns clockwise and the projection 41a of the cocking control lever 41 falls into the recession 40g of the cam controller 40, so that a second switch SW2 is turned off. Detecting this switch-over, the voltage is applied to a magnet unit 104 so that the engagement between the 1st. lock lever 30 and film winding controller 29 is canceled.

Thus, directly before the projection 41a falls into the recession 40g, the bent member 30f of the 1st. lock lever 30 is pushed and is caused to move to that way by the projection 40h of the cam controller 40 which is rotating counterclockwise. Whereby, a load remaining between the recession 29b of the film winding controller 29 and the 1st. projection 30a of the 1st. lock lever 30 in the directly preceding processing of the film winding can be released, so that the 1st. lock lever 30 can be dislocked with a small power.

Finally, description of another embodiment showing control means in the present invention proceeds hereinafter. The embodiment of the control means described below is completely different from the before-mentioned embodiment (FIG. 17 to FIG. 21). Therefore, if members with same reference numerals ar included in the description of this embodiment, members or elements with the same reference numeral as that in the before-mentioned one may be different from each other. As far as the mechanical members are concerned, there is no deviation between both reference numerals since this embodiment of the control means is applied to control the mechanism of the before-mentioned embodiment.

Figure 25:
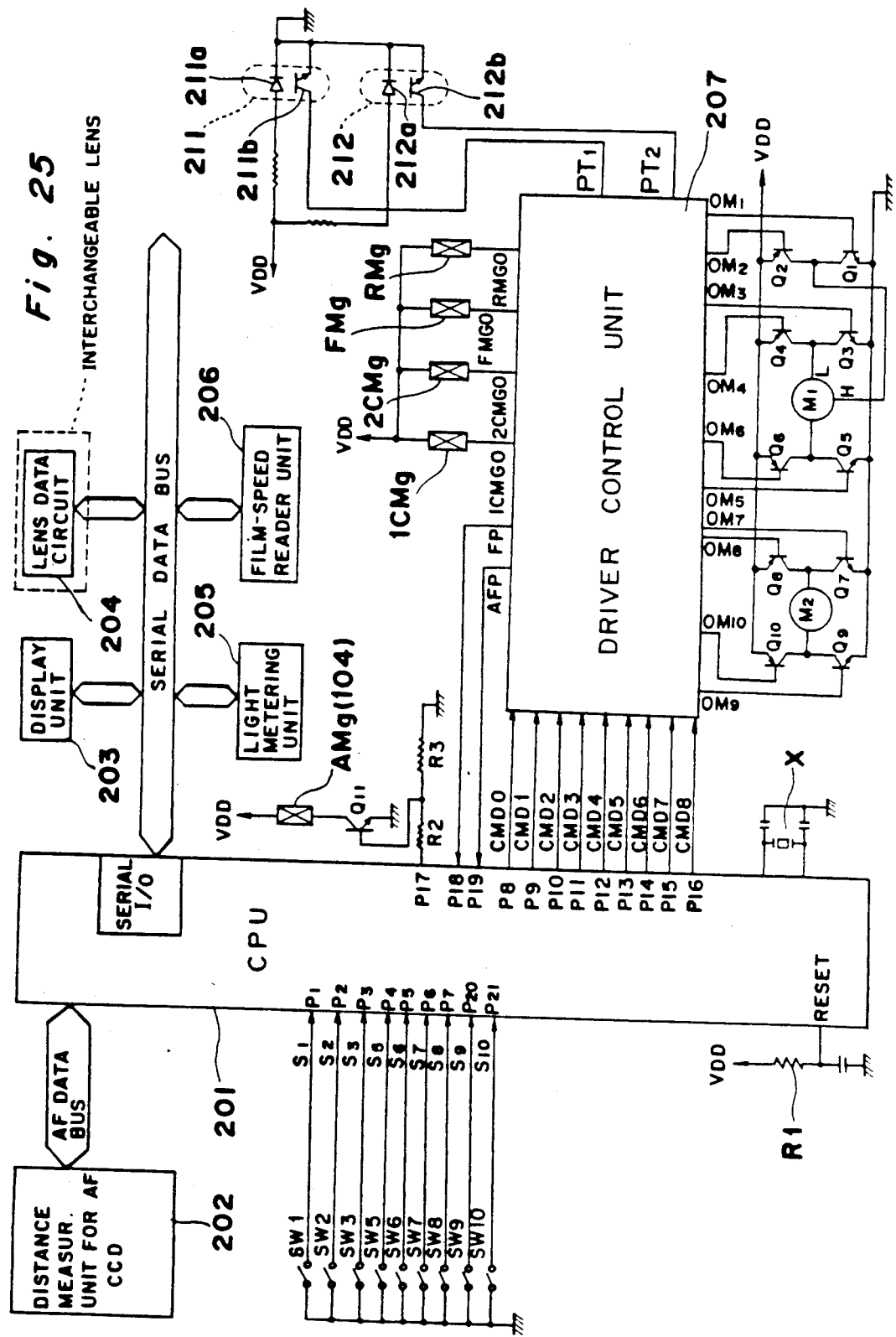
FIG. 25 is a wiring diagram including a microcomputer as a control means, for controlling the total mechanism, which shows another embodiment of the present invention.

Referring now to the drawing of FIG. 25, there is shown an electrical circuit of a camera to which the present invention is applicable. A reference numeral 201 represents a microcomputer (hereinafter, referred to as CPU) having functions of sequential control of camera operation, calculation of exposure, calculation and control of automatically focussing (hereinafter, referred to as AF) of a camera and so on. The CPU 201 has terminals connected to data buses and various types of input- and output terminals $P_1$ to $P_{21}$ described below. A reference numeral 202 represents a distance measuring unit for the AF for measuring a defocus amount of an objective image at an equivalent position of a film surface. The distance measuring unit 202 comprises a one-dimensional self-scanning type charge coupled device (hereinafter, referred to as CCD), a CCD driver, an A/D converter, and a reference voltage source for A/D conversion. Analog information of a picture image obtained through the CCD is converted into a digital signal, and then, the digital signal is sent in the CPU 201 through an AF data bus. A reference numeral 203 represents a display unit comprising a liquid crystal display (LCD) or a light emitting diode (LED). The display unit 203 displays a shutter speed (Tv) which is calculated and transferred from the CPU 201 as a calculated result of automatic exposure (hereinafter, referred to as AE), an aperture value (Av), and information of a photographic operation mode. A reference numeral 204 represents a lens data circuit memorizing a fully open aperture value, a maximum aperture value corresponding to a minimum aperture, a focal length, and a conversion coefficient of a lens moving amount necessary for focusing, all of which are defined in every interchangeable lens. These data are transferred to the CPU 201 through electric contacts arranged at a lens mount of a camera body when the interchangeable lens is mounted thereto. A reference numeral 205 represents a light metering unit for measuring luminance (Bv), comprising light receiving elements, an A/D converter, a reference voltage source for A/D conversion, a data I/O interface unit, and so on. The light metering unit 205 measures the light through a photographic lens in response to an order given from the CPU 201. A reference numeral 206 represents an automatic film-speed reader unit which reads a film-speed data recorded on a patrone of the film loaded in the camera through electric contacts disposed in a patrone chamber of the camera. Each information of the lens data circuit 204, the light metering unit 205, and the film-speed reader unit 206 is inputted into a serial input- and output unit (hereinafter, referred to as I/O unit) of the CPU 201 as serial signals through a serial data bus. And display data is transmitted from the I/O unit to the display unit 203 through the same data bus.

A reference numeral 207 represents a driver control unit which drives a sequence motor $M_1$ for driving a mechanism of film winding and film rewinding (which is equivalent to the motor 1 shown in FIG. 1) and drive an AF-motor $M_2$ for driving the lens for auto focusing and actuates various types of magnet units provided in the camera body. These actuators are controlled by the driver control unit 207 by means of control signals on control signal lines CMD0 to CMD8 connected with the output terminals $P_8$ to $P_{16}$ of the CPU 201.

Reference symbols SW1 to SW3 and SW5 to SW10 represent switches, respectively. One terminal of each switch is grounded and the other of each switch is connected to the input terminals $P_1$ to $P_7$ and $P_{20}$, $P_{21}$ through control signal lines $S_1$ to $S_3$ and $S_5$ to $S_{10}$, respectively. The switches SW1 to SW3 are the switches which are described in the description of the mechanism of the before-mentioned embodiment. The switch SW5 is a photometry switch which is turned on at a first stage of depressing of a release button (not shown). When the switch SW5 is turned on, the CPU 201 outputs signals for initiating the light metering and the distance measuring. While the switch SW5 is on the lens is driven continuously if the lens is located at an out of focus position, and the lens driving is caused to stop when the lens reaches an in-focus position. Further, if the release button is not depressed and the switch SW5 is turned off while the lens is driven, the lens driving is caused to stop immediately. The switch SW6 is a release switch which is turned on at a second stage of depressing the release button. When the switch SW6 is caused to be turned on at a state accepted shutter-release, the CPU 201 orders shutter releasing operation. It is so designed that the photometry switch SW5 is turned on while the release switch SW6 is turned on. The switch SW7 is a film detecting switch. While facing the film, the switch SW7 keeps off, and the switch SW7 is turned on when the film disappears in front of the switch SW7. When the switch SW7 is actuated from the Off-state to the On-state at the film rewinding, it represents that an end of the film roll is outside the patrone a little bit. Accordingly, this switch SW7 is used for detecting the completion of film rewinding. The switch SW8 is a patrone detecting switch which is arranged close to the electric contacts, of the film-speed reader unit 206, disposed in the patrone chamber. While the patrone is in the patrone chamber and the back cover is closed, the switch SW8 is turned on, while it is turned off when the patrone disappears therefrom. The switch SW9 is a cover switch which is turned on when the back cover is closed completely. The switch SW10 is a switch for switching-over the multi-exposure mode. While this switch SW10 is on, the multi-exposure mode is available.

A reference symbol RESET represents a reset terminal of the CPU 201, which is pulled up to the voltage +VDD through a resistor $R_1$. When a level of the voltage at its terminal RESET changes from a low level to a high level, it is so arranged that the CPU 201 is reset. A reference symbol X is a crystal oscillator which gives a clock signal to the CPU 201.

Next, description of the driver control unit 207 and each control unit proceeds hereinbelow.

"1CMg" represents a magnet unit for holding a first curtain of the shutter at its initial position. When a level of the signal on an output signal line 1CMGO becomes low, voltage is applied to the magnet unit 1CMg, so that the first curtain of the shutter is held. "2CMg" represents a magnet unit for holding a second curtain of the shutter at its initial position. When a level of the signal on an output signal line 2CMGO becomes low, voltage is applied to the magnet unit 2CMg, so that the second curtain of the shutter is held. A period of time from when holding of the first curtain is cancelled to when holding of the second curtain is cancelled is equivalent to a shutter speed. "FMg" represents a magnet unit for restraining the diaphragm. When a level of the signal on an output signal line FMGO becomes low, voltage is applied to the magnet unit FMg, so that a holding member of the diaphragm is held at its regular position, and when holding of the diaphragm holding member is cancelled, the diaphragm holding member operates and fixes the diaphragm to a predetermined or calculated aperture. "RMg" represents a magnet unit for releasing the mechanism of the diaphragm and the mirror. When a level of the signal on an output signal line RMGO becomes low for a certain period of time, voltage is applied to the magnet unit RMg, so that an release member is disengaged, and then, the aperture of the diaphragm is reduced and the mirror is caused to be up.

A reference symbols $Q_1$ to $Q_{10}$ represents transistors for driving the sequence motor M1 and the AF-motor $M_2$. The sequence motor $M_1$ has two types of windings internally and has two types of characteristics on driving performance. That is, one is driving at a low rotational speed with a high torque (referred to as low charac. driving) and the other is driving at a high rotational speed with a low torque (referred to as high charac. driving). These two characteristics are selectable. Further, the abovementioned transistors $Q_1$ to $Q_6$ are connected in the circuit so as for the sequence motor $M_1$ to make a reversible rotation under the two types of characteristic. More specifically, An input terminal on the high charac. driving of the motor $M_1$ is connected with a common connecting point of both transistors $Q_1$ and $Q_2$ and an input terminal on the low charac. driving of the motor $M_1$ is connected with a common connecting point of both transistors $Q_3$ and $Q_4$ and the others of common input terminals of the motor $M_1$ is connected with a common connecting point of both transistors $Q_5$ and $Q_6$. The TABLE 1 shows relationship between the rotational directions of the motor $M_1$ and activating of each transistors $Q_1$ to $Q_6$.

TABLE 1

| Transistors | | | | | | State of Motor |
|---|---|---|---|---|---|---|
| $Q_1$ | $Q_2$ | $Q_3$ | $Q_4$ | $Q_5$ | $Q_6$ | $M_1$ |
| OFF | OFF | OFF | ON | ON | OFF | Low; Nor. rotat. |
| OFF | OFF | ON | OFF | OFF | ON | Low; Rev. rotat. |
| OFF | ON | OFF | OFF | ON | OFF | High; Nor. rotat. |
| ON | OFF | OFF | OFF | OFF | ON | High; Rev. rotat. |
| OFF | OFF | OFF | OFF | OFF | OFF | Off (Stoppage) |
| OFF | OFF | ON | OFF | ON | OFF | Low; Braking |
| ON | OFF | OFF | OFF | ON | OFF | High; Braking |

It is to be noted that braking operation under the high charac. driving is not applied but the braking operation is applied under the low charac. driving. Accordingly, the term of the "braking" in the description proceeding hereinafter represents to be the braking under the low charac. driving.

The transistors $Q_7$ to $Q_{10}$ are connected by a bridge connection in the circuit so as for the AF-motor $M_2$ to make a reversible rotation. It is so designed that the photographic lens is drawn out with the normal rotation of the AF-motor $M_2$ and the lens is drawn in with the reverse rotation of that. Reference symbols $OM_1$ to $OM_{10}$ represent control signal lines for switching the respective transistors $Q_1$ to $Q_{10}$.

Reference numerals 211 and 212 designate an encoder for the diaphragm and an encoder for the AF, respectively, each of them comprising a photo-coupler. The two encoders are, respectively, connected with the driver control unit 207 through respective control signal lines $PT_1$, $PT_2$. The encoder 211 for the diaphragm is provided so as to monitor a stroke of a diaphragm pre-setting lever on the shutter releasing. One 211 of the above-mentioned encoders is so connected as to function in such a way. On the shutter releasing, light emission by a light emitting diode 211a is detected by a photo-transistor 211b and its detecting signal is inputted into the driver control unit 207 through the control signal line $PT_1$. After the detecting signal is converted into a pulsewise signal by the driver control unit 207 therein, the pulsewise signal is inputted into the input terminal $P_{18}$ of the CPU through a control signal line FP. The encoder for the AF is provided so as to monitor the number of revolutions of the AF motor $M_2$, i.e., a lens movement amount, on the auto-focusing. The other 212 of the above-mentioned encoders is so connected as to function in such a way. Light emission by a light emitting diode 212a is detected by a photo-transistor 212b and its detecting signal is inputted into the driver control unit 207 through the control signal line $PT_2$. After the detecting signal is converted into a pulsewise signal by the driver control unit 207 therein, the pulsewise signal is inputted into the input terminal $P_{19}$ of the CPU 201 through a control signal line AFP.

Reference symbols CMD0 to CMD8 represent control signal lines, respectively which are connected to the output terminals P8 to P16 of the CPU 201 and on which control signals, outputted by the CPU 201, for controlling the driver control unit 207 are transmitted to the CPU 201. By means of the respective control signal lines CMD0 and CMD1, respective control signals for controlling the respective magnet units RMg and FMg are transmitted to the driver control unit 207. By means of the respective control signal lines CMD2 and CMD3, respective control signals for controlling the respective magnet units ICMg and 2CMg are transmitted to the driver control unit 207. By means of the respective control signal lines CMD4 to CMD6, respective control signals for controlling the sequence motor M1 are transmitted to the driver control unit 207. By means of the respective control signal lines CMD7 and CMD8, respective control signals for controlling the AF motor M2 are transmitted to the driver control unit 207. The driver control unit 207 outputs the same signals as are transmitted through lines CMD0 to CMD3 to the magnet units RMg, FMg, lCMg, and 2CMg through the lines RMGO, FMGO, lCMGO, and 2CMGO. And the unit 207 outputs signals according to the control signals transmitted through the lines CMD4 to CMD8 as shown in TABLE 2 and TABLE 3. Each of TABLE 2 and TABLE 3 represents each controlled state of the sequence motor $M_1$ and the AF motor $M_2$.

TABLE 3

| Control signal from CPU | | Output signal from driver control unit | | | | State of motor |
|---|---|---|---|---|---|---|
| CMD7 | CMD8 | $OM_7$ | $OM_8$ | $OM_9$ | $OM_{10}$ | $M_2$ |
| L | H | L | L | H | H | Clockwise |
| H | L | H | H | L | L | Count. clockwise |
| H | H | L | H | L | H | Stoppage |
| L | L | H | H | H | H | Braking |

A reference symbol AMg represents the magnet unit 104 which is described in the before-mentioned embodiment and is for cancelling the engagement of the stopper device of the film winding mechanism (hereinafter, designated as symbol "AMg"). The magnet unit AMg is so arranged that one terminal of the magnet unit AMg is connected to the output terminal $P_{17}$ of the CPU 201 through a transistor $Q_{11}$ and a resistor R2 which are connected with each other in series, i.e., the magnet unit AMg to the transistor $Q_{11}$; the transistor $Q_{11}$ to the resistor R2; the resistor R2 to the output terminal $P_{17}$, and the other of the magnet unit AMg is connected with the power line VDD. And one end of a resistor R3 is connected with a common connecting point between the transistor $Q_{11}$ and the resistor R2 and the other end of the resistor R3 is grounded. The low level signal is normally applied to the output terminal $P_{17}$ of the CPU 201, so that the transistor $Q_{11}$ is disactivated (off). Accordingly, current does not flow through the magnet unit AMg and the attracted piece 105 is attracted thereto and held therewith. In order to cancel the engagement between the film winding controller 29 and the 1st. lock lever 30, it is necessary for the signal level at the output terminal $P_{17}$ of the CPU 201 to become high. When the signal level thereat becomes high, the transistor $Q_{11}$ is activated and current flows through the magnet unit AMg, so that the attraction force of the magnet unit AMg is extinguished.

Next, description of operation of a camera system proceeds based on flow-charts. When the release button is depressed half-way, the photometry switch SW5 changes from the Off-state to the On-state at the first stage of the depressing and the light metering and the distance measuring is initiated. If the photographic lens is located at its out-of-focus position, the lens is driven till the time when the lens is at the in-focus state. When the lens reaches its in-focus position, the lens driving is caused to stop. The light metering and the distance measuring are repeated while the switch SW5 is turned on. When the lens is focused and the release switch SW6 is turned on at the second stage of the fully depressing of the release button, the light metering and the distance measuring are interrupted. Under these cicumstances, a routine, shown in FIG. 26, for releasing of the

TABLE 2

| Control signal from CPU | | | Output signal from driver control unit | | | | | | State of motor |
|---|---|---|---|---|---|---|---|---|---|
| CMD4 | CMD5 | CMD6 | $OM_1$ | $OM_2$ | $OM_3$ | $OM_4$ | $OM_5$ | $OM_6$ | $M_1$ |
| H | L | L | L | H | L | L | H | H | Low; Cl-w |
| L | H | L | L | H | H | H | L | L | Low; Ccl-w |
| H | L | H | L | L | L | H | H | H | High; Cl-w |
| L | H | H | H | H | L | H | L | L | High; Ccl-w |
| H | H | H | L | H | H | H | L | H | Stoppage |
| L | L | L | L | H | H | H | H | H | Low; Braking |
| L | L | H | H | H | L | H | H | H | High; Braking |

Figure 26:
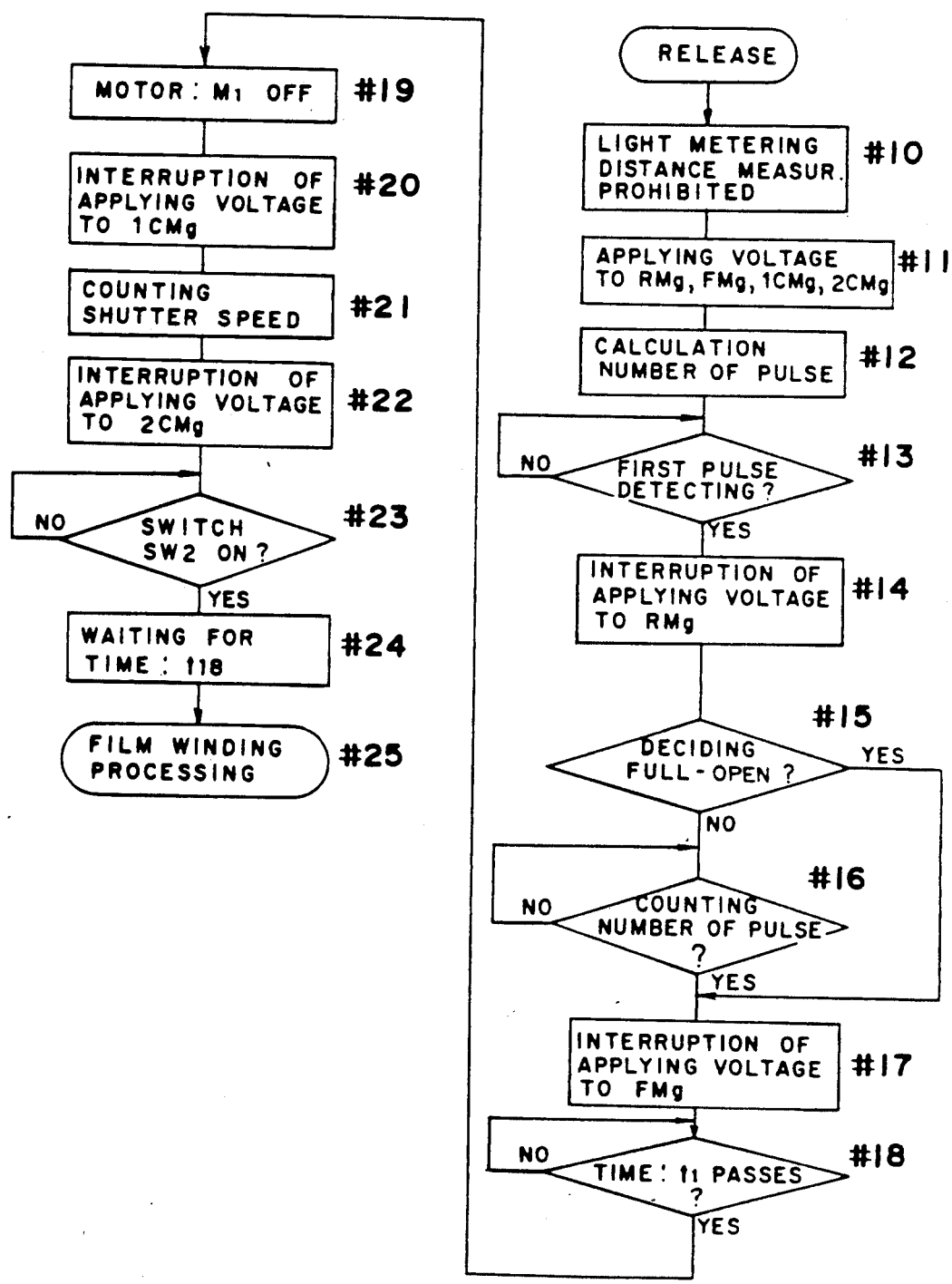
FIG. 26 is a flow-chart showing a routine of a shutter releasing processing in the another embodiment.

Remarks:
Cl-w: clockwise,
Ccl-w: counterclockwise, camera system is executed. In FIG. 26, at first, the calculations of the light metering and the distance measuring are prohibited at step #10, and the voltage is applied to the magnet unit RMg for releasing at step #11, so that the following operations are performed. That is, cancellation of the restraint of the releasing member is cancelled and the stopping down operation and the mirror up operation are performed. At the same time, the voltage is applied to each of the magnet unit for the diaphragm, the magnet unit for the first curtain of the shutter, and the magnet unit for the second curtain of the shutter FMg, 1CMg, and 2CMg so as to hold the diaphragm holding member, the first curtain, and second curtain, respectively. At step #12, an aperture value is calculated on the basis of the data from the light metering unit 205 and the film-speed reader unit 206, and the number of pulse signals, which represents an amount of stopping down from full open aperture to the calculated aperture, is calculated. It is detected at step #13 that the state of the input terminal $P_{18}$ of the CPU 201. That is, program waits at step #13 till the time when the first pulse signal inputted to the terminal $P_{18}$ is detected. When the first pulse signal is detected thereat, the program advances to step #14. At step #14, it is stopped to apply the voltage to the magnet unit for releasing RMg since it is surely confirmed that the restraint of the releasing member is cancelled at this stage. It is decided at step #15 whether or not the calculated aperture value is equivalent to that of full open aperture. If it is the full open aperture, the program goes to step #17. It is stopped to apply the voltage to the magnet unit FMg for holding the diaphragm at step #17, so that the diaphragm is immediately restrain, resulting in that the aperture is set to open aperture. In case where the calculated aperture value at step #15 is not the value of full open aperture, the program advances to step #16. The program waits at step #16 until the number of the pulse signals which is calculated at step #12 is generated. When the number of the pulse signals is generated at step #66, it is stopped to apply the voltage to the magnet unit FMg for holding the diaphragm so that the diaphragm is set to a calculated aperture. On one hand, the mirror rises continuously in the meantime. And, in FIG. 1, the connecting lever 60 moves to the right hand. Then, the projection 60a of the connecting lever 60 pushes the extension arm end 41b of the cocking control lever 41, so that the cocking control lever 41 is caused to swing counterclockwise. Whereupon, the engagement between the projection 41a of the cocking control lever 41 and the recession 40g of the cam controller 40 is cancelled, resulting in that the cam controller 40 has a state ready for rotating (the state shown in FIG. 10). At this time, the second switch SW2 is turned on.

It is decided at step #18 whether or not a time:tl has passed since the voltage is applied to the magnet unit RMg for releasing. The program waits at step #18 till that time passes. It is to be noted that the time enough for the diaphragm to be stopped down and enough for the mirror to rise completely is so set. When the stopping down operation and the mirror rising operation are completed as well as the time:$t_1$ passes, then the program advances to step #19. At step #19, the sequence motor $M_1$ is caused to be turned off, i.e., stoppage. Originally, on the occasion of taking a picture under a single-frame photographing mode or the first frame of the film roll in a continuously photographing mode, the sequence motor $M_1$ keeps turning off. Accordingly, it is meaningless to cause the sequence motor $M_1$ to be turned off on and after the second frame of the film roll the motor $M_1$ is controlled to be braked from the time of completion of the film winding. Therefore, the step #19 is provided in order to cancel such a condition. At step #20, the voltage applied to the magnet unit 1CMg for the first curtain of the shutter is interrupted so that the holding of the first curtain is cancelled. That is, the first curtain starts to travel. At step #21, a time is counted based on a value, of the shutter speed, calculated on the basis of the data inputted from the light metering unit 205 and the film-speed reader unit 206, and thereafter, the voltage applied to the magnet unit 2CMg for the second curtain of the shutter is interrupted at step #22 so as to cancel the holding of the second curtain. That is, the second curtain starts to travel.

At step #23, it is decided whether or not the second switch SW2 is on. Normally, the second switch SW2 is on at this point of the flow since, as previously described, the engagement between the projection 41a of the cocking control lever 41 and the recession 40g of the cam controller 40 is cancelled by means of the connecting lever 60, so that the program advances to step #245, immediately. In case a photographer depresses the release button with holding the mirror by his hand or anything else undr no interchangeable lens mounted on the camera, the stopping down operation is carried out but the mirror can not rise from its lower position. Consequently, the connecting lever 60 which is associated with the mirror can not move so that the engagement between the projection 41a of the cocking control lever 41 and the recession 40g of the cam controller 40 may not be cancelled. Accordingly, the program does not advance from step #23 to the further step since the second switch SW2 keeps turning off. If the photographer draws his hand from the mirror, the mirror rises and the engagement mentioned above is cancelled and then, the second switch SW2 is turned on and the program is to advance to step #24. In addition, if the mirror is held at its lower position, the shutter can not travel because of the association between the connecting lever 60 and the mirror even though the magnet units 1CMg and 2CMg for the first and second curtains of the shutter have already cancelled the holdings of the first and second curtains. Accordingly, when he draw his hand from the mirror, the exposure is not to be fulfilled since both of the first and second curtains travel simultaneously at the time when the mirror is rising. However, it does not matter that there is no intention of the photographing, since the camera has no photographic lens. At step #24, the program waits for a time:$t_{18}$ and, then, advances to step #25. At step #25, execution of processing of the film winding is made. The time:$t_{18}$ is equivalent to a time enough for travelling of the second curtain of the shutter to be completed after the holding of the second curtain of the shutter is cancelled.

Next, a routine of the film winding processing is explained according to FIG. 27A to FIG. 27D. At first, cocking flag is set at step #29. The voltage is applied to the sequence motor $M_1$ at step #30 so as to rotate in the normal direction (the clockwise direction) at the low charac. driving. At step #31, the program waits for a time:$t_2$. After that, as described later on, it is decided at step #32 whether or not the driving mode of the motor $M_1$ has been changed to the low charac. driving while the second switch SW2 is on during the winding of a preceding frame of the film roll. In the case where the driving mode of the motor $M_1$ has been changed from the high charac. driving to the low charac.- driving while the second switch SW2 is on in the winding of the preceding frame of the film roll, the program goes to step #36 and a timer is set to a time:$t_4$ at step #36 and the program advances to step #35 and starts the timer to count time:$t_4$. In this case, the motor $M_1$ is driven at the low charac. driving until the second switch SW2 is turned off. It is decided at step #32 that the driving mode has not been changed from the high charac.driving to the low charac. driving while the second switch SW2 is on during the winding of the preceding frame of the film roll, the program advances to step #33 and the driving mode is changed from the low charac. driving to the high charac.- driving. The rotational direction is no change, i.e., the normal direction (clockwise direction). Then, a timer is set to a time:$t_3$ at step #34 and the timer is caused to start to count the time:$t_3$ at step #35. Thereafter, the program advances to step #40 and waits till the second switch SW2 is turned off. As described above, the driving mode changes from the low charac. driving to the high charac. driving when the time:$t_2$ has passed since the motor $M_1$ starts to be driven. The time:$t_2$ is set to a required time for the revolution of the sequence motor $M_1$ to reach a maximum acceleration range at its initial driving period. The setting times; $t_3$ and $t_4$ of the timers is set to each time within which the second switch SW2 is turned off securely the time when the motor $M_1$ is driven at either of the high or low charac. driving, respectively and the time:$t_4$ is longer than the time:$t_3$.

When the motor $M_1$ rotates in the normal direction, the pinion gear 1b rotates clockwise. The driven gear 2 rotates counterclockwise. Then, in FIG. 5, the upper arm 4a of the kick spring 4 is pushed by the side face 2c of the vertical wall 2b of the driven gear 2, so that the kick spring 4 rotates counterclockwise as well. A load at this moment is lighter enough than a load by which the slipping between the kick spring 4 and the friction gear 3 is caused, so that the friction gear 3 rotates counterclockwise, too. Accordingly, the 1st. combination gear 5 rotates clockwise. On the other hand, the 1st. projection 30a of the 1st. lock lever 30 engages with the recession 29b of the film winding controller 29 as well as the claw 33b of the claw lever 33 engages with the notch 13a of the engagement plate 13, so that the 2nd. combination gear 10 can not rotate. That is, each of the three 1st. planet gears 6 is restrained to turn on its axes. Consequently, each 1st. planet gear 6 turns around the 1st. sun gear 5b and the carrier plate 8, the supporting gear 7, and the main shaft 9 rotate clockwise together with one another, and the cam controller 40 rotates counterclockwise. Whereby, as shown in FIG. 11, the halfway gear 40b of the cam controller 40 gears into the spur gear 51a of the diaphragm cocking gear 51 and the diaphragm is cocked so as to be fully opened, while the 1st. cocking lever 44 is caused to swing clockwise by the cocking cam 40c and the top end 60b of the connecting lever 60 is pushed to the left hand by the bent member 44b of the 1st. cocking lever 44. By pushing the connecting lever 60 to that way, the mechanisms of the mirror and the shutter are cocked. After the cocking thereof, the connecting lever 60 is caused to return to its initial position. At this moment, although the cocking control lever 41 is trying to swing clockwise, the position of the recession 40g of the cam stopper 40f of the cam controller 40 is changed, as shown in FIG. 11, by the rotation of the cam controller 40, so that the cam controller 40 may keeps its rotation. During the period of the above, the second switch SW2 keeps turning on yet. When the halfway gear 40b gears out of spur gear 51a of the diaphragm cocking gear 51 and the cocking control lever 41 returns to its initial position and the respective cockings of the mechanisms of the diaphragm, the mirror, and the shutter are completed, the cocking control lever 41 swings clockwise in a few seconds, since the projection 41a falls into the recession 40g of the cam controller 40 when the the side wall 40e of the recession 40g of the cam controller 40 passes through the projection 41a, so that the second switch SW2 is turned off. When the second switch SW2 is turned off, the program advances to step #41, and the timer is caused to stop and the cocking flag is reset at step #41. If the second switch SW2 is not turned off within the time set at step #34 or step #36, the program goes to a timer interruption routine (shown in FIG. 31) which is described later on.

Successively, at step #42, the light metering is initiated since the mirror comes down to its initial position so that the light metering is possible. It is decided at step #43 whether or not the patrone detecting switch SW8 is on. If it is decided that the switch SW8 is on, i.e., the patrone is available in the patrone chamber, the program advance to step #44. If decided that the switch SW8 is off, i.e., no patrone in the chamber, the program goes to step #75. It is decided at step #44 whether or not the multi-exposure mode switch SW10 is on. If decided that the switch SW10 is on, i.e., the multi-exposure mode is set, the program advances to step #75, while decided that the switch SW10 is off, i.e., the multi-exposure mode is not set, the program goes to step #45 in FIG. 27B. At step #45, a film winding flag is set and at step #46 the voltage is applied for a time:$t_6$ to the magnet unit AMg for releasing the stopper device of the film winding. Whereby, the attraction force, attracting the attracted piece 105, of the magnet unit AMg is extinguished therefrom. Then, as shown in FIG. 8, the rewinding release lever 101, the cocking lever 102, and the holder lever 103 swing clockwise together with one another by virtue of the 2nd. torsion coil spring 111 which is hooked at the rewinding release lever 101, so that the side body 30d of the 1st. lock lever 30 is pushed by the 1st. projection member 101a of the rewinding release lever 101 and the 1st. lock lever 30 is caused to turn clockwise. When the 1st. lock lever 30 turns in that way, the engagement between the 1st. projection 30a of the 1st. lock lever 30 and the recession 29b of the film winding controller 29 is cancelled (see FIG. 8). At this moment, the first switch SW1 is turned on.

At step #47, the program waits for a time:$t_7$. After that, it is decided at step #48 whether or not the first switch SW1 is on. The time:$t_7$ is usually set to a time longer than that required for the switch is turned on from the time at applying the voltage to the magnet unit AMg. Accordingly, the first switch SW1 becomes on at step #48, usually, then the program advances to step #50. At step #50, it is decided whether or not the driving mode of the motor $M_1$ has been switched over from the high charac. driving to the low charac. driving in the winding of the preceding frame of the film roll while the first switch SW1 is on. If it is decided that the switching-over from the high charac. driving to the low charac. driving has been carried out, the program goes to step #55. On one hand, if it is decided that no switching-over, the program advances to step #51. At step #51, the motor $M_1$ is kept to rotate in the normal direction at the high charac. driving and a timer is set to a time:$t_{10}$ at step #52. Then, the timer is caused to start to count the time $t_{10}$ at step #58. In the case where the program goes to step #55, the motor $M_1$ is kept to rotate in the normal direction at the low charac. driving and a timer is set to a time:$t_{11}$ at step #56 and the timer is caused to start to count the time $t_{11}$ at step #58. Then, the program advances to step #80 in FIG. 27D. The times $t_{10}$ and $t_{11}$ are set to times for the first switch SW1 to be turned off securely at the high charac. driving and the low charac. driving, respectively. The time:$t_{11}$ is longer than the time:$t_{10}$. In the case where it is detected at step #43 of FIG. 27A that the patrone detecting switch SW8 is off, or it is decided at step #44 the multi-exposure mode switch SW10 is on, the program goes to step #75. At step #75, no film flag is set and at step #76 the motor $M_1$ is braked for a time:$t_5$, and then, the program goes to step #80. That is, in the case of no film and the multi-exposure mode, the film winding is not available. Accordingly, the voltage is not applied to the magnet unit AMg and the engagement between the 1st. lock lever 30 and the film winding controller 29 is left as it is. Now, the time:$t_5$ is set to a time enough for the rotation of the motor $M_1$ to stop.

Figure 27A:
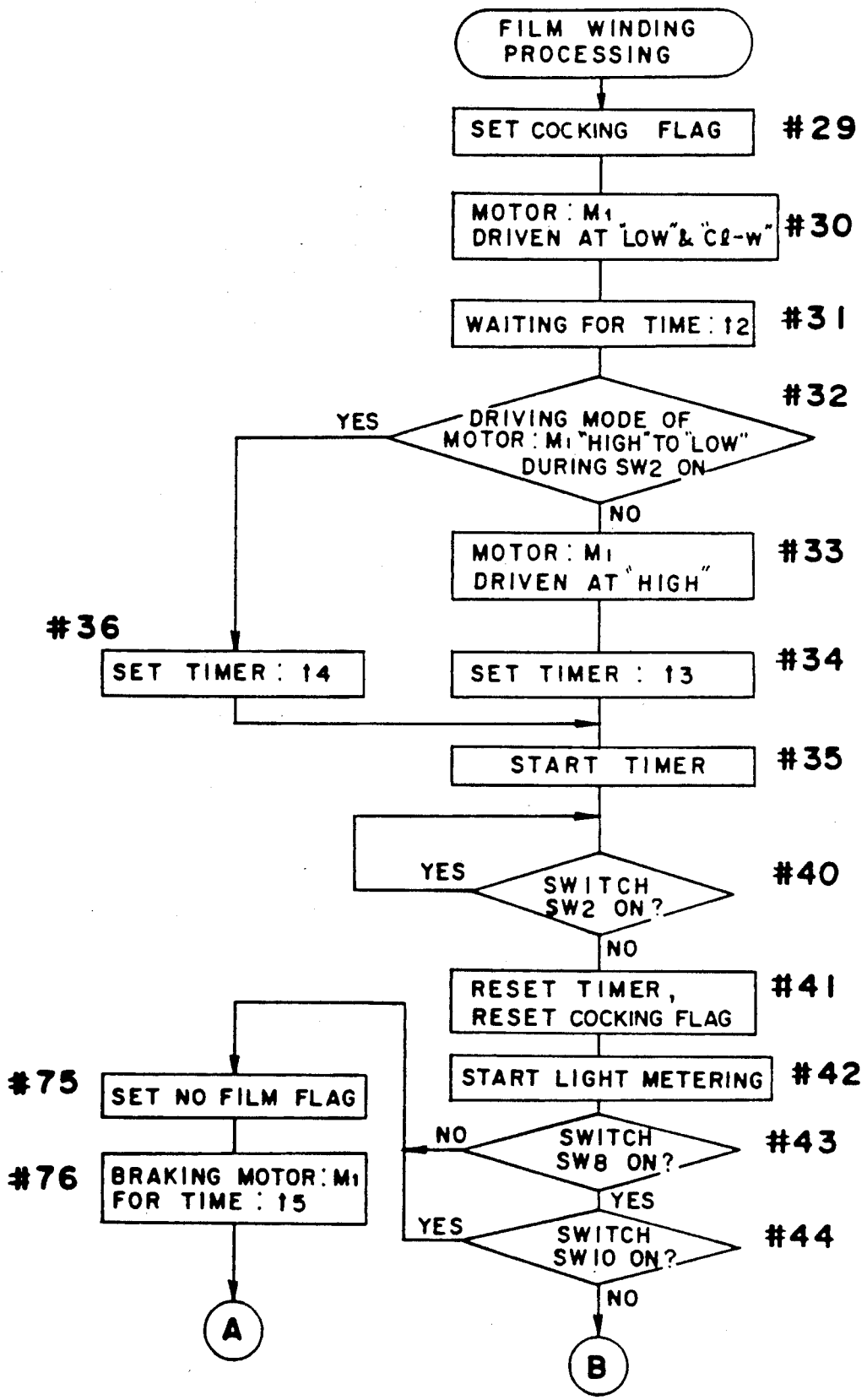
FIGS. 27A, 27B, 27C, and 27D are flow-charts of a routing of a film winding processing, which is divided into four portions, in the another embodiment.
Figure 27B:
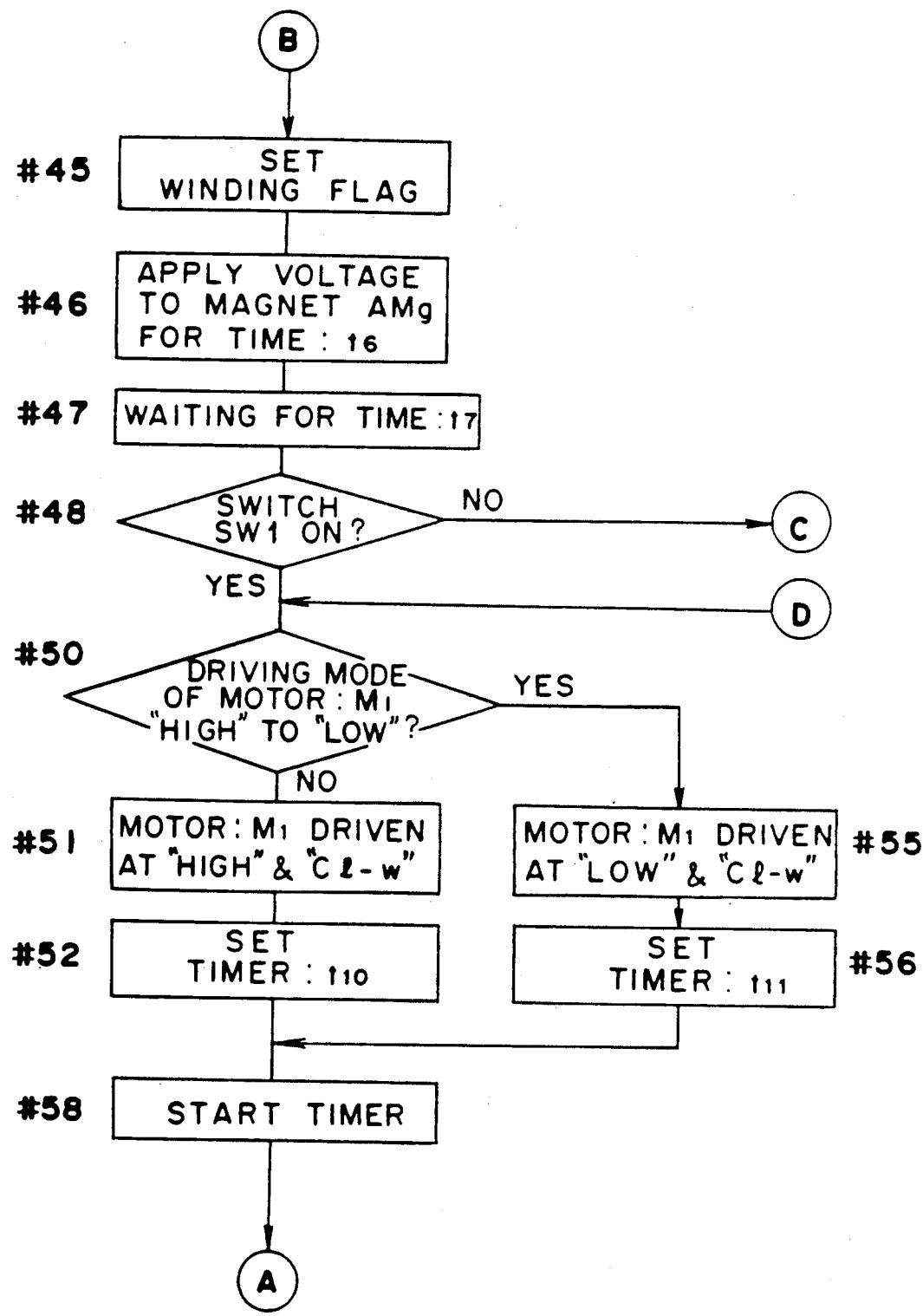
Figure 27C:
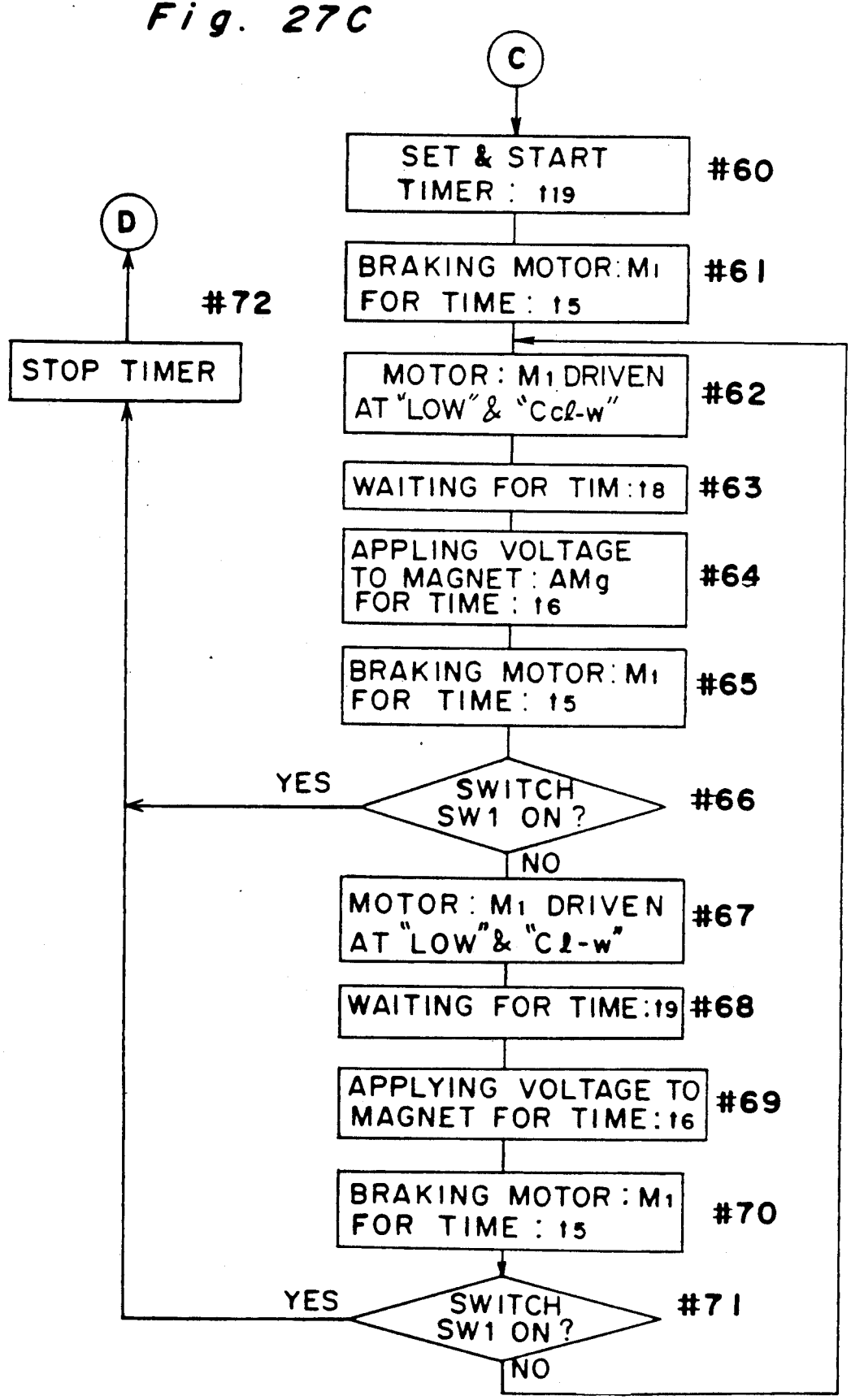

When it is decided at step #48 of FIG. 27B that the first switch SW1 is off, the program goes to step #60 of FIG. 27C. This represents the following case. Namely, the first switch SW1 is not turned on nevertheless the voltage is applied to the magnet unit AMg. In this case, a timer is set to a time:$t_{19}$ and is caused to start at step #60. At step #61, the motor $M_1$ is braked for the time:$t_5$, and at step #62, the motor $M_1$ is driven in the reverse direction (counterclockwise) at the low charac. driving this time. After that, the program waits for a time:$t_8$ at step #63, then the voltage is applied to the magnet unit AMg for the time:$t_6$ at step #64. After that, the motor $M_1$ is braked for the time:$t_5$ at step #65. The time:$t_8$ is equivalent to a time (approx. 30 msec.) for the gear to move in the range of the backlash. And it is decided at step #66 whether or not the first switch SW1 is on.

At this moment, the program goes to step #72 if the first switch SW1 is on. However, if the first switch SW1 is off, the program advances to step #67 and the sequence motor $M_1$ is driven in the opposed direction (the clockwise direction) to the preceding rotational direction at the low charac. driving, again at step #67. At step #68, the program waits for a time:$t_9$, then the program advances to step #69. At step #69, the voltage is applied to the magnet unit AMg for the time:$t_6$ again. After that, the motor $M_1$ is braked for the time:$t_5$ at step #70. Now, the time:$t_9$ is set to a time, a period of which is same as that of the time:$t_8$. Then, it is decided again at step #71 whether or not the first switch SW1 is on. If it is decided at step #71 that the first switch SW1 is on, the program advances to step #72. At step #72, the time is caused to stop, then the program goes to step #50 of FIG. 27B. If it is decided at step #71 that the first switch SW1 is off, the program returns to step #62. And the same processing are executed, again. As far as it is concerned that the first switch SW1 is off, the processing from step #62 to step #71 are repeatedly executed until the setting time:$t_{19}$ of the timer:$t_{19}$ is up. When the time:$t_{19}$ passes, the program goes to the timer interruption routine shown in FIG. 31A and the timer interruption processing are executed. The time:$t_{19}$ is set to a time, a period of which is subject to how many times the driving of the sequence motor $M_1$ is changed from that in the reverse direction to that in the normal direction. For example, it is recommended that the time:$t_{19}$ is set to the period of a time which is equivalent to a time (approx. 600 msec.) of ten times of the switching-over.

The processing executed from step #60 to step #72 are fulfilled for the purpose of the following. That is, if the magnet unit AMg does not work with some reasons such as an electrical trouble or the like, or if the rewinding release lever 101 can not push the 1st. lock lever 30 with the spring force of the 2nd. torsion coil spring 111 since a large amount of the load acts on the engagement between the 1st. lock lever 30 and the film winding controller 29 so that the first switch SW1 may be hardly turned on, the program never advances to the further steps. Accordingly, the above-mentioned processing are service of the secure operation of the rewinding release lever 101 because the load acting on the engagement may be released therefrom if the sequence motor $M_1$ is repeatedly driven in the normal and reverse direction. Whereby, it is ensured that the first switch SW1 is caused to be turned on.

Figure 27D:
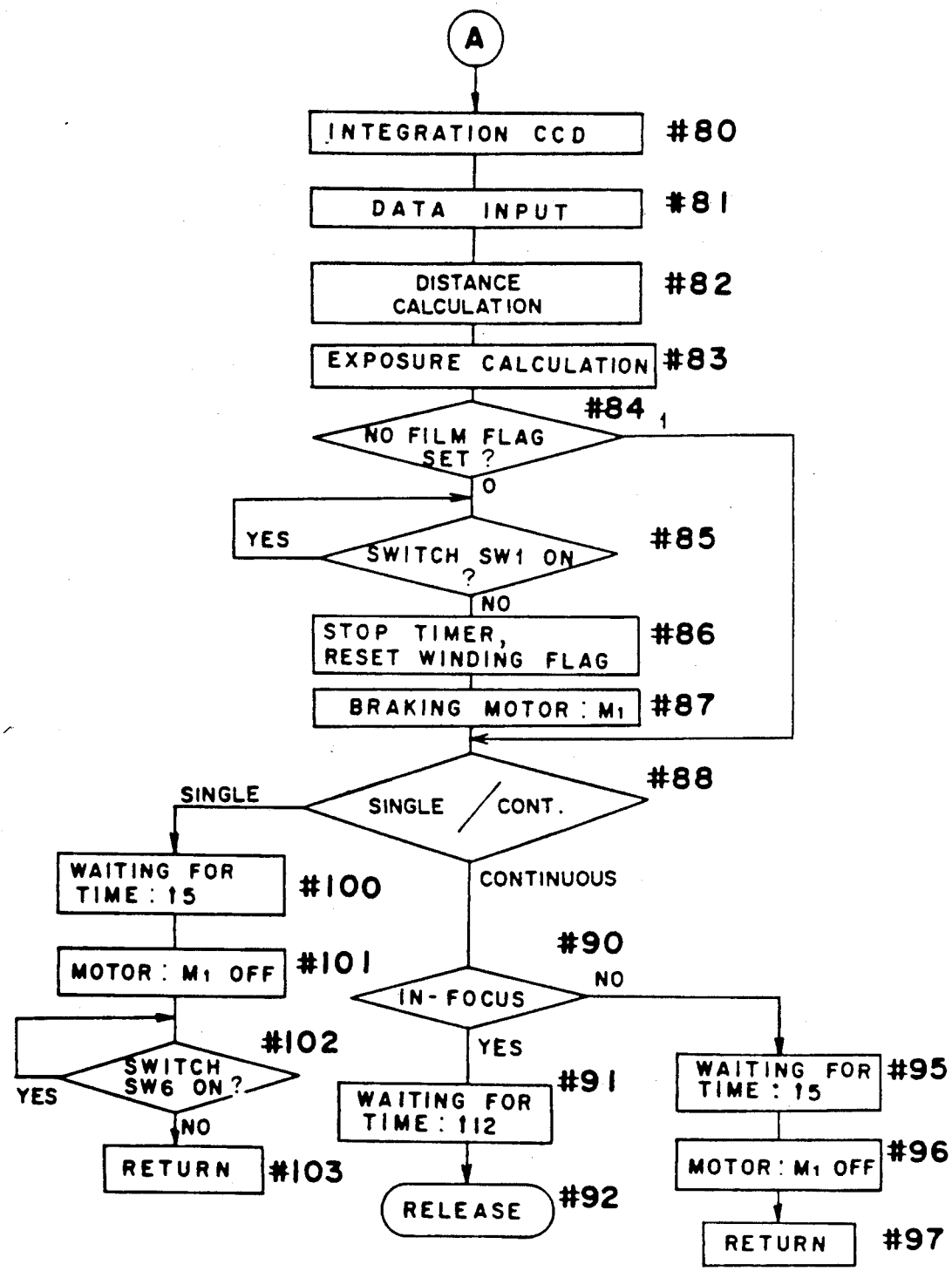

Subsequently to step #58 or step #76, at step #80 of FIG. 27D, integration for the CCD unit of the distance measuring unit 202 for the AF is carried out. Data of the calculation results of the integration carried out at step #80 are inputted into the CPU 201 at step #81 and, at step #82, calculation of the distance measuring is executed. At step #83, exposure calculation is executed on the basis of the data of the light metering from the light metering unit 205. After that, it is decided at step #84 whether or not a flag of no film is set. If it is decided at step #84 that the no film flag is set, i.e., the patrone detecting switch SW8 is off, the program goes to step #88. If decided at step #84 that the flag is not set, the program advances to step #85 and it is decided at step #85 whether or not the first switch SW1 is on. If it is decided at step #85 that the first switch SW1 is on, the program stays here at step #85. As described above, when the one frame of the film is wound, the switch SW1 is turned off.

When the first switch SW1 is turned off, the program advances to step #86 and the timer is caused to stop as well as a flag for the film winding is reset at step #86. Successively, the sequence motor $M_1$ is braked at step #87. Then, it is decided at step #88 which mode of the continuous photographing mode or the single photographing mode is selected. If decided at step #88 that the single photographing mode is selected, the program goes to step #100, and if decided that the other mode is selected, the program advances to step #90. In the case of the continuous photographing mode, it is decided, on the basis of the calculated results executed at step #82, at step #90 whether or not the photographic lens is in focus. If decided at step #90 that the lens is in focus, the program advances to step #91 and waits for a time:$t_{12}$ at step #91. After that, the program advances to step #92 and processing of a release routine (FIG. 26) are executed, accordingly. In the case of the continuous photographing mode, braking to the sequence motor $M_1$ is kept until the motor $M_1$ is caused to stop at step #19 of FIG. 26. Now, the time:$t_{12}$ is set to 10 to 20 msec. as an idle time and its purpose is to prevent such phenomenon that the cam controller 40 may rotate when the motor $M_1$ is not completely made to stop at the time when the engagement between the cocking control lever 41 and the cam controller 40 is cancelled.

If it is calculated at step #90 that the lens is out of focus, the program goes to step #95 and waits for the time:$t_5$ there. Successively, after, the sequence motor $M_1$ is turned off and the braking of the motor $M_1$ is released at step #96, the program advances to step #97 and, at step #97, the program returns to the same step where the photometry switch SW5 is turned on, at once. Then, the operations of the light metering and the distance measuring are executed and the lens driving is carried out. After that, when the lens becomes in focus, the release routine is executed again.

If it is decided at step #88 that the single photographing mode is selected, the program goes to step #100 and waits for the time:$t_5$. Successively, after, the sequence motor $M_1$ is turned off and the braking of the motor $M_1$ is released at step #101. After that, it is detected at step 102 whether or not the release switch SW6 which is turned on at the second stage of the depressing of the release button is on. If detected that the switch SW6 is on, the program stays at step #102. When the switch SW6 is turned off, the program advances to step #103 and, at step #103, the program returns to the same step where the operations of the light metering and the distance measuring are executed while the photometry switch SW5 is turned on.

Figure 28A:
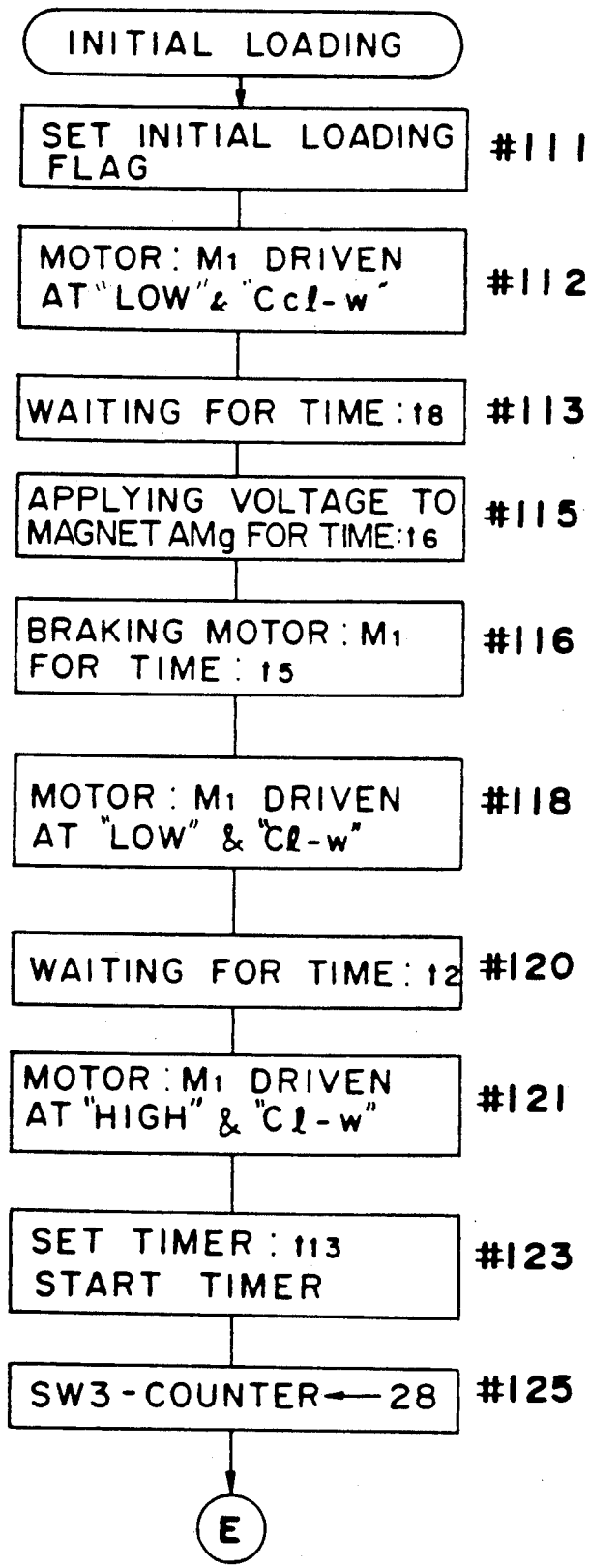

Next, description of operation of the initial loading of the film proceeds according to the drawings of FIGS. 28A and 28B. At first, when the patrone is loaded in the patrone chamber and the back cover is closed, the patrone detecting switch SW8 is turned on. And when the back cover is completely closed, the cover switch SW9 is turned on. Whereby, the initial loading of the film is initiated. However, if the patrone detecting switch SW8 is off when the cover switch SW9 is on, the initial loading is not initiated because of no patrone in the chamber.

First, at step #111, a flag of the initial loading is set. At step #112, the sequence motor $M_1$ is driven in the reverse direction (counterclockwise direction) at the low charac. driving. At step #113, the program waits for the time:$t_8$. After that, the voltage is applied to the magnet unit AMg for the time:$t_6$ at step #115. At step #116, the motor $M_1$ is braked for the time:$t_5$. The time:$t_8$ which represents a reversed driving of the motor $M_1$ is same as the reversed driving time of the motor $M_1$ which is described in the processing executed at steps from step #60 to step #72. Namely, the time:$t_8$ is equivalent to a time for the gears to rotate at the amount of the backlash of the gears. By the reversed driving of the motor $M_1$, it is enabled that a load which acts on both of the recession 29b of the film winding controller 29 and 1st. projection 30a of the 1st. lock lever 30 at the time of completion of the film winding is loosened. After that, by applying the voltage to the magnet unit AMg, the 1st. projection member 101a of the rewinding release lever 101 pushes the side body 30d of the 1st. lock lever 30, so that the 1st. lock lever 30 turns clockwise. By turning the 1st. lock lever 30 in that way, the engagement between the 1st. projection 30a of the 1st. lock lever 30 and the projection 130a of the 2nd. lock lever 130 is cancelled. And the first switch SW1 is turned on at that time. In addition, the claw lever 33 swings in the counterclockwise direction, so that the engagement between the claw 33b and the engagement plate 13 is cancelled.

Successively, at step #118, the motor $M_1$ is driven in the normal direction (clockwise direction) at the low charac. driving. At step #120, the program waits for the time:$t_2$. After that, at step #121, the driving mode of the motor $M_1$ is shifted from the low charac. driving to the high charac. driving and the motor $M_1$ is driven. Now, the time:$t_2$ is same as the time described at step #31. At step #123, a timer:$t_{13}$ is set to a time:$t_{13}$ and is caused to start. At step #125, a counter for the third switch SW3 is set to "28". Then, the program advances to step #127 of FIG. 28B. At step #127, it is decided whether or not the third switch SW3 is on. If the third switch is off, the program goes to step #140 and a flag for the third switch SW3 is set to "1". After that, the program jumps to step #145. At step #145, it is detected whether or not the counting value of the counter is set to "0". If it is detected at step #145 that the counting value is not "0", the program returns to step #127. And the same operations are repeated while the third switch SW3 is off.

In a few second, the third switch SW3 is turned on in connection with the rotation of the sprocket 25. Whereupon, the program advances to step #128 and it is detected at step #128 whether or not the third switch flag is set to "1". If detected at step #128 that the flag is set to "1", the program advances to step #129, and if detected that the flag is set to "0", the program jumps to step #145. At the time directly after the third switch SW3 being turned on, the flag is set to "1", so that the program advances to step #129 and it is detected at step #129 whether or not the counting value of the counter for the third switch SW3 is "0". If detected that it is not "0", the program advances to step #130 and at step #130 "1" is subtracted from the counter value of the counter for the third switch SW3 and the program advances to step #132. At step #132, the voltage is applied to the magnet unit AMg for the time:$t_6$ and at step #133 it is decided at which mode of the low charac. driving and the high charac. driving the motor $M_1$ is driven. If decided at step #133 that the motor $M_1$ is driven at the high charac. driving, the program advances to step #134 and a timer:$t_{13}$ is set to a time:$t_{13}$, and the timer:$t_{13}$ is caused to start at step #138. On the other hand, if decided at step #133 that the motor $M_1$ is driven at the low charac. driving, the program goes to step #135 and a timer:$t_{14}$ is set to a time:$t_{14}$, and the timer:$t_{14}$ is caused to start at step #138. Each setting time of the respective timers $t_{13}$ and $t_{14}$ is a time longer enough than an interval time from the time when the third switch SW3 is turned on to the time when the same switch SW3 is turned on successively while the motor $M_1$ is driven at the high or low charac. driving. In addition, the time:$t_{14}$ is longer than the time:$t_{13}$. At step #139, the flag is reset to "0" and it is decided at step #145 whether or not the counting value of the counter is set to "0". If it is detected at step #145 that the counting value of the counter is not "0", the program returns to step #127 again. At that time, the third switch SW3 is still on, then the program advances to step #128 and the state of the flag is detected at step #128. This time, it is detected at step #128 that the flag is reset to "0", then the program jumps to step #145. This time, since it is detected at step #145 that the counting value of the counter is not "0", the program returns to step #127. This operations are repeated until the first switch SW1 is turned off. In connection with the rotation of the film sprocket 25, the third switch SW3 is turned off, then the program goes to step #140 from step #127 and the same operations are repeated. That is, the voltage is applied to the magnet unit AMg for the time:$t_6$ every time when the third switch SW3 is turned on and an operation of resetting the timer is repeatedly executed twenty eight times. It is so designed that the third switch SW3 is turned on eight times during winding a frame of the film roll. From the first actuation of the switch SW3 to the fifth actuation of that, applying the voltage to the magnet unit AMg is meaningless since the attracted piece 105 is away from the magnet unit AMg when the voltage is applied to the magnet unit AMg. On one hand, the film winding controller 29 rotates clockwise in connection with the rotation of the sprocket 25. And the attracted piece 105 is attracted to the magnet unit AMg and the 1st. projection 30a of the 1st. lock lever 30 is trying to fall into the recession 29b of thé film winding controller 29. However, the voltage is applied to the magnet unit AMg at the time of the seventh or eighth actuation of the third switch SW3, so that the rewinding release lever 101 is caused to swing clockwise. Whereby, the 1st. projection 30a of the 1st. lock lever 30 is prevented from falling into the recession 29b of the film winding controller 29. Accordingly, the first switch SW1 keeps the On-state and the further winding is available from the first frame of the film roll to the second frame of that. The windings of the second frame and the third frame are carried similarly. After that, the winding of the fourth frame is initiated. The numerical value of the counter becomes "0" at the halfway winding of the fourth frame. That is, it represents that the third switch SW3 is turned on twenty eight totally. When the numerical value of the counter becomes "0", it is detected at step #129, so that the program goes to step #133. Therefore, the voltage is not applied to the magnet unit AMg. Subsequently to that, it is decided at step #133 at which mode of the low charac. driving and the high charac driving the motor $M_1$ is driven. Then, one of the different timers is set and is caused to start depending on the driving mode, as previously described At step #139, the flag of the third switch SW3 is reset to "0". And this setting value is detected at step #145, then the program advances to step #146. If the first switch SW1 is on, the program returns to step #127 and the same operations are repeated It is so designed that the voltage is not applied to the magnet unit AMg at an interval from the twenty ninth actuation of the third switch SW3 to the thirty second actuation of that, so that the 1st. projection 30a of the 1st. lock lever 30 falls into the recession 29b of the film winding controller 29 when the film winding controller 29 turns completely. Then, the first switch SW1 is turned off. When it is detected at step #146 that the first switch SW1 is off, the program advances to step #147 and the timer is caused to stop and the initial loading flag is reset. And after the motor $M_1$ is braked for the time:$t_5$ at step #148, the film-speed is read at step #149, then a state of standing-by is achieved at step #150. The processing of the initial loading are completed at step #150. During the above-mentioned operation, the film is wound round the spool 14.

It is to be noted that it is basically allowed that it occurs at the eighth actuation of the third switch SW3, the sixteenth actuation of that, and the twenty fourth actuation of that to apply the voltage to the magnet AMg. However, considering phenomenon of chattering of the third switch SW3 or the like, there is possibility of mis-counting of the number of the actuation, so that it happens that the operations may not be fulfilled smoothly. Accordingly, in order to prevent that, it is so designed that it is carried out continually from the first actuation to the twenty eighth actuation to apply the voltage to the magnet unit AMg.

Figure 29A:
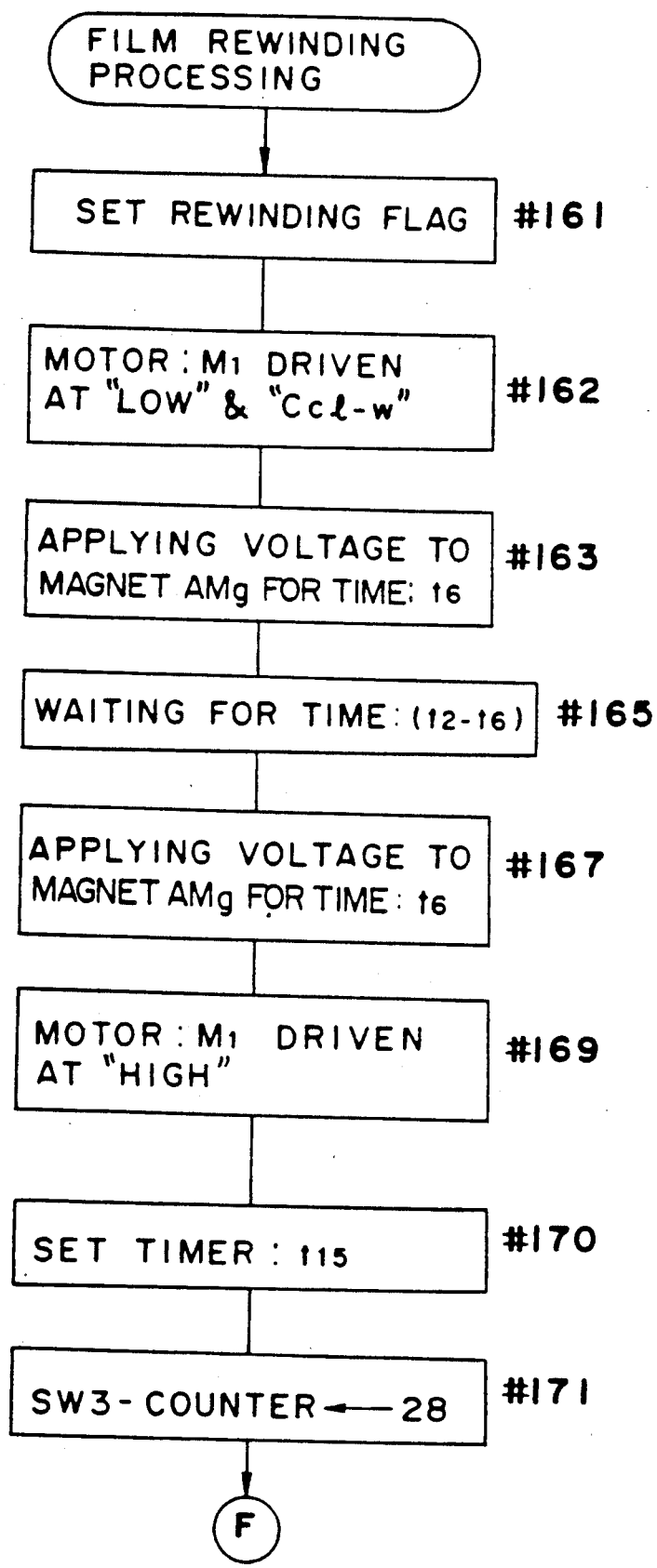
FIGS. 29A and 29B are flow-charts of a routine of a film rewinding processing, which is divided into two portions, in the another embodiment.
Figure 29B:
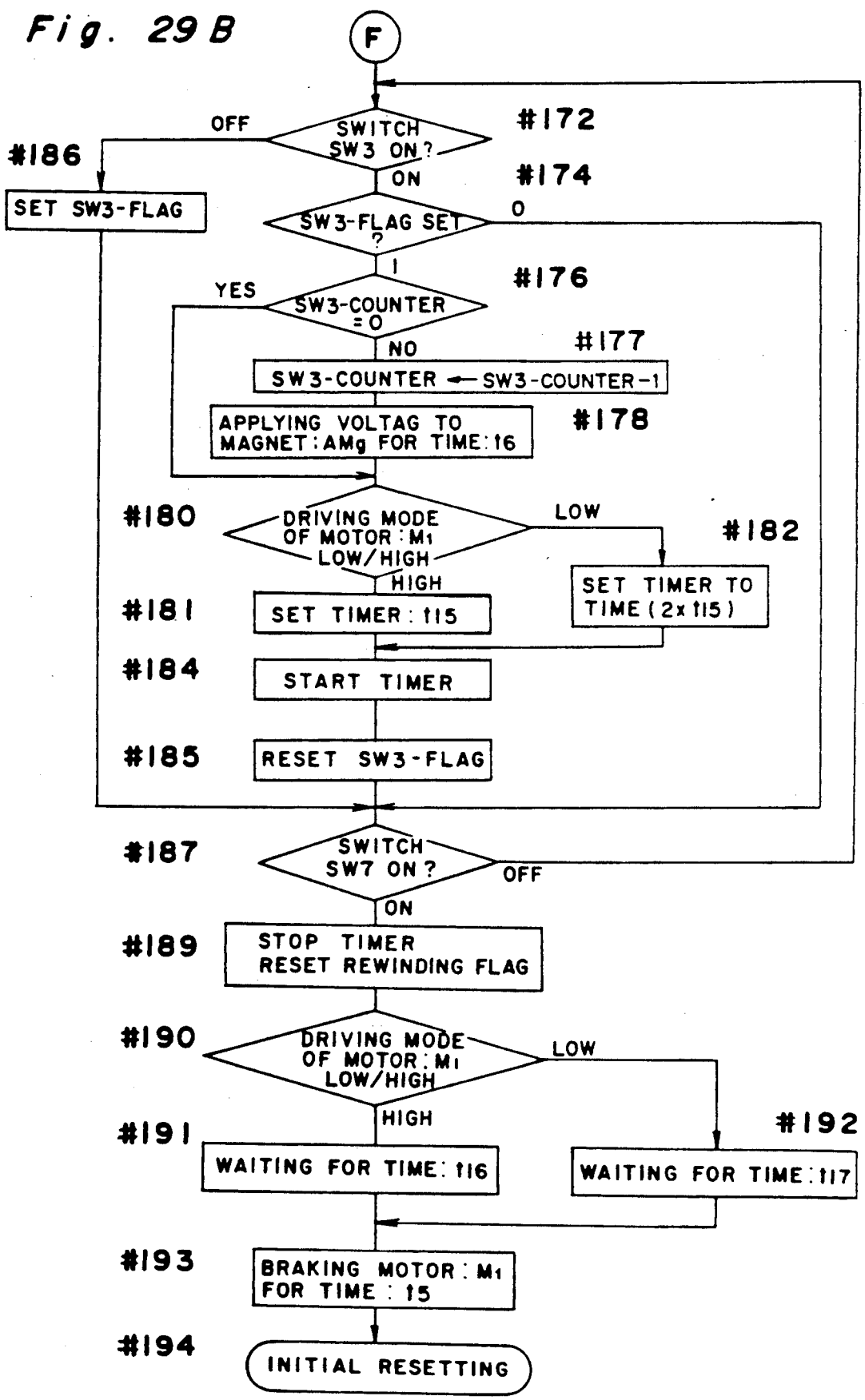

Next, description of a rewinding operation proceeds according to the drawings of FIG. 29A and 29B. As described later on, a rewinding routine is initiated when the film is tense at the final frame of the film roll and it is decided to complete photographing for the all frames of the film roll, or when a photographer operates a switch (not shown) for the film rewinding halfway before the final frame.

At first, a flag for rewinding is set at step #161, and the sequence motor $M_1$ is driven for slightly a few in the reverse direction (counterclockwise direction) at the low charac. driving at step #162. Successively, the voltage is applied to the magnet unit AMg for the time:$t_6$, and the program waits for a time:$(t_2-t_6)$. After that, the voltage is applied to the magnet unit AMg for the time:$t_6$, again, and the motor $M_1$ is driven at the high charac. driving shifted from the low charac. driving. The rotational direction is no change. At the halfway rewinding, similarly to the processing of the initial loading, the load acting on the engagement member at completion of the film winding is released while the motor $M_1$ is driven at the low charac. driving, i.e., the time:$t_2$ which is equivalent to a time required for the gears to move for an amount of the backlash of the gearing. Then, by applying the voltage to the magnet unit AMg, the engagement between the 1st. projection 30a of the 1st. lock lever 30 and the recession 29b of the film winding controller 29 is cancelled. It is so arranged that the voltage is applied to the magnet unit AMg twice. Even if the cancellation of the restrained attraction ends in failure with any reason at the first time, one more chance for the cancellation is available so as to cancel the engagement at the second time, so that it is ensured that the cancellation of the engagement between the 1st. projection 30a of the 1st. lock lever 30 and the recession 29b of the film winding controller 29 is fulfilled. Accordingly, the above-mentioned procedure is applicable to the processing of the initial loading,similarly. Then, it is ensured that the cancellation of the engagement is fulfilled at the initial loading of the film.

Back to the routine of FIG. 29A, at step #170, the timer:$t_{15}$ is set to the time:$t_{15}$ and is caused to start. At step #171, the counting value of the counter for the third switch SW3 is set to "28" and the program advances to step #172 of FIG. 29B. At step #172, it is decided whether or not the third switch SW3 is on. Since the sprocket 25 rotates in connection with the film which is rewound, the third switch SW3 is repeatedly turned on and off, alternatively. At step #172, it is detected that the third switch SW3 is off, the program goes to step #186 and the flag for the switch SW3 is set to "1", and the program jumps to step #187 and it is detected whether or not the film detecting switch SW7 is on. If it is detected at step #187 that the film detecting switch SW7 is off, the program returns to step #172. If the third switch SW3 is off, this routine is repeated. When the third switch SW3 is turned on, the program advances to step #174 and it is decided whether the flag for the third switch SW3 is set to "1" or not. If the flag is set to "0", the program jumps to step #187. On the other hand, if the flag is set to "1", the program advances to step #176. At the time directly after the third switch SW3 being turned on , the flag is set to "1", so that the program advances to step #176 and it is decided whether the counting value of the counter for the third switch SW3 is "0∞ or not. If decided at step #176 that the value is "0", the program jumps to step #180. If not, the program advances to step #177 "1" is subtracted from the counter value of the counter for the third switch SW3, and the program advances to step #178. At step #178, the voltage is applied to the magnet unit AMg for the time:$t_6$. It is decided at step #180 at which mode of the low charac. driving and the high charac. driving the motor $M_1$ is driven. If decided at step #180 that the motor $M_1$ is driven at the high charac. driving, the program advances to step #181 and the timer:$t_{15}$ is set to the time:$t_{15}$, and the timer:$t_{15}$ is caused to start at step #184. On the other hand, If decided at step #180 that the motor $M_1$ is driven at the low charac. driving, the program goes to step #182 and the timer:$(2 \times t_{15})$ is set to the twice of the time:$t_{15}$, and the timer:$(2 \times t_{15})$ is caused to start at step #184. At step #185, the flag for the third switch SW3 is reset to "0" and it is detected at step #187 whether or not the film detecting switch SW7 is on. If detected that the detecting switch SW7 is off, the program returns to step #172, again. And if the third switch SW3 is still on, the program advances to step #174 and it is decided whether the flag is set to "0". This time, the flag is set to "0", so that the program jumps to step #187 and it is detected whether or not the film detecting switch SW7 is on. If detected that the switch SW7 is off, the program returns to step #172, again. If detected that the switch SW3 is on, the above-mentioned operations are repeated as far as it is concerned that the film detecting switch SW7 is off. If the third switch SW3 is turned off, the program advances to step #186 and the same operations are repeatedly executed. Accordingly, each time the third switch SW3 turned off from the On-state, "1" is subtracted from the counting value of the counter for the third switch SW3, the voltage is applied to the magnet unit AMg, and one of the timer:$t_{15}$ and the timer:$(2 \times t_{15})$ is set and is caused to start depending on the motor driving mode. This operation is repeatedly executed twenty eight times. If it is detected at step #187 that the film detecting switch SW7 is turned on during this operation, the program advances to step #189. However, it scarcely occurs. If it is detected at step #176 that the counting value of the counter is "0", the program jumps to step #180. That is, the step #178 is by passed, so that the voltage is not applied to the magnet unit AMg. And one of the timer:$t_{15}$ and the timer:$(2 \times t_{15})$ is set and is caused to start depending on the motor driving mode. The above-mentioned operation is repeated from the twenty ninth operation of switching-over of the third switch SW3 from the On-state to the Off-state.

By the way, the attracted piece 105 is attracted to the magnet unit AMg when the film is tense at the final frame. If the recession 29b of the film winding controller 29 contacts the cocking lever 102, the releasing lever cannot rotate because the projection 29c of the film winding controller 29 keeps pushing the top and 102a of the cocking lever at the second applying of the voltage to the magnet unit AMg carried out immediately after starting the film rewinding. Therefore, in such a case, the attraction between the attracted piece 105 and the magnet unit AMg cannot be cancelled. Under such condition, when the film winding controller 29 rotates, the 1st. projection 30a of the 1st. lock lever 30 falls into the recession 29b of the film winding controller 29 in a few seconds, so that the rewinding cannot be carried out. At the moment, the first switch SW1 is turned off. Therefore, by detecting it, the motor $M_1$ is braked once and the voltage is applied to the magnet unit AMg immediately, resulting in that the engagement between the 1st. lock lever 30 and the film winding controller 29 is cancelled and it is enabled to start the rewinding once more. If this operation is carried out once, it never happen and it is not requested any more. However, such operation causes short stoppage of the rewinding so that it is harmful to smooth operation of the rewinding as well as it causes a photographer to feel a sense of anxiety. In addition, the engagement between the 1st. lock lever 30 and the film winding controller 29 is no always cancelled so well. Therefore, it is not the best way. Accordingly, in this embodiment, it is so designed that a stopper function is not effected in the rewinding processing. That is, the attraction between the piece 105 and the magnet unit AMg is cancelled by applying of the voltage to the magnet unit AMg at the time when the third switch SW3 is turned on immediately after the film winding controller 29 rotates up to a position where the projection 29c of the film winding controller 29 does not come in contact with the top end 102a of the cocking lever 102, so that the 1st. lock lever 30 may not engage with the film winding controller 29. The applying of the voltage to the magnet unit AMg is meaningless while the projection 29c of the film winding controller 29 comes in contact with the top end 102a of the cocking lever 102. In addition, it is meaningless that the applying of the voltage to the magnet unit AMg is effected further twenty eight times, even after the cancellation. The voltage has only to be applied to the magnet unit AMg at least, during the first complete turn of the film winding controller 29, in other words, during the eight times of the actuation of the third switch SW3. However, considering phenomenon of a lot of chatterings of the third switch SW3 or the like, there is possibility of mis-counting of the number of the actuation, so that it happens that the operations may not be fulfilled smoothly. Accordingly, the system has an extra opportunity and it is so arranged as for the operations to be executed smoothly in the case where the mis-counting occurs.

The setting time:$t_{15}$ of the timer:$t_{15}$ is set to a time longer enough than a regular interval between one actuation (making on) of the third switch SW3 and the subsequent actuation to that at the time when the motor $M_1$ is driven at the high charac. driving. On the other hand, the setting time of the timer utilized at the time when the motor $M_1$ is driven at the low charac. driving is set to the twice of the above time:$t_1$. This setting time:$(2 \times t_{15})$ is set to a time longer enough than a regular interval between one actuation of the third switch SW3 and the subsequent actuation to that at the time when the motor $M_1$ is driven at the low charac. driving.

Figure 30:
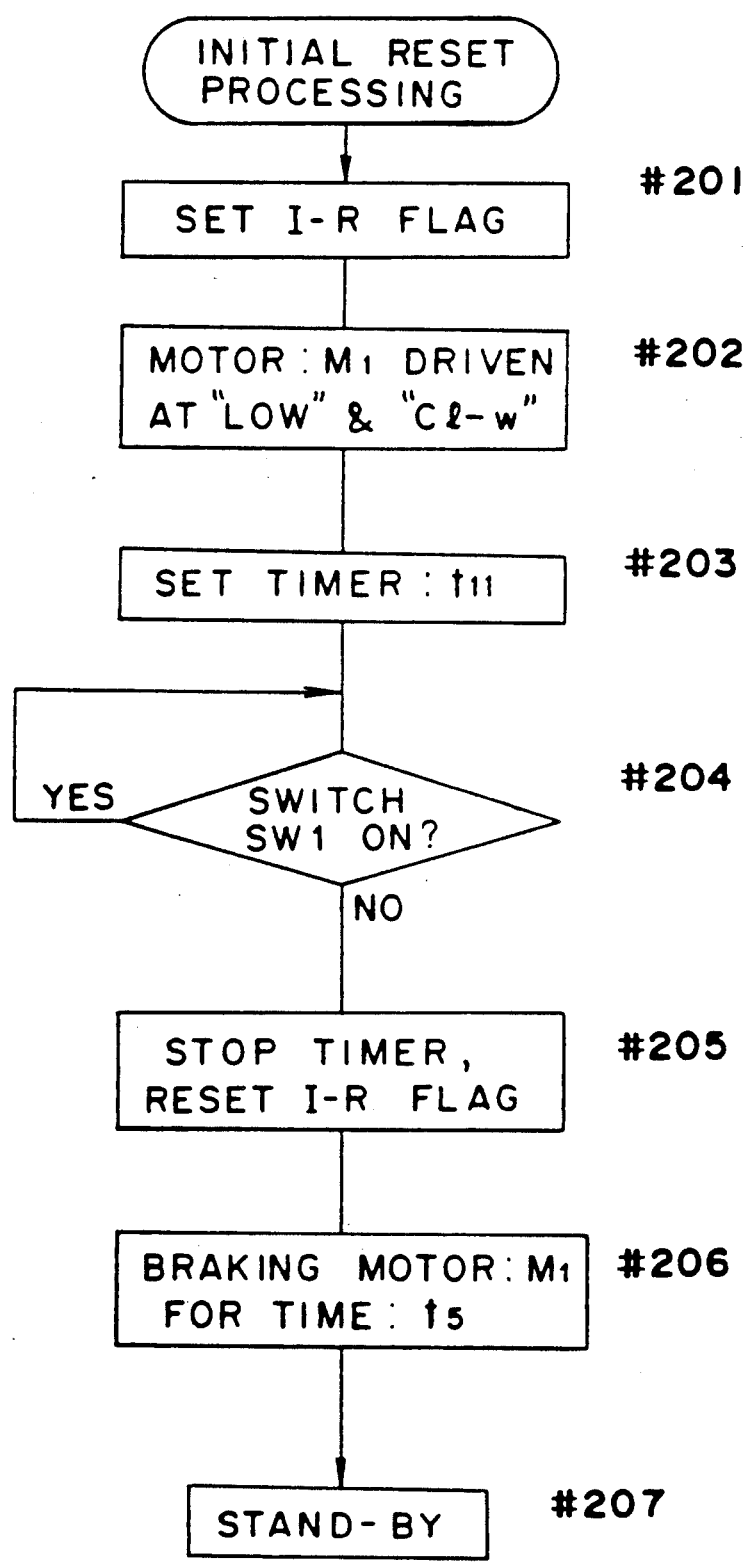
FIG. 30 is a flow-chart of a routine of an initial resetting processing in the another embodiment.

Meanwhile, the film rewinding makes progress and the film detecting switch SW7 is turned on when only the end portion of the film roll is located at outside of the patrone. But, in this embodiment, it is so designed that the film detecting switch SW7 is turned on at the state where the end portion of the film roll is caught on the sprocket 25. When it is detected at step #187 that the film detecting switch SW7 is on, the program advances to step #189 and the timer is caused to stop as well as the flag of the rewinding is reset. Then, it is decided at step #190 at which mode of the high and low charac. drivings the motor $M_1$ is driven. If it is decided that the mode is the high charac. driving, the program advances to step #191 and waits for a time:$t_{16}$. After that, the motor $M_1$ is braked for the time:$t_5$ at step #193. If it is decided at step #190 that the mode is the low charac. driving, the program goes to step #192 and waits for a time:$t_{17}$. After that, the motor $M_1$ is braked for the time:$t_5$ at step #193. Thus, the film rewinding is over, and at step #194, the program jumps to step #201 of FIG. 30 showing a routine of initial resetting. It is to be noted that the time:$t_{16}$ and the time:$t_{17}$ are, respectively, set to a time required for the motor $M_1$ to be driven so as to draw the film into the patrone completely, the end portion of which is caught on the sprocket 25 at the time when the film detecting switch SW7 is turned on. The time:$t_{17}$ is longer than the time:$t_{16}$, naturally. On one hand, it is acceptable that the end portion of the film remains outside the patrone. In this case, the time:$t_{16}$ and the time:$t_{17}$ must be, respectively, set to a proper time required for the end portion of the film to be caught on the sprocket 25.

Next, description of a routine of initial resetting proceeds according to a drawing of FIG. 30. At step #201, a flag of the initial resetting is set, and at step #202, the sequence motor $M_1$ is driven in the normal direction (clockwise direction) at the low charac. driving. At step #203, the timer:$t_{11}$ is set to the time:$t_{11}$. The setting time:$t_{11}$ is same as that set at the film winding under the low charac. driving and processing of the initial resetting is normally completed within this time period. At step #204, it is decided whether or not the first switch SW1 is on, and the program waits till the switch SW1 is turned off.

On one hand, by the clockwise rotation of the motor $M_1$, the 1st. projection 30a of the 1st. lock lever 30, which is disengaged from the film winding controller 29 a completion of the film rewinding, is fallen into the recession 29b of the film winding controller 29 and the attracted piece 105 is attracted to the magnet unit AMg. During this operation, the first switch SW1 is turned off. Then, the program advances to the step #205 from step #204 and the timer:$t_{11}$ is caused to stop as well as the flag is reset. After that, the motor $M_1$ is braked for the time:$t_5$ at step #206, and at step #207, the CPU 201 stands by. Thus, the initial resetting is over. Under this state, a photographer opens the back cover and picks the patrone out, and then loads a new roll of film in the camera. After that, when he closes the back cover, the routine of the initial loading, as previously described, is initiated.

Figure 31A:
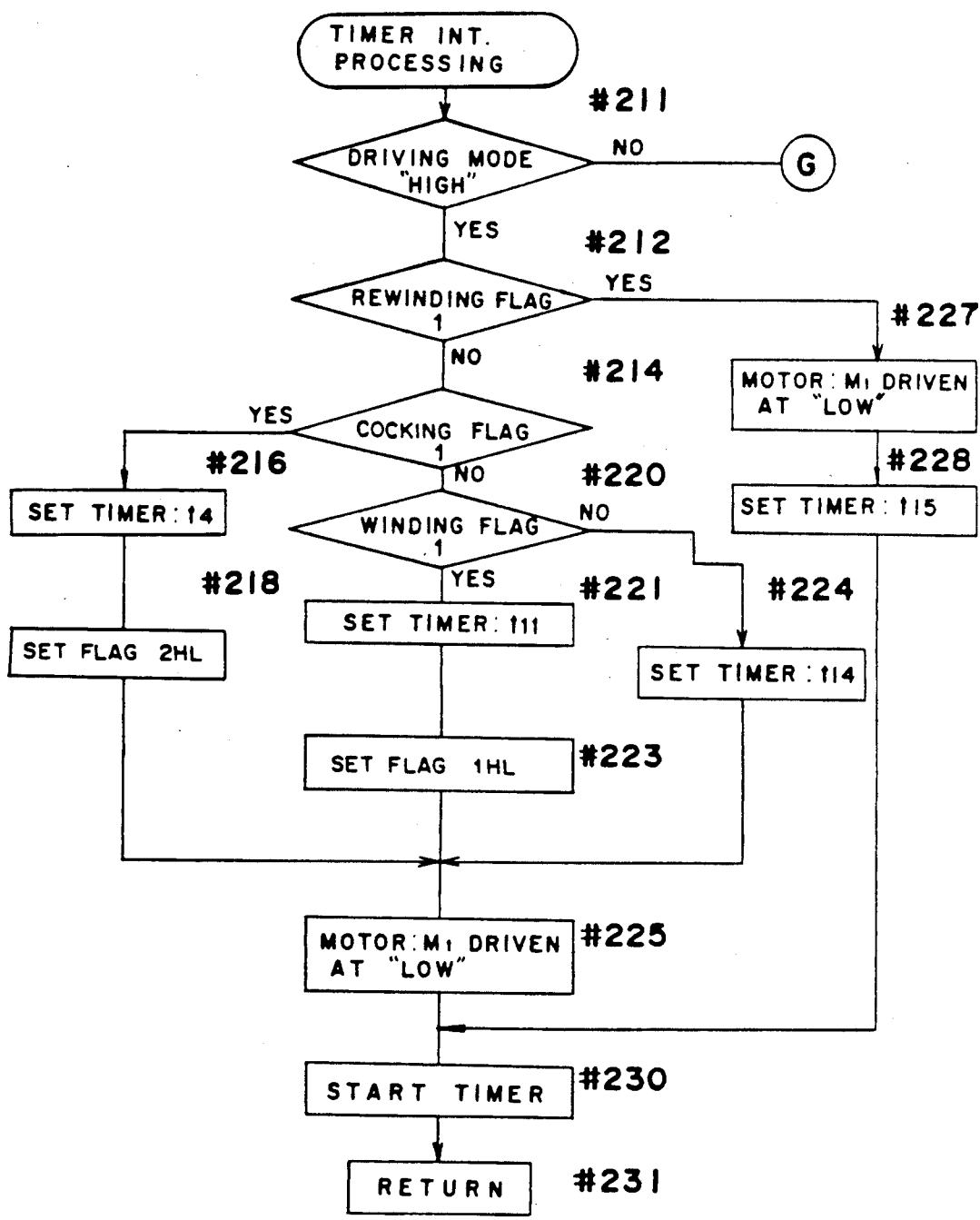
FIGS. 31A and 31B are flow-charts of a routine of a timer interruption processing, which is divided into two portions, in the embodiment.
Figure 31B:
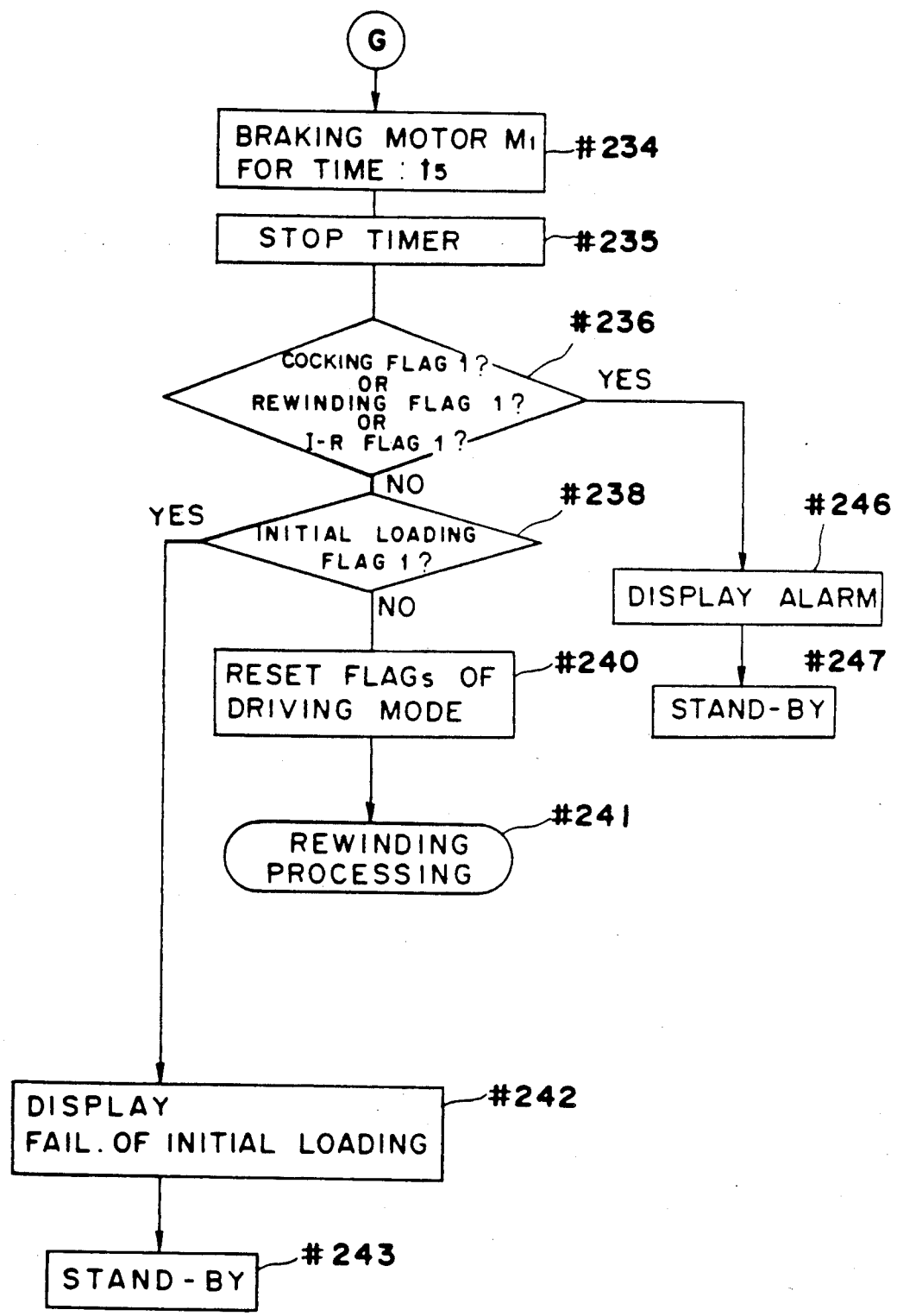

Next, description of a routine of timer interruption proceeds according to drawings of FIG. 31A and 31B. At first, if the second switch SW2 is not turned off with a time period of a time:$t_3$ when the cocking flag is set during the film winding operation, the routine of the timer interruption is initiated. At step #211, it is detected whether or not the motor $M_1$ is driven at the high charac. driving. If it is detected that the motor $M_1$ is driven at the high charac. driving, the program advances to step #212 and it is detected whether or not the flag of the film rewinding is set. Since it is detected, in this case, at step #212 that the flag is not set, the program advances to step #214 and it is detected whether or not the cocking flag is set. In this case, the cocking flag is set, then, the program advances to step #216 and a timer:$t_4$ is set to a time:$t_4$. After that, the program advances to step #218 and a flag (referred to as flag 2HL) is set. This flag 2HL represents that the driving mode of the sequence motor $M_1$ is shifted from the high charac. driving to the low charac. driving while the second switch SW2 is on. After setting the flag 2HL, the program goes to step #225 and the driving mode of the motor $M_1$ is shifted from the high charac. driving to the low charac. driving, and the program advances to step #230. At step #230, the timer:$t_4$ is caused to start and at step #231, the program returns. If the second switch SW2 is turned on within the time:$t_4$, the program goes to step #41 of FIG. 27A and the film winding is initiated. If the driving mode of the motor $M_1$ is shifted, once, from the high charac. driving to the low charac. driving, the program in the routine (FIG. 27A) of the winding for a next frame of the film roll advances from step #32 to step #36 so that the mode is not shifted to the high charac. driving, and at step #36, the timer:$t_4$ is set to the time:$t_4$ and its timer is caused to start. Then, the program waits until the second switch SW2 is turned off.

If the second switch SW2 is not turned off within the time:$t_4$, the timer interruption routine is initiated, again, and it is detected at step #211 whether the motor $M_1$ is driven at the high charac. driving. It is detected that the motor $M_1$ is not driven at the high charac. driving, i.e., the motor $M_1$ is driven at the low charac. driving, in the case where the timer interruption routine has been effected immediately before a current execution. Accordingly, the program advances from step #211 to step #234 of FIG. 31B. At step #234, the motor $M_1$ is braked for the time:$t_5$, and at step #235, the timer:$t_4$ is caused to stop. At step #236, it is decided whether or not the cocking flag is set, or whether or not the flag of the rewinding is set, or whether or not the flag of the initial resetting is set. In this case, the cocking flag is set, therefore the program goes to step #246 and a warning of that the camera is out of order is displayed to a photographer. Then, the camera system comes into a standby at step #246. One example is as follows. In the case where the motor $M_1$ is driven at the high charac. driving under operation of the cocking mechanism of the diaphragm, the mirror, and the shutter, it happens that the second switch SW2 is not turned off within a predetermined time. In this case, when something happens in the camera system such as a voltage-drops of the power, increasing a load of the cocking, or something like that, it is decided that the system can not be driven by the motor $M_1$ driven at the high rotational speed with the low torque (the high charac. driving). Accordingly, the system is so designed that the cocking may be continued by shifting the motor driving mode to the low rotational speed with the high torque (the low charac. driving). However, if the second switch SW2 is not turned off within the predetermined time nevertheless the motor $M_1$ is driven at the low charac. driving, it must be that something wrong happens in the system. Then, the display of the trouble warning is indicated. Now, if the driving mode is shifted from the high charac. driving to the low charac. driving once, the cocking carried out from the next frame of the film roll is initiated under the driving mode of the low charac. driving since it is decided that the mode of the high charac. driving is not acceptable for the system.

Next, explanation about the case where the first switch SW1 is not turned off within the time:$t_{10}$ at the time when the flag of the winding is set proceeds as follows. In this case, the timer interruption routine is initiated. That is, at step #211, it is detected whether the motor $M_1$ is driven at the high charac. driving. If detected that the motor $M_1$ is in operation under that mode, the program goes to step #212 and it is detected whether the flag of the rewinding is set. In this case, since the flag of the rewinding is not set, the program advances to step #214 and it is detected whether the cocking flag is set. As the cocking flag is not set, the program advances to step #220 and it is detected whether the flag of the winding is set. In this case, the flag of the winding is set, then the program advances to step #221 and the timer:$t_{11}$ is set to the time:$t_{11}$ At step #223, a flag (referred to as flag 1HL) is set. This flag 1HL represents that the driving mode of the sequence motor $M_1$ is shifted from the high charac. driving to the low charac. driving while the first switch SW1 is on. After setting the flag 1HL, the program goes to step #225 and the driving mode of the motor $M_1$ is shifted from the high charac. driving to the low charac. driving, and the program advances to step #230. At step #230, the timer:$t_{11}$ is caused to start and at step #231, the program returns. If the first switch SW1 is turned on within the time:$t_{11}$, the program goes to step #86 of FIG. 27D. If the driving mode of the motor $M_1$ is shifted, once, from the high charac. driving to the low charac. driving in winding operation, the program in the routine (FIG. 27B) of the winding for a next frame of the film roll advances from step #50 to step #55 so that the mode is not shifted to the high charac. driving, and at step #56, the timer:$t_{11}$ is set to the time:$t_{11}$ and its timer is caused to start. Then, the program waits until the first switch SW1 is turned off. If the first switch SW1 is not turned off within the time:$t_{11}$, the timer interruption routine is initiated again, and it is detected at step #211 whether the motor $M_1$ is driven at the high charac. driving. It is detected that the motor $M_1$ is not driven at the high charac. driving, i.e., the motor $M_1$ is driven at the low charac. driving, in the case where the timer interruption routine has been effected immediately before a current execution. Accordingly, the program advances from step #211 to step #234 of FIG. 31B. At step #234, the motor $M_1$ is braked for the time:$t_5$, and at step #235, the timer:$t_{11}$ is caused to stop. At step #236, it is decided whether or not the cocking flag is set, or whether or not the flag of the rewinding is set, or whether or not the flag of the initial resetting is. As any of the flags, in this case, is not set, the program advances to step #238 and it is detected whether the flag of the initial loading is set. As this flag is not set, the program advances to step #240 and both of flags 1HL and 2HL are reset, then the program jumps to the routine of the film rewinding at step #241 and the rewinding is executed. That is, the operation of the film winding is made under the driving mode of the high charac. driving if the driving mode is not shifted from the high charac. driving to the low charac. driving nevertheless the cocking operation is made under either of the two driving modes. However, if it happens that the first switch SW1 is not turned off within the time:$t_{10}$, something happens in the film winding system such as a voltage-drops of the power, increasing a load of the film winding caused by a low temperature, or something like that. In such a case, it is decided that the system can not be driven by the motor $M_1$ driven at the high rotational speed with the low torque (the high charac. driving). Accordingly, the camera system is so designed that the film winding may be continued by shifting the motor driving mode to the low rotational speed with the high torque (the low charac. driving). Since then, the film winding carried out from the next frame of the film roll is initiated under the driving mode of the low charac. driving. In the case where the film is tense, the spool 14 and sprocket 25 can not turn, and the kick spring 4 and the friction gear 3 is to slip. And the first switch SW1 is never turned off. Accordingly, the film winding does not work even though the driving mode is shifted from one to the other. In this case it is decided that the film is tense, and then it is so arranged as to initiate the operation of the film rewinding.

In the case where something wrong happens in the system except the film tension so that the winding under the low charac. driving cannot be performed, the film rewinding operation is initiated since the film winding operation is not available any longer although the trouble is unknown. If even the film rewinding operation cannot be performed, it is so arranged as to display the trouble warning by the timer interruption routine effected in the routine of the film rewinding, as described later on.

Nevertheless the voltage is applied to the magnet unit AMg at step #46 of FIG. 27B, the first switch SW1 is not turned on so that the processing executed at steps from step #62 to step #71 of FIG. 27C is repeated and, in the meantime, the time:$t_{19}$ has passed. In such a case, the timer interruption routine is initiated, and the program advances as follows; step #211→#234→#235→#236→#238→#240→#241, resulting in that the film rewinding is to be initiated. However, the engagement between the 1st. lock lever 30 and film winding controller 29 is not cancelled so that the film rewinding may not be carried out. In this case, the timer interruption routine during the rewinding operation makes displaying of the trouble warning. But, the film rewinding is available if the trouble is caused by the first switch SW1 itself, so that the exposed roll film does not come to naught.

Next, description of the case where it is not detected that the third switch SW3 is turned on within the time:$t_{15}$ subsequently to the preceding switching-over, from the Off-state to the On-state of the third switch SW3 proceeds as follows.

In this case, the program jumps to the timer interruption routine and advances from step #211 to step #212. And as the flag of the rewinding is set, the program goes to step #227 and the driving mode of the motor $M_1$ is shifted from the high charac. driving to the low charac. driving and the motor $M_1$ is driven at that mode. Then, at step #228, the timer:$t_{15}$ is set to the time:$t_{15}$ and the program advances to step #230. At step #230, the timer:$t_{15}$ is caused to start, and the program advances to step #231 and returns to the rewinding routine, and the rewinding goes on being executed. When it is detected within time:$t_{15}$ that the third switch SW3 is turned on, the program to the step #182 via step #180, this time. At step #182, the timer is set to the time:$(2 \times t_{15})$ representing a double of the time:$t_{15}$, and at step #184, the timer:$(2 \times t_{15})$ is caused to start. If it is detected within either the double of the time:$t_{15}$ or the setting time of the timer:$t_{15}$ which operates immediately after the shifting to the low charac. driving that the third switch SW3 is turned on subsequently to the preceding switching-over, from the Off-state to the On-state, of that, the processing of the timer interruption routine is initiated. The program advances as follows; step #211→#234→190 235→#236. As the flag of the rewinding is set, the program advances to step #246 and the display of the trouble warning is indicated to the photographer, and the program advances to step #247 and the system comes into the standby. That is, the film roll is not rewound under the driving mode of the low charac. driving which represents the driving with the high torque, so that it is decided that something wrong happens in the camera system, and then, the trouble warning is displayed.

Further, the processing of the timer interruption routine is initiated if the first switch SW1 is not turned off within the time:$t_{11}$ at the initial resetting. That is, the program jumps to the interruption routine and advances as follows; step #211→#234→#236. Then, as the flag of the initial resetting is set, the program goes to step #246 and the trouble warning is displayed. After that, the program advances to step #247 and comes into the standby. It is to be noted that although, in this embodiment, the sequence motor $M_1$ is driven at only the low charac. driving in the initial resetting, it is allowed similarly to the another cases that the driving mode may be shifted to the high charac. driving from the low charac. driving in the time:$t_2$ later. Alternatively, it is allowed similarly to the case of the winding that the timers corresponding to each of the low charac. driving and the high charac. driving are set and the driving mode of the motor $M_1$ is shifted to the low charac. driving when the timer interruption is initiated in operation of the mode of the high charac. driving.

Still further, description of the case where it is not detected during the initial loading that the third switch SW3 is turned on within the time:$t_{13}$ subsequently to the preceding switching-over, from the Off-state to the On-state, of the third switch SW3 proceeds as follows. In this case, the timer interruption processing is initiated. That is, the program jumps to the interruption routine and advances as follows; step #211→#212→#214→#220. As the flag of the film winding is set, the program advances to step #224 and the timer:$t_{14}$ is set to the time:$t_{14}$. Then, the driving mode of the motor $M_1$ is shifted from the high charac. driving to the low charac. driving at step #225. After that, if it is not detected at step #230 that the third switch SW3 is turned on within the time:$t_{14}$ subsequently to the preceding switching-over, from the Off-state to the On-state, of the third switch SW3, the interruption processing is initiated. That is, the program jumps to the interruption routine and advances as follows; step #211→#234→#235→#236→#238. As the flag of the initial loading is set, the program advances to step #242 and the display of ending in failure of the initial loading is indicated for the photographer. After that the program advances to step #243 and the system comes into the standby. That is, the above-mentioned means the following. The film winding is not fulfilled under the driving mode, of the motor $M_1$, of the high charac. driving. This may be caused by that the film may be wound round the spool 14 improperly. Accordingly, indicating the failure of the initial loading, the camera system warns the photographer so as to try the initial loading once more.

It is to be noted that the magnet unit AMg in the embodiment is a type of the so-called combination magnet, the attraction force of which is extinguished when the voltage is applied to the magnet unit AMg, but, like the magnet units 1CMg, 2CMg for holding the first and second curtains of the shutter, a magnet unit, an attraction force of which is generated when the voltage is applied to the magnet, it is applicable to the magnet unit AMg. In that case, the voltage applying is held until the restrain of the film winding is released, and it is cancelled to hold the voltage applying when the restrain of the film winding is released.

Last, description of the sequence motor $M_1$ which is utilized in the embodiment proceeds as below.

Figure 32:
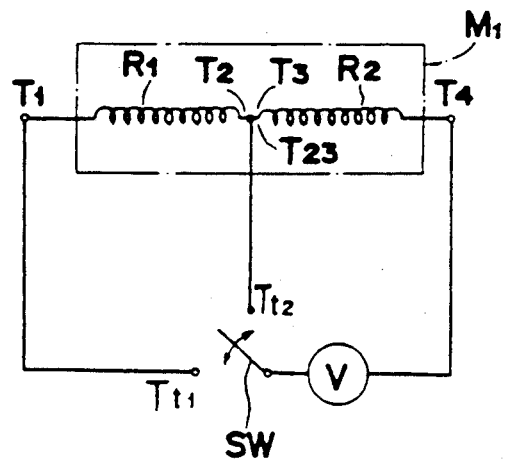
FIG. 32 is a wiring diagram showing a conception of a sequence motor.

Referring now to the drawing of FIG. 32 there is shown a circuit diagram showing a conception of the sequence motor $M_1$ (D.C. motor). In the drawing, "$R_1$" designates a first winding of an armature wound round an iron core, and "$R_2$" designates a second winding of the armature wound therearound. The first winding $R_1$ has a first terminal $T_1$ and a second terminal $T_2$, and the second winding $R_2$ has a third terminal $T_3$ and a fourth terminal $T_4$. Now, the second terminal $T_2$ is directly connected with the third terminal $T_3$. This connecting point is referred to as a common terminal $T_{23}$. "$M_1$" represents a motor itself.

"V" designates a D.C. power source and one of an output terminal is connected to the fourth terminal $T_4$ of the second winding $R_2$ and the other is connected with one of terminals of a selector switch SW as a selecting means. The selector switch SW has another two terminals $T_{t1}$ and $T_{t2}$, one (a first terminal $T_{t1}$) of which is connected to the first terminal $T_1$, and the other (a second terminal $T_{t2}$) of which is connectewd to the common terminal $T_{23}$. Either of these two terminals of the selector switch SW; the first terminal $T_{t1}$ and the second terminal $T_{t2}$ is connected with the aforementioned terminal of the switch SW, selectively by a switching operation of the selector switch SW. Accordingly, under a first mode representing that the switch SW is switched over to its first terminal $T_{t1}$, the power V is supplied to the first terminal $T_1$ of the first winding $R_1$ and the fourth terminal $T_4$ of the second winding $R_2$. And under a second mode representing that the switch is switched over to its second terminal $T_{t2}$, the power V is supplied to the common terminal $T_{23}$ and the fourth terminal $T_4$.

Where, the D.C. motor is explained as below:

$$V = (R+r) \times I + K_1 \times \phi \times N \qquad (1)$$

$$T = K_2 \times \phi \times I - T_0 \qquad (2).$$

It is well-known that the above-mentioned equations have been established, wherein, V: voltage of the D.C. power V,
T: torque generated by the motor $M_1$,
r: internal resistor value of the D.C. power,
R: internal resistor value of the motor $M_1$,
$\phi$: magnetic flux of stator,
$T_0$: torque at no load,
I: running current of the motor $M_1$,
$K_1$, $K_2$: proportional constant defined in proportion to the number of winding of the armature.

The torque at no load $T_0$ is caused by a friction loss at bearings of the motor $M_1$ and the like. Accordingly, the following condition is satisfied; $I \neq 0$ at $T = 0$.

Now, the following values of the itemized are constant; the power voltage V, the internal resistor of the power source r, the magnetic flux of the stator $\phi$, and the torque at no load $T_0$, and the respective internal resistor values of the first and second windings are designated by $R_1$, $R_2$, respectively. And the switch SW shown in FIG. 32 is switched over to its second terminal $T_{t2}$. If these conditions are satisfied, $[R = R_2]$ is established, and a starting torque of the motor $M_1$ under that conditions is as follows;

$N = 0$, then, $$V = (R_2 + r) \times Ia \qquad (3)$$

$$Ta = (k_2)a \times \phi \times Ia - T_0 \qquad (4).$$

Therefore, according to the equations (3), (4), $$Ta = (K_2)a \times \phi \times \frac{V}{R_2 + r} - T_0 \qquad (5)$$

wherein, $I\alpha$ and $(K_2)\alpha$ represent values of a running current of the motor $M_1$ and a proportional constant $K_2$ under the second mode, i.e., the switch SW is switched over to its second terminal $T_{r2}$, respectively.

The number of revolutions $N\alpha$ of the motor $M_1$ at $[T=-T_0]$ is obtained as follows;
$I=0$ at $T=-T_0$, then, $$V = (K_1)\alpha \times \phi \times N\alpha \qquad (6).$$

Therefore, $$N\alpha = \frac{V}{(K_1)\alpha \times \phi}. \qquad (7)$$

Figure 33:
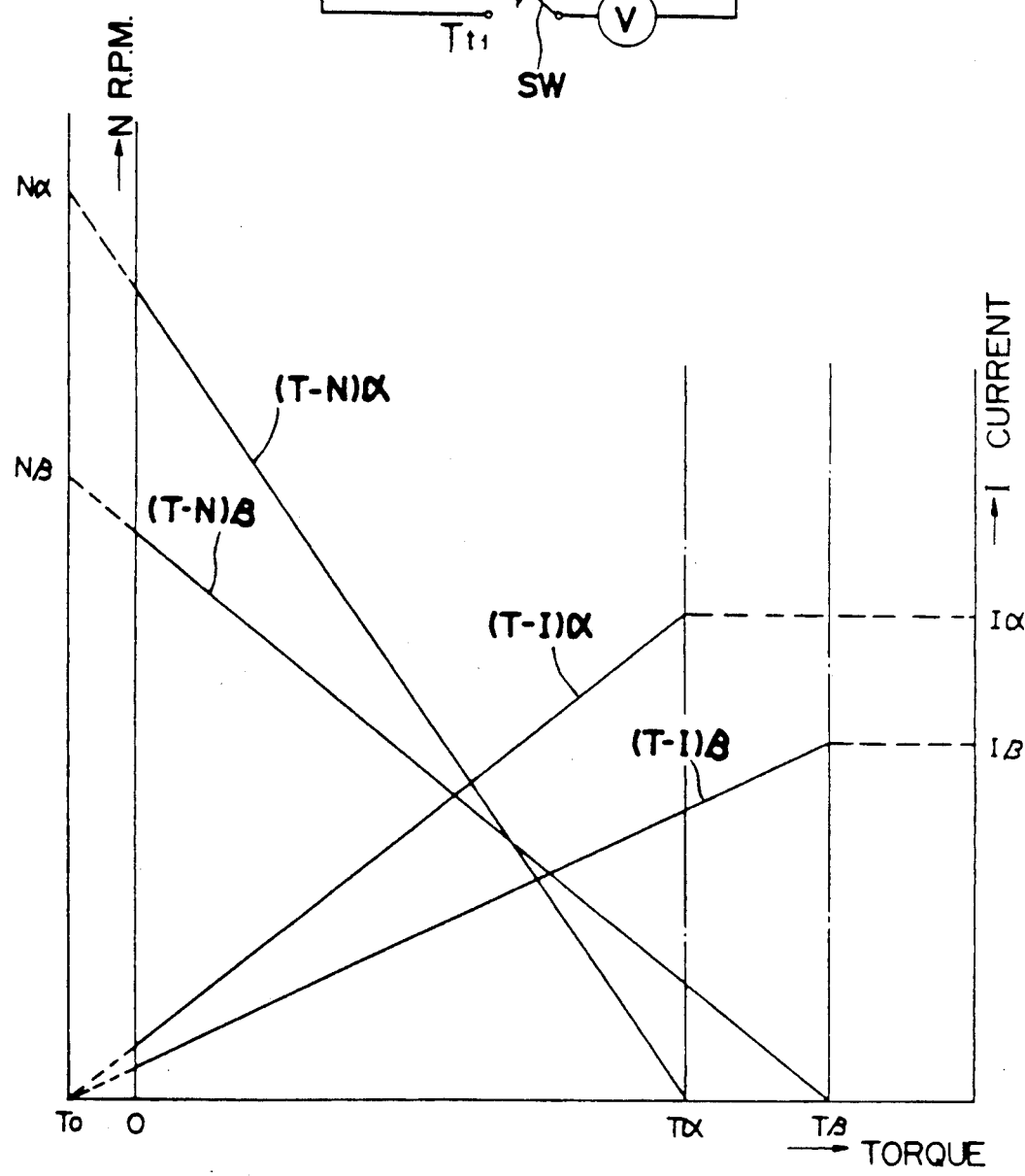
FIG. 33 is a diagram showing a driving characteristic of the motor.

According to $T\alpha$ and $N\alpha$ determined on the basis of the equations (5) and (7), as shown in FIG. 33, a characteristic line $(T-N)\alpha$ representing a relationship between the torque and the revolution of the motor $M_1$ under the second mode is obtained.

Next, with respect to the first mode, i.e., the switch SW is switched over to its first terminal $T_{r1}$, a relationship between the torque and revolution of the motor $M_1$ is examined as follows. In this case, $[R=R_1+R_2]$ is satisfied, and the staring torque $T\beta$ of the motor $M_1$ and the number of revolutions $N\beta$ are obtained as follows;

$$V = (R_1 + R_2 + r) \times I\beta \qquad (8),$$

$$T\beta = (K_2)\beta \times \phi \times I\beta - T_0 \qquad (9),$$

then $$T\beta = (K_2)\beta \times \phi \times \frac{V}{R_1 + R_2 + r} - T_0, \qquad (10)$$

wherein, $I\beta$ and $(K_2)\beta$ represent values of a running current of the motor $M_1$ and a proportional constant $K_2$ under the first mode, respectively.

If respective diameters of the wires of the first and second windings of the armature are same as each other, both of the proportional constants $K_1$ and $K_2$ are in proportion to these resistor values. Accordingly, a following equation is obtained;

$$(K_2)\beta = (K_2)\alpha \times \frac{R_1 + R_2}{R_2}, \qquad (11)$$

then, $$T\beta = (K_2)\alpha \times \phi \times \frac{R_1 + R_2}{R_2} \times \frac{V}{R_1 + R_2 + r} - T_0, \qquad (12)$$

When $[T=-T_0]$, $[I=0]$ is satisfied, then, the following is obtained;

$$N\beta = \frac{V}{(K_1)\beta} \times \phi. \qquad (13)$$

Wherein, a value $(K_1)\beta$ of the proportional constant $K_1$ under the first mode is in proportion to the number of the winding of the armature of the motor $M_1$. Therefore, the following are satisfied;

$$(K_1)\beta = (K_1)\alpha \times \frac{R_1 + R_2}{R_2}, \qquad (14)$$

$$N\beta = \frac{V}{(K_1)\alpha \times \frac{R_1 + R_2}{R_2} \times \phi}. \qquad (15)$$

Therefore, according to the equations (5), (12), $$T\alpha - T\beta = \left[ (K_2)\alpha \times \phi \times \frac{V}{R_2 + r} - T_0 \right] - \qquad (16)$$

$$\left[ (K_2)\alpha \times \phi \times \frac{R_1 + R_2}{R_2} \times \frac{V}{R_1 + R_2 + r} - T_0 \right]$$

$$= (K_2)\alpha \times \phi \times V \times \left( \frac{1}{R_2 + r} - \frac{R_1 + R_2}{R_2} \times \frac{1}{R_1 + R_2 + r} \right)$$

$$= (K_2)\alpha \times \phi \times V \times \frac{R_2(R_1 + R_2 + r) - (R_1 + R_2)(R_2 - r)}{(R_2 - r) \times R_2 \times (R_1 - R_2 - r)}$$

$$= -\frac{(K_2)\alpha \times \phi \times V \times R_1 \times r}{R_2 \times (R_2 + r)(R_1 + R_2 + r)} < 0.$$

Accordingly, the following relationship is satisfied;

$$T\beta > T\alpha \qquad (17).$$

Further, according to the equations (7), (15), the following is obtained;

$$N\alpha - N\beta = \frac{V}{(K_1)\alpha \times \phi} - \frac{V}{(K_1)\alpha \times \frac{R_1 + R_2}{R_2} \times \phi} \qquad (18)$$

$$= \frac{V}{(K_1)\alpha \times \phi} \left( 1 - \frac{R_2}{R_1 + R_2} \right)$$

$$= \frac{V}{(K_1)\alpha \times \phi} \times \frac{R_1}{R_1 + R_2} > 0.$$

Therefore, the following relationship is satisfied;

$$N\alpha > N\beta \qquad (19)$$

Wherein, according to the equations (16) and (18), a characteristic line $(T-N)\beta$ showing a relationship, at $R=R_1+R_2$, between the revolution and torque of the motor $M_1$ is drawn as shown in FIG. 33, similarly to the characteristic line $(T-N)\alpha$ at $R=R_2$. In addition, the two characteristic lines $(T-N)\alpha$ and $(T-N)\beta$ intersect with each other.

It is to be noted, here, that a way how to drawn respective characteristic lines $(T-I)\alpha$ and $(T-I)\beta$ showing relationships, at respective conditions $R=R_2$ and $R=R_1+R_2$, between the current and torque of the motor $M_1$ in FIG. 33 is as follows. That is, as respective values $T\alpha$, $T\beta$ of the starting torque of the motor $M_1$ and respective values $I\alpha$, $I\beta$ of the current of the motor $M_1$ at motor starting can be obtained, respective coordinates $(T=T\alpha, I=I\alpha)$ and $(T=T\beta, I=I\beta)$, and coordinates $(T=-T_0, N=0)$ are connected to each other with a straight line, respectively. Then, each line can be obtained, accordingly.

One line (T−N)α of the characteristic lines shows the high charac. driving (high rotational speed with low torque), and the other (T−N)β of that shows the low charac. driving (low rotational speed with high torque).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a film winding system of a camera, capable of automatically winding a film roll, comprising an electric motor, cocking means driven by said motor, for cocking a predetermined mechanism, and film winding means driven by said motor, for winding the film roll, said system further comprising:

a differential gearing for driving said cocking means and said film winding means, individually, said differential gearing;

first lock means driven by said motor, for locking said film winding means so that said film winding means does not operate;

second lock means provided in said cocking means, for locking said cocking means so that said cocking means does not operate;

first detection means for detecting whether or not said first lock means locks said film winding means;

second detection means for detecting whether or not said second lock means locks said cocking means;

interlock control means for controlling said first lock means so that said first lock means operates when said cocking means is in operation; and control means for controlling execution to initiate a first operation, a second operation, and a third operation, sequentially, the first operation representing initiating drive of said motor and actuating of said cocking means through the drive of said motor, the second operation representing that actuating of said interlock control means is caused to stop and locking of said first lock means is cancelled when said second detection means detects that said second lock means locks said cocking mean, the third operation representing that said motor is turned off when said first detection means detects that said first lock means locks said film winding means.

2. A system as claimed in claim 1, wherein said differential gearing comprises:

an input gear for inputting a driving force of said motor, said input gear rotatably fitted around a first shaft which is rotatably supported with a camera body;

planetary gears driven by said input gear, which gear into said input gear, said planetary gears comprising at least one wheel;

a first driving gear for driving said cocking means, said first driving gear rotatably supported around said first shaft and supporting said planetary gears with a shaft provided therewith;

a carrier rotatably together with said first shaft and said first driving gear; and second driving gear for driving said film winding means, said second driving gear being rotatably fitted to said first shaft and provided with an internal toothed gear which is disposed so as to gear into said planetary gears.

3. A film winding system as claimed in claim 1, wherein said cocking means is adapted to cock at least one of a diaphragm mechanism, a mirror-up mechanism, and a shutter mechanism.

* * * * *